(12) United States Patent
Muller

(10) Patent No.: US 8,651,961 B2
(45) Date of Patent: Feb. 18, 2014

(54) COLLABORATIVE ELECTRONIC GAME PLAY EMPLOYING PLAYER CLASSIFICATION AND AGGREGATION

(75) Inventor: Marcus S. Muller, Cambridge, MA (US)

(73) Assignee: Solocron Entertainment LLC, Tyler, TX (US)

(*) Notice: Subject to any disclaimer, the term of this patent is extended or adjusted under 35 U.S.C. 154(b) by 0 days.

(21) Appl. No.: 13/700,707

(22) PCT Filed: Dec. 3, 2011

(86) PCT No.: PCT/US2011/063198
§ 371 (c)(1), (2), (4) Date: Nov. 28, 2012

(87) PCT Pub. No.: WO2012/075477
PCT Pub. Date: Jun. 7, 2012

(65) Prior Publication Data
US 2013/0143669 A1  Jun. 6, 2013

Related U.S. Application Data

(60) Provisional application No. 61/481,605, filed on May 2, 2011, provisional application No. 61/469,235, filed on Mar. 30, 2011, provisional application No. 61/443,817, filed on Feb. 17, 2011, provisional application No. 61/419,801, filed on Dec. 3, 2010.

(51) Int. Cl.
*G07F 17/32* (2006.01)
(52) U.S. Cl.
USPC .................. 463/42; 463/43; 463/44

(58) Field of Classification Search
USPC .......................................................... 463/42
See application file for complete search history.

(56) References Cited

U.S. PATENT DOCUMENTS

| | | |
|---|---|---|
| 4,570,930 A | 2/1986 | Matheson |
| 4,848,771 A | 7/1989 | Richardson |
| 4,858,930 A | 8/1989 | Sato |
| 5,083,800 A | 1/1992 | Lockton |
| 5,086,394 A | 2/1992 | Shapira |
| 5,555,426 A | 9/1996 | Johnson et al. |
| 5,618,043 A | 4/1997 | McGlew |
| 5,696,981 A | 12/1997 | Shovers |
| 5,813,913 A | 9/1998 | Berner et al. |
| 5,885,156 A | 3/1999 | Toyohara et al. |
| 5,954,581 A | 9/1999 | Ohta et al. |

(Continued)

OTHER PUBLICATIONS

Edwards, "10 Classic Computer RPGs", Slideshow from PCMag.com, Mar. 16, 2012, pp. 1-4.

(Continued)

*Primary Examiner* — Omkar Deodhar
(74) *Attorney, Agent, or Firm* — Knobbe, Martens, Olson & Bear, LLP

(57) ABSTRACT

A method and system tracks, analyzes or sorts behaviors of user or players across a network to draw correlations from, or characterizations of, those user or players and identifies similarly characterized or mutually complementary user or players. For example, the method automatically obtains player data regarding interactions by each of multiple players with a multiplayer electronic game via each player's corresponding data processing device connected via the network. The method can then sort, classify or suggest additional activities, games, groups, or other different activities or actions for the players.

31 Claims, 26 Drawing Sheets

(56) References Cited

U.S. PATENT DOCUMENTS

| | | |
|---|---|---|
| 5,963,951 A | 10/1999 | Collins |
| 5,987,440 A | 11/1999 | O'Neil et al. |
| 6,023,729 A | 2/2000 | Samuel et al. |
| 6,073,138 A | 6/2000 | de l'Etraz et al. |
| 6,106,395 A | 8/2000 | Begis |
| 6,119,229 A | 9/2000 | Martinez et al. |
| 6,128,660 A | 10/2000 | Grimm et al. |
| 6,287,196 B1 | 9/2001 | Kawano |
| 6,290,602 B1 | 9/2001 | Kawano |
| 6,322,451 B1 | 11/2001 | Miura |
| 6,345,297 B1 | 2/2002 | Grimm et al. |
| 6,374,290 B1 | 4/2002 | Scharber et al. |
| 6,425,828 B2 | 7/2002 | Walker et al. |
| 6,475,089 B1 | 11/2002 | Lee |
| 6,480,885 B1 | 11/2002 | Olivier |
| 6,485,367 B1 | 11/2002 | Joshi |
| 6,539,232 B2 | 3/2003 | Hendrey et al. |
| 6,542,749 B2 | 4/2003 | Tanaka et al. |
| 6,648,760 B1 | 11/2003 | Nicastro |
| 6,651,086 B1 | 11/2003 | Manber et al. |
| 6,758,746 B1 | 7/2004 | Hunter et al. |
| 6,832,245 B1 | 12/2004 | Isaacs et al. |
| 6,905,414 B2 | 6/2005 | Danieli et al. |
| 6,951,516 B1 | 10/2005 | Eguchi et al. |
| 7,069,308 B2 | 6/2006 | Abrams |
| 7,167,910 B2 | 1/2007 | Farnham et al. |
| 7,478,078 B2 | 1/2009 | Lunt et al. |
| 7,526,472 B2 | 4/2009 | Heidloff et al. |
| 7,559,834 B1 | 7/2009 | York |
| 7,596,597 B2 | 9/2009 | Liu et al. |
| 7,603,417 B2 | 10/2009 | Ben-Yoseph |
| 7,614,955 B2 | 11/2009 | Farnham et al. |
| 7,637,806 B2 | 12/2009 | Rhyne, IV et al. |
| 7,653,627 B2 | 1/2010 | Li et al. |
| 7,677,970 B2 | 3/2010 | O'Kelley, II et al. |
| 7,677,979 B2 | 3/2010 | Van Luchene |
| 7,698,380 B1 | 4/2010 | Amidon et al. |
| 7,707,122 B2 | 4/2010 | Hull et al. |
| 7,713,116 B2 | 5/2010 | Keam et al. |
| 7,716,149 B2 | 5/2010 | Ducheneaut et al. |
| 7,716,287 B2 | 5/2010 | Appelman et al. |
| 7,720,777 B2 | 5/2010 | Ducheneaut et al. |
| 7,725,492 B2 | 5/2010 | Sittig et al. |
| 7,730,216 B1 | 6/2010 | Issa et al. |
| 7,742,978 B2 | 6/2010 | Boesel |
| 7,765,265 B1 | 7/2010 | Granito et al. |
| 7,789,758 B2 | 9/2010 | Wright |
| 7,835,296 B2 | 11/2010 | Kim et al. |
| 7,899,862 B2 | 3/2011 | Appelman et al. |
| 7,930,197 B2 | 4/2011 | Ozzie et al. |
| 7,953,673 B2 | 5/2011 | Augusto et al. |
| 7,970,712 B2 | 6/2011 | Ruvolo et al. |
| 8,010,474 B1 | 8/2011 | Bill |
| 8,010,546 B2 | 8/2011 | Terrill et al. |
| 8,056,082 B2 | 11/2011 | Koretz et al. |
| 8,088,002 B2 | 1/2012 | Ganz |
| 8,147,306 B2 | 4/2012 | Rhyne, IV et al. |
| 2003/0069868 A1 | 4/2003 | Vos |
| 2004/0003042 A1 | 1/2004 | Horvitz et al. |
| 2004/0039630 A1 | 2/2004 | Begole et al. |
| 2004/0053690 A1 | 3/2004 | Fogel et al. |
| 2004/0097287 A1 | 5/2004 | Postrel |
| 2004/0143852 A1 | 7/2004 | Meyers |
| 2005/0137015 A1 | 6/2005 | Rogers et al. |
| 2005/0192097 A1 | 9/2005 | Farnham et al. |
| 2005/0245317 A1 | 11/2005 | Arthur et al. |
| 2006/0121973 A1 | 6/2006 | Parisien |
| 2006/0123127 A1 | 6/2006 | Littlefield |
| 2006/0128469 A1 | 6/2006 | Willis et al. |
| 2006/0258462 A1 | 11/2006 | Cheng et al. |
| 2007/0094325 A1 | 4/2007 | Ih et al. |
| 2007/0149289 A1 | 6/2007 | Nickell et al. |
| 2007/0149290 A1 * | 6/2007 | Nickell et al. .................. 463/42 |
| 2007/0191099 A1 | 8/2007 | Hought |
| 2007/0232396 A1 | 10/2007 | Yoo |
| 2007/0294387 A1 | 12/2007 | Martin |
| 2008/0096665 A1 | 4/2008 | Cohen |
| 2008/0120558 A1 | 5/2008 | Nathan et al. |
| 2008/0139315 A1 | 6/2008 | O'Connor et al. |
| 2009/0075738 A1 | 3/2009 | Pearce |
| 2009/0215540 A1 | 8/2009 | Perlman et al. |
| 2009/0253513 A1 | 10/2009 | Ducheneaut et al. |
| 2009/0305774 A1 | 12/2009 | Farone et al. |
| 2010/0113158 A1 | 5/2010 | Chapman et al. |
| 2010/0113160 A1 | 5/2010 | Belz et al. |
| 2010/0146128 A1 | 6/2010 | Kulkarni et al. |
| 2010/0185580 A1 | 7/2010 | Zhu et al. |
| 2010/0217883 A1 | 8/2010 | Goya |
| 2010/0229107 A1 | 9/2010 | Turner et al. |
| 2010/0255916 A1 | 10/2010 | Sioufi Filho |
| 2010/0280901 A1 | 11/2010 | Zaldivar et al. |
| 2011/0185399 A1 | 7/2011 | Webber et al. |
| 2011/0218045 A1 | 9/2011 | Williams et al. |
| 2012/0015736 A1 | 1/2012 | Vanbragt et al. |
| 2012/0015737 A1 | 1/2012 | Craine et al. |
| 2012/0015738 A1 | 1/2012 | Vanbragt et al. |
| 2012/0015739 A1 | 1/2012 | Craine et al. |
| 2012/0015741 A1 | 1/2012 | Craine et al. |
| 2012/0083343 A1 | 4/2012 | Wu |
| 2012/0094762 A1 | 4/2012 | Khan |
| 2012/0142429 A1 | 6/2012 | Muller |
| 2012/0196686 A1 | 8/2012 | Karsten |
| 2012/0220373 A1 | 8/2012 | Cantor |

OTHER PUBLICATIONS

Blizzard Entertainment: World of Warcraft End User License Agreement, http://us.blizzard.com/en-us/company/legal/wow_eula.html, Oct. 29, 2010, pp. 1-5.
Dungeon Finder—WoWWiki—Your guide to the World of Warcraft, http://www.wowwiki.com/Dungeon_Finder, Mar. 13, 2012, pp. 1-11.
Wikipedia, "Massively multiplayer online role-playing game", http://en.wikipedia.org/wiki/MMORPG, Mar. 16, 2012, pp. 1-12.
Office Action from U.S. Appl. No. 13/310,538, dated May 7, 2012.
International Search Report for Application No. PCT/US2011/063198, dated Jul. 31, 2012.
Written Opinion from International Application No. PCT/US2011/063198, dated Jun. 4, 2013.

* cited by examiner

Player Preferences

| | | Not Important — Very Important |
|---|---|---|
| 1. | Languages: _____ _____ _____ | —■— |
| 2. | Age: _____ | —■— |
| | Address/Zip Code/Neighborhood/City: _____ _____ | |
| | Gender/Sexual Preference: _____ | |
| 3. | Educational Level: _____ | —■— |
| | Schools attended: _____ _____ | |
| 4. | Ethnicity: _____ | —■— |
| | Faith: _____ | |
| 5. | Where did you grow up? _____ | —■— |
| | Where do you consider "home"? _____ | |
| 6. | Vocation: _____ _____ | —■— |
| | Hobbies/Avocation: _____ _____ | |
| 7. | Type of gamer? _____ | —■— |
| 8. | Interests _____ | —■— |
| 9. | Favorite Books _____ | —■— |
| | Favorite Movies _____ | |
| | Favorite Television Shows _____ | |
| | Favorite Music _____ | |
| | Favorite Games _____ | |

*FIG. 9*

Game Survey

1. Did you enjoy this gaming experience?
   Dissatisfied    OK    Very Satisfied 2. Was the pace of the gaming appropriate?
   Dissatisfied    OK    Very Satisfied 3. Were you offended by any of the players?
   Dissatisfied    OK    Very Satisfied 4. Was there enough combat/action in the game?
   Dissatisfied    OK    Very Satisfied 5. Was there enough intellectual pursuits?
   Dissatisfied    OK    Very Satisfied 6. Did you increase in levels quickly enough?
   Dissatisfied    OK    Very Satisfied 7. Did you obtain enough gold/treasure/items?
   Dissatisfied    OK    Very Satisfied 8. Please let us know what you didn't like about this gaming experience.

9. Please let us know what you liked best about this gaming experience.

*FIG. 10*

COLLABORATIVE ELECTRONIC GAME PLAY EMPLOYING PLAYER CLASSIFICATION AND AGGREGATION

CROSS-REFERENCE TO RELATED APPLICATIONS

This application claims the benefit of U.S. Provisional Application Nos. 61/419,801, filed 3 Dec. 2010; 61/443,817, filed 17 Feb. 2011; 61/469,235, filed 30 Mar. 2011; and 61/481,605, file 2 May, 2011, all incorporated herein by reference.

BACKGROUND

Many types of games or group-based challenges exist, such as board games, card games, domino/tile games, pen and pencil games, guessing games, dexterity/coordination games, business games, sports, and so forth. Games are inherently social, and many players like to play games for the challenge of the game. However, many players also enjoy the social aspect of gaming, and the ability to meet up to interact with other players. One type of game is a role-playing game (RPG), which is a broad family of games where players assume the roles of characters in a fictional setting. For example, a player may assume the role of a mage in a fantasy-themed role-playing game and partake in various game interactions such as befriending other characters, battling monsters, completing quests, building and/or trading items, and so on. Actions taken within the game succeed or fail according to a formal system of rules and guidelines. The original forms, sometimes called pen-and-paper RPGs, are conducted through speech, whereas in live action role-playing games (LARPs), players physically perform their characters' actions. In both forms, a director (game master (GM)) usually decides on rules and settings to be used and acts as referee, while other players play the role of one or more characters in the game.

Computer-assisted gaming has been used to add elements of computer gaming to in-person and pen and paper role-playing. In these games, computers are used for record-keeping and sometimes to resolve combat, while the participants generally make decisions concerning character interaction. Several varieties of RPG also exist in primarily electronic media, including multi-player text-based multi-user dungeons (MUDs) and their graphics-based successors, massively multiplayer online role-playing games (MMORPGs). Role-playing games also include single-player offline role-playing video games in which players control a character or team who perform game interactions (e.g., competing in battle, conversing with other players or characters, partaking in quests, trading with merchants, etc.), and whose capabilities advance using statistical mechanics. These games often share settings and rules with pen-and-paper RPGs, but generally emphasize character interaction and/or advancement more than collaborative storytelling.

MMORPGs, such as Blizzard Entertainment's World of Warcraft, Sony Online Entertainment's EverQuest, or Jagex Games Studio's RuneScape, combine the large-scale social interaction and persistent world of MUDs with graphical interfaces. A persistent world is a virtual world that generally continues to exist even after a user exits the world. User-made changes to its state are, to some extent, permanent. Servers, data structures, algorithms, etc. associated with the persistent world generally remain available and operational for the user, or other users from around the world, to join and interact with the persistent world and with other players at any time of day or night. For example, if a character purchases an item from a merchant or some way adds an item to the character's inventory in a persistent virtual world, one or more data structures associated with the persistent virtual world may be created or modified to reflect the addition. Most MMORPGs do not actively promote in-character role-playing; however, players can use the games' communication functions to role-play, which they may do to varying extents.

More generally, a massively multiplayer online game (also called MMOG or MMO) is a multiplayer video game which is capable of supporting hundreds or hundreds of thousands of players simultaneously, and need not be of the RPG type, but can be applied to any competitive or cooperative endeavor. An MMOG is generally played on a computer network such as the Internet, and features at least one persistent virtual world. In some cases, multiple instances of a persistent virtual world may be maintained for the MMOG. Each instance may be governed by a different set of rules or conventions, may be available to different regions of the world. Some MMOGs are designed as a multiplayer browser game to reduce infrastructure costs and use a thin client. They are, however, not necessarily games played on personal computers. Most of the newer game consoles, including the PSP and PlayStation 3 by Sony, Xbox 360 by Microsoft, and DSi and Wii by Nintendo can access the Internet and may therefore run MMO games. Additionally, mobile devices and smartphones based on such operating systems as Windows Mobile, Apple's iOS, and Google's Android, as well as the Apple iPhone and iPad, are seeing an increase in the number of MMO games available.

Multiplayer games and networked activities, such as MMOGs and MMORPGs, enable players to cooperate and compete with each other on both a small and large scale, and sometimes to interact meaningfully with people around the world. They include a variety of game-play types, representing many video game genres. Examples of game-play types include, but are not limited to:

Massively Multiplayer Online First Person Shooter (MMOFPS) is a subset of popular first-person shooter-type games where a player views an environment or virtual world through the eyes of a character. MMOFPS is an online gaming genre which typically features a world (e.g., persistent world) and a large number of simultaneous players in a first-person shooter fashion. These games provide large-scale, sometimes team-based combat. The addition of persistence in the game world means that these games add elements typically found in RPGs, such as experience points. However, MMOFPS games generally emphasize player skill more than player statistics, as no number of in-game bonuses will compensate for a player's inability to aim and think tactically.

Massively Multiplayer Online Real-Time Strategy Games (MMORTS) often combine real-time strategy (RTS) with a persistent world though in some cases worlds are "instanced" for the duration of a game, a match, a tournament, or other specified time period. Players may assume the role of a general, king, or other figurehead leading an army into battle while maintaining the resources needed for such warfare. The titles are often based in a science fiction or fantasy universe and are distinguished from single or small-scale multiplayer RTSes by the number of players and, in some cases, common use of a persistent world. The world is generally hosted by the game's publisher and, in the case of persistent worlds or an "instanced" world of longer duration, continues to evolve even when the player is offline.

Massively Multiplayer Online Sports Games allow players to compete in more traditional sports, such as soccer, basketball, baseball, hockey, golf or football.

Massively Multiplayer Online Racing (MMOR) is a large, online racing game, although some games may include elements of combat.

Massively multiplayer online rhythm games (MMORGs), or massively multiplayer online dance games (MMODGs), are MMOGs that are also music video games, for example those which were influenced by Dance Dance Revolution by Konami.

Massively multiplayer online management games (MMOMGs) are often considered easy to play and don't take much time; a player logs in a few times each week, sets orders for an in-game team and finds how to defeat fellow players. Other management games, such as The Sims Online by Electronic Arts and Monopoly City Streets by Tribal DDB, require taking control of people.

Massively Multiplayer Online Social Games focus on socialization instead of objective-based game-play. There is a great deal of overlap in terminology with "online communities" and "virtual worlds". One example is Linden Labs' Second Life, which emphasizes socializing, world-building, and an in-world virtual economy that depends on the sale and purchase of user-created content. Instead of being based around combat, it is based around creating or acquiring virtual objects, including models and scripts.

Some MMOGs have been designed to accurately simulate certain aspects of the real world. They tend to be very specific to industries or activities of very large risk and huge potential loss, such as rocket science, airplanes, trucks, battle tanks, submarines etc. The MMOG genre of air traffic simulation is one example, which provides rigorously authentic flight-simulation environments to players in both pilot and air traffic controller roles. In this category of MMOGs, the objective is to create duplicates of the real world for people who cannot or do not wish to undertake those experiences in real life. For example, flight simulation via an MMOG requires far less expenditure of time and money, is completely risk-free, and is far less restrictive (fewer regulations to adhere to, no medical exams to pass, and so on).

MMO turn-based strategy games, such as Steve Jackson Games' UltraCorps allow numerous players to share a common playing field. Turns are usually time-based, with a "tick" schedule usually daily. All orders are processed, and battles resolved, at the same time during the tick.

Alternate reality games (ARGs) can be massively-multi-player, allowing thousands of players worldwide to co-operate in puzzle trails and mystery solving. ARGs may take place in a unique mixture of online and real-world play that usually does not involve a persistent world, and are not necessarily multiplayer, making them sometimes seen as somewhat different from MMOGs.

Casual or "Quick fix" MMOGs, such as Racing Frogs by Wacky Web Fun Ltd. and Iogen Ltd., are MMOGs that can be played with only a small amount of time every day, week, month, etc.

Massively multiplayer collectible card games, such as Magic: The Gathering Online, include unique virtual objects used within a game that may be exchanged between players within the game or on a secondary market.

A blended MMO game incorporating features of various game-play types described above or other contemplated game-play types.

Some attempts to build peer-to-peer (P2P) MMOGs have been made; however, so far most of these efforts appear to be academic. A P2P MMOG may potentially be more scalable and cheaper to build, but notable issues with P2P MMOGs include security and consistency control, which can be difficult to address given that clients are easily hacked.

Some attempts have been made to provide ways to connect geographically disbursed players together in a given game or networked activity. For example, Microsoft's Xbox Live allows players to enter existing games and be joined together to participate in a game, even if the players have had no prior contact with each other. Blizzard Entertainment employs a dungeon finder tool and battlegrounds matchmaking function that connect players within its World of Warcraft game. Under the dungeon finder tool or using the battlegrounds matchmaking function, players can select from various dungeons or battlegrounds, where players can be linked based on their class or geographic region, such as within the U.S./Canada, Latin America, etc., however, this matching functionality is quite rudimentary. Starcraft provides a player finder board that lists players, points obtained, game faction, numbers of wins and losses (with win percentage), achievement points and division. New players can attempt to find a compatible player within whom to play the game from the board. These player matching systems, however, fail to provide adequate matching to enhance player experiences, among other shortcomings. Other services provide information regarding player character equipment. For example, the GearScore software provides metrics for various items of player equipment permitting players to compare certain relative equipment levels between characters.

Some attempts have also been made to track user activities in an effort to improve user efficiency. For example, Rescue-Time automated time tracking and management software by RescueTime, Inc. tracks processes executing on a user's client computer to determine how a user's time is spent and employs an alert system to notify users based on data collected. The system, however, is focused on improving user efficiency rather than identifying matches or otherwise characterizing users.

Overall, as given the variety of games and the ever increasing need to enhance each player's experience, there is a need to further improve MMOGs.

BRIEF DESCRIPTION OF THE DRAWINGS

FIG. 9 is a screen or GUI to permit a player to input preferences.

FIG. 10 is a screen or GUI to permit a player to provide post-game/session/quest responses.

Figure 1A:
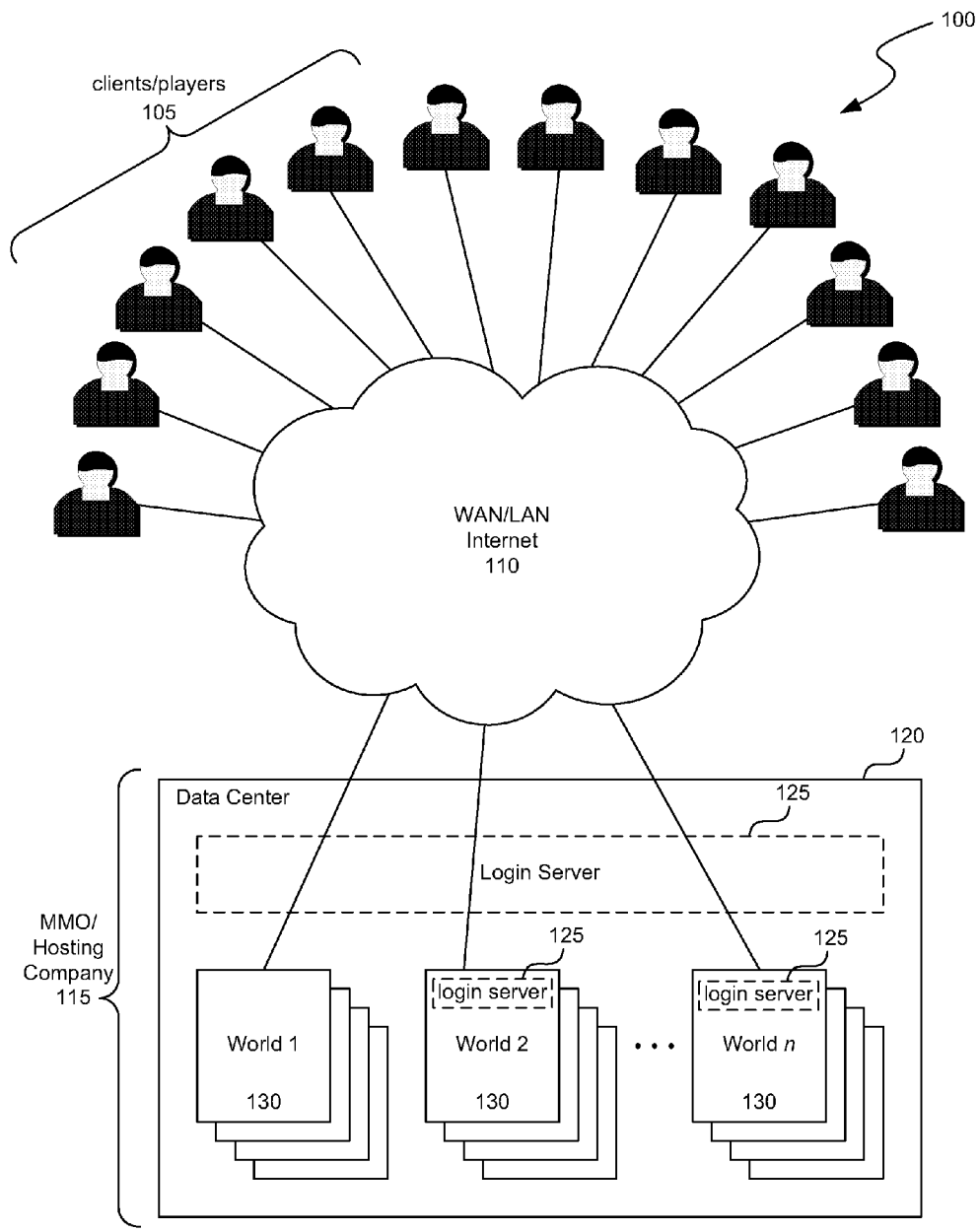
FIG. 1A is a block diagram illustrating an example of a networked gaming system in which aspects of the invention may be employed.

The headings provided herein are for convenience only and do not necessarily affect the scope or meaning of the claimed invention.

DETAILED DESCRIPTION

Overview and Definitions

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples The terminology used below is to be interpreted in its broadest reasonable manner, even though it is being used in conjunction with a detailed description of certain specific examples of the invention.

Discussed in detail herein is a system that permits multiple users or players to interact, e.g., in an MMOG, while enjoying enhanced functionality. As used herein, the terms user and player are used interchangeably to indicate individuals engaging in one or more networked activities such as an MMOG or other activity as described herein. While generally described herein as server-based, a peer-to-peer system or a node-based system may also be employed, as well as other systems that permit geographically distributed players or users to interact and pursue goals. Further, aspects of the invention are described herein with respect to an MMOG, and specifically a fantasy-based MMORPG, although the invention applies to any type or genre of game or networked activity. Indeed, the invention may apply not only to games, but to any networked computing or data processing system. For example, the system may provide a match-making service for individuals based on their shopping habits, common or similar interests or hobbies, travel plans, etc. The system may identify similar users based on common online activity with respect to viewing online articles, booking travel tickets via an online travel website, booking a hotel in the same city, and so on. Furthermore, the system can identify groups of users who may be interested in purchasing a product or service, and thus the system may be able to identify, negotiate or provide a group discount for the product/service to the identified group, as described herein.

Moreover, the invention need not be limited to massively-multiplayer online activities, but can be applied to one-on-one endeavors, such as where two people interact with a program to share information, achieve results, pursue goals, or perform other actions. The example provided herein of a MMORPG is used only as an example to help illustrate aspects of the invention, and those skilled in the art will readily recognize that these aspects of the invention can apply to not only other types of electronic games, but to any network activity involving two or more individuals. Similarly, the system described herein is applicable to any user, not necessarily players in a game. Thus, while the term "player" is used generally in the following description, that term is intended herein to represent any user or group of users.

Furthermore, as described herein, the invention permits conservation of resources, such as reducing, adjusting or optimizing the number of active servers in a network system that provide access to the game or other online endeavor. As described herein, in some embodiments, the system can forecast usages and power down servers to conserve energy, and consolidate players to remaining servers, thereby limiting the number of servers required. Further, players can be rated or characterized based on their determined power consumption or energy footprint, for example their calculated kilowatt usage, and the system may even provide signaling to clients so as not to have a constantly powered on computer, game console or other device. Moreover, the system can provide incentives and/or disincentives to users to encourage game play during off-peak hours to balance load, reduce wear on resources, reduce a number of servers needed during peak hours, etc. Further details are provided herein.

As described more fully below, the system permits automated classification of players to enhance user or player interactions and/or promote system hardware power efficiencies, etc. The system described herein permits the automated matching or identifying of players based on the classification, with a graphical user interface (GUI) to permit players to adjust criteria for the classification. The system permits equipment weighting to help match players, e.g., based on virtual equipment held by each player's character(s) in a game. This system may, for example by employing pre-qualified virtual worlds, permit players to move between worlds, even temporarily, without losing experience, equipment or both. Furthermore, the system may match players with games, worlds, servers, players, in-game activities, etc. based on classification data generated by and/or provided to the system. The system may also suggest or recommend products, activities, games, quests, etc. to users based on their individual actions, activities, or other user characteristics or metrics determined by the system.

Aspects of the invention described herein monitor user or player behavior and identified characteristics, generate metrics, and thereby classify players to perform improved matching or other functions. Generally, the system identifies, determines, analyzes, and/or performs calculations regarding various items of information and/or data associated with users and user characters including characteristics, metrics, criteria, classifications, attributes, etc.; as used herein, the terms characteristics, metrics, criteria, classifications, and attributes are used interchangeably to reference information or data associated with users and user characters for the purposes described herein. For example, the system analyzes gameplay of individual players to generate a rich set of data based on certain player actions. In some embodiments, the system automatically identifies, analyzes, and determines, with computer hardware comprising one or more computer processors, player actions and/or characteristics and transforms these identified player actions and characteristics to generate certain criterion associated with players, for example to aid in player characterization, matching, etc. as further described herein. These actions can include movements within a game (such as places visited), tactics employed during battle or competitions (e.g., types and order of spells used), communications made between players (e.g., vocabularies and grammar of text communications between players), etc. These actions can also include those that take place outside a game such as tracking individuals via GPS coordinates or via other means to determine locations frequented and activities engaged in generally. The system also analyzes characteristics of users or their avatars to generate, enrich, and/or otherwise modify this data set. For example, the system may identify a user's or avatar's age, sex, race, education level, income, level, class, relative equipment level or strength, abilities, and other similar items. Based on this rich data set, the system transforms the data set, for example by generating metrics for players, such as experience points generated per hour, gold acquired per hour, average sentence length, average number of spelling errors or curse words per communication, time period, distance traveled, average number of locations visited per game session, preferred activities, preferred locations, and other metrics described herein. These metrics help characterize and quantify a particular player's gameplay style and therefrom infer behavioral or personality traits of the player, for example to thereby automatically and more accurately match that player with other players, thereby providing an overall enjoyable gaming experience. Transformation may be accomplished, for example, by performing a lookup and comparing certain user actions or characteristics against averages for other players to produce a metric for a particular player, performing calculations on elements of the data set to generate new metrics for a particular player, etc. Thus, in one embodiment, the system identifies one or more characteristics of a first user of the networked computer game; automatically identifies, with computer hardware comprising one or more processors, one or more actions performed by the first user; determines a first criterion based on the one or more characteristics of the first user and the one or more actions performed by the first user; associates the first criterion with the first user; identifies one or more characteristics of a second user of the networked computer game; automatically identifies, with computer hardware comprising one or more processors, one or more actions performed by the second user; determines a second criterion based on the one or more characteristics of the second user and the one or more actions performed by the second user; associates the second criterion with the second user; analyzes the first criterion and the second criterion to determine a relationship between the first criterion and the second criterion; creates an association between the first user and the second user based at least in part on the relationship between the first criterion and the second criterion; and, provides the first user, based at least in part on the association, an option related to a networked computer game. As described further herein, the option to the first player may relate to the first networked computer game or to other different networked computer games.

Importantly, and as noted frequently herein, the invention is not limited for use in MMOGs, or indeed to any games, but can be applied to any network interaction between two or more users. Thus, aspects of the invention may monitor the interaction of a user to an online activity or endeavor, extract a rich data set from that activity, generate metrics therefrom, and thereby classify or otherwise determine behavioral traits for that user so that that user may be accurately matched with other users in future online or networked interactions by that user in the same or similar online or networked endeavors or activities.

As described herein, the system characterizes users who are undertaking an endeavor or activity via data processing devices, where the data processing devices are connected via a data network. The system obtains data regarding the user's interactions with a software application associated with the endeavor or activity. The system then analyzes the data regarding the user's interactions with the software application, and, based on the analyzing, characterizes the user's behaviors, propensities and/or affinities/dislikes. The system can further determine at least one quantifiable metric or statistic from the data regarding the user's interactions with the software application, and can match the user with at least one other user having similar or otherwise complementary behaviors, propensities or affinities/dislikes as the user.

In general, brief definitions of several terms used herein are provided below or preceded by the term being enclosed within double quotation marks. Such definitions, although brief, will help those skilled in the relevant art to more fully appreciate aspects of the invention based on the detailed description provided herein. Such definitions are examples only and are not limiting, but are instead used with respect to various embodiments or examples of the invention described herein, and such definitions are further defined by the description of the invention as a whole (including the claims) and not simply by such definitions.

Ability—special actions a character can take or perform to interact with the game.

Auction or Auction House (AH)—a place or web site where real goods and/or virtual goods obtained in a game or elsewhere can be sold or traded between players through an automated merchant/auction system often within the game; third party sites often permit the purchase and sale of virtual goods for real world currency, rather than for in-game currency such as gold or points.

Avatar—a representation of a user's character, persona, or other alter ego that is generally, but not always, displayed graphically.

Buff/Debuff—a temporary effect that raises or improves (buff) or lowers (debuff) a statistic or attribute. In some embodiments, these effects include real world effects, for example a shopping buff endowing a user with a certain discount on the price of one or more items or providing access to a store or other location at a specified time such as an after hours or private sale.

Clan—a player-formed organization that may facilitate or represent teamwork among the players, or may simply be an association of players. Clans may be associated with a plurality of games and clan activities may also take place in the real world as well as in the virtual or game world.

Class—an association or description of a player or character, such as a job or profession, which may determine or influence some or all of their skills and abilities. A wide variety of classes are possible depending on the specific game or activity. For example, classes in certain fantasy and other MMOGs include healers who can heal damage of a group, tanks who hold the attention or aggression of an opponent, "DPSers" (Damage Per Second) who generally inflict relatively high amounts of damage during battle, buffers who can increase abilities of the group, and crowd controllers who can manage aggression of a group of opponents.

Critical Hit—a hit that inflicts bonus damage; characters may have a critical hit rating representing a percent chance to deal a critical hit.

Damage over Time (DoT)—an effect that deals damage over a period of time.

Damage Per Second (DPS)—a calculation of damage done per second, which can refer to a certain type of class or player, and often referring to a character capable of dealing high damage per second in combat, but which may have certain weaknesses, such as low hit points, armor class, or both. DPS may also refer to the combat efficiency of an item expressed as damage per second.

Experience Points—points to represent a character's experience generally awarded based on activities. Experience points allow a character to advance through a progression of levels, receive improved statistics, obtain more abilities, etc.

Faction—a group or organization of NPCs for which a character can perform quests or tasks to improve standing or reputation with that faction; some factions are opposed, so that gaining reputation with one faction lowers reputation with another.

Grinding—engaging in a repetitive activity to generate experience points, money, or items in an efficient manner by a player.

Group—a number of players who formally join forces to complete shared goals, and which typically share experience points, loot, rewards, etc.

Guild—See Clan.

Level—In level based games, a character's level is an abstract representation of how powerful or experienced the character is, whereby a higher level character is generally more powerful or more experienced, has more or stronger abilities, or can obtain or be equipped with a wider range of items than a lower level character.

Mobile Object (Mob)—generally, an aggressive being controlled by the game, such as a monster.

Non-Player Character (NPC)—generally, a non-aggressive being controlled by the game, such as an innkeeper, merchant, guard, villager, etc.

Raiding—a type of gameplay generally requiring multiple parties or groups of players, often requiring planning, coordination, and teamwork to accomplish shared goals within a game such as combining to kill a monster, claim a territory or portion of a map, etc.

Resistance—an ability to reduce incoming damage of a certain type, such as damage from fire-based or acid-based attacks, often represented as a percent reduction in damage from that type of attack.

Specialization—the ability of a player to improve certain abilities or other aspects of her character, often at the expense of other abilities or aspects.

Statistics—a numerical representation of core attributes of a character, such as strength, intelligence, coordination, etc. Statistics are often used to algorithmically determine success of actions, attributes such as total health, total mana, chance to critically hit, etc.

Tank—a class that hold the attention or aggression of an opponent and absorb damage so other group members can perform actions with less direct opposition.

Twinking—the process of buffing up a character using resources from a higher level character, such as using a high level character to buy or otherwise obtain powerful gear for a lower level character.

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Suitable System

Referring to FIG. 1A, a system architecture includes multiple client computers or players 105 connected to one or more hosting companies 115 via a network, for example via WAN/LAN/Internet 110, together referred to as a system 100. The company 115 includes a data center 120 that includes multiple servers 130 and one or more login servers 125 that may be shared among any or all of the servers 130. As an alternative, each of the servers 130 includes its own login server 125. The one or more server computers may host client applications, such as an MMOG, etc. In this example, the company 115 would be a game company hosting one or more MMOGs, although this is only an example for ease of explanation and understanding. The system can be applied to any online experience, such as a website or other online experience where users can share online shopping experiences and "compete" for bargains. Players may aggregate together because they live in the same town, like the same things, and so forth, so that they can shop together in an online environment. Players with similar or complementary desires, interests or other characteristics may collectively be offered products or services, or even selected discounts, that the system identifies as being particularly desirable for them, as described herein. Other examples are provided herein.

In the example of an MMOG, each of the servers may represent a separate, persistent virtual world. In some examples, a virtual world and/or instances of a virtual world may be represented by multiple servers. For example, geography or map information for a virtual world may exist on one or more servers while character databases, game data structures, combat engines, etc. for the virtual world exists on one or more other servers. In some cases, servers may represent the same virtual world (e.g., same geography, interface, etc.) but use different conventions or rule sets to govern game play and maintain separate data structures to store information related to game interactions. For example, one or more servers may be designated for role players to interact in one instance of a virtual world while another server or servers are designated for player versus player interactions in another instance of the same virtual word. Each server may represent a different time zone, different geographic region, different region or zone within a game, different aspects of the game (such as different time periods in a historical game or different plotlines/timelines), etc. Alternatively, while one data center is shown, multiple data centers, each employing one or more servers, may be employed, with different data centers distributed geographically. Notably, each of the separate servers may represent different worlds or gaming or other application environments particular to individual characteristics or desires of players to thereby provide a more compelling, targeted, or enriching environment for individual users. Each of the servers may execute similar worlds, so that much of the programming involved in creating that world is identical, but in some cases certain rules or content associated with each world may differ. In some environments with servers sharing similar application characteristics, each server may be referred to as a "shard." In some cases, a single server may maintain information for one or more virtual worlds, games, application environments, and/or networked activities.

In some examples, some virtual worlds may permit player versus player (PVP) play, wherein one character can kill another, while another world may simply be player versus environment (PVE) where characters may not kill each other. Thus, in other worlds, the same underlying architectures, zones, geography, interactions, interfaces, etc. are relatively the same, but employ different rule sets or different conventions. In another example, each of the servers 130 may operate a separate virtual world that includes the same or similar NPCs, monsters, terrain, etc., but one world may be for players who frequently use profanity and harass each other verbally, another for players who wish to employ role playing, another for children under the age of 13, another for adults with at least a graduate degree, another for adults within a predefined geographic environment, and so forth.

Multiple servers 130 may be employed to distribute the load of multiple client computers interacting with the data center, so that if hundreds of thousands or millions of players wish to play the game simultaneously, the load may be distributed among multiple servers to avoid overloading a single server. To ensure sufficient bandwidth and latency, servers may be distributed geographically within certain regions that have multiple players, such as a server in the northeast states region of the U.S., or even within individual cities, which can promote interaction among players if they share other common interests, such as a similar interest in a local sports team, passion about local politics, and so forth.

As described herein, multiple servers may be employed to handle peak loads on the system, but, to conserve energy and resources, players may be aggregated on certain servers while other servers are powered down or put in standby mode during non-peak times. Aspects of the invention help forecast such events to facilitate moving players from a server to be powered down/placed on standby to other servers that are still running. Further, by load balancing and moving players between servers, the wear and tear provided on such servers is distributed, so that the average lifetime of such equipment is extended, further conserving resources. As described in greater detail below, the system classifies players as individuals and/or into groups and can place each individual or group on one or more separate servers (one or more different virtual worlds or games) to thereby provide certain players with a richer playing experience. Furthermore, the system can track players to help ensure that an optimal amount of server resources are provided, and to move players between servers as need be, without affecting the user experience. For example, the system classifies a first user according to one or more methods described herein and, among various user characteristics identified or otherwise determined during the classifying process, determine that the user generally engages in a certain online activity, such as an MMOG, at specific times. The system classifies other users to identify those sharing similar and/or complementary characteristics with the first user and then migrates, or offers to migrate, the first user and other users to a particular server or user environment where these users can enjoy an improved user experience. Exemplary benefits from this migration or grouping include having more users available at preferred times to share in the mutual activity, creating a more well-rounded or mutually complementary user base to share in the user environment or activity, optimizing or otherwise improving hardware load factors or other characteristics that are related to user populations and playtimes, and other similar advantages. In some cases, users might be migrated between various data centers to balance or improve power usage based on user demographics and activity engagement.

As also described herein, such regional preferences can be selected by the player to enrich that player's in-game experience. Thus, a single server may host only several thousand players who play regularly, and that can help develop more affinity or emotional appeal among players (such as lasting guild formations), and thereby generate a deeper experience for the players. Players can thereby get to know several players within a given region, given world, or other games more easily, and thereby generate increased emotional bonds. As described herein, aspects of the invention help players to self-select for such affinity groups, but the system also provides an automated fashion for classifying, matching, joining, or otherwise identifying players, for example similar or like-minded players, within a given world or across various worlds or even among various different games or other networked activities. (The term "world" or "shard" can represent not only a game or other networked activity, but more specifically, a particular set of rules applied to a given game or activity, so that multiple games are each similar in architecture (as noted above), but different in regards to rules for those games and the players and characters that may play within that game.)

As described herein, the system tracks and sorts behavior of players across a network to draw correlations from or characterizations of those players and create or identify groups of similarly characterized players or players characterized as mutually complementary. The system identifies, classifies, categorizes, or characterizes players and suggests games, groups, guilds, worlds, etc. for such collections of similar or like-minded players, and suggests that they join a group, undertake a quest, join a game, engage in an activity, etc. For example, based on the style of play of a player and that player's indicated preferences, the system may recommend a guild associated with similar players or a world that suits the player's preferences. As another example, the system may recommend other games to a player based on similarities between that player and other players playing that game or who have played that game. For example, if the system determines that a player's play style with respect to a particular type of character closely matches or otherwise positively correlates with that of another player or set of players who have begun playing another game, the system may recommend the other game to the player. Thus, in some embodiments, the system identifies a first player associated with one or more characteristics and a first networked activity and at least a second player associated with one or more characteristics and a second networked activity. Based at least in part on a correlation between one or more of the first player characteristics and one or more of the second characteristics, the system recommends the second networked activity to the first player. The correlation between the first player and the second player may be a positive correlation and/or a negative correlation between one or more characteristics. In the role-play gaming environment, guilds or groups may be established to better build a sense of community among its players, and the servers 130 may be selected or segregated to execute games only for certain guilds. Each player's avatar may have a visual indication of the guild or group to which that character belongs. Alternatively or additionally, the system also classifies users to identify those users that are dissimilar or uncomplementary. For example, the system may determine, based on user feedback and/or via autonomous methods described herein, that a first type of player having one or more characteristics generally does not enjoy engaging in a networked activity with or otherwise interacting with a second type of player having one or more characteristics. Thus, if the system determines that a first player has one or more characteristics that exceed or are below a certain threshhold, the system may, based on this determination, identify or group other users as uncomplementary or otherwise undesirable for engaging in one or more activities with the first player based on the characteristics of those other users. The system may migrate the first player to servers or games away from the other users, suggest different activities for the various users that minimize the likelihood of them interacting, hinder users from interacting for example via restrictive chat filters, or perform other actions to improve the user experience.

Suitable Client Devices

Figure 1B:
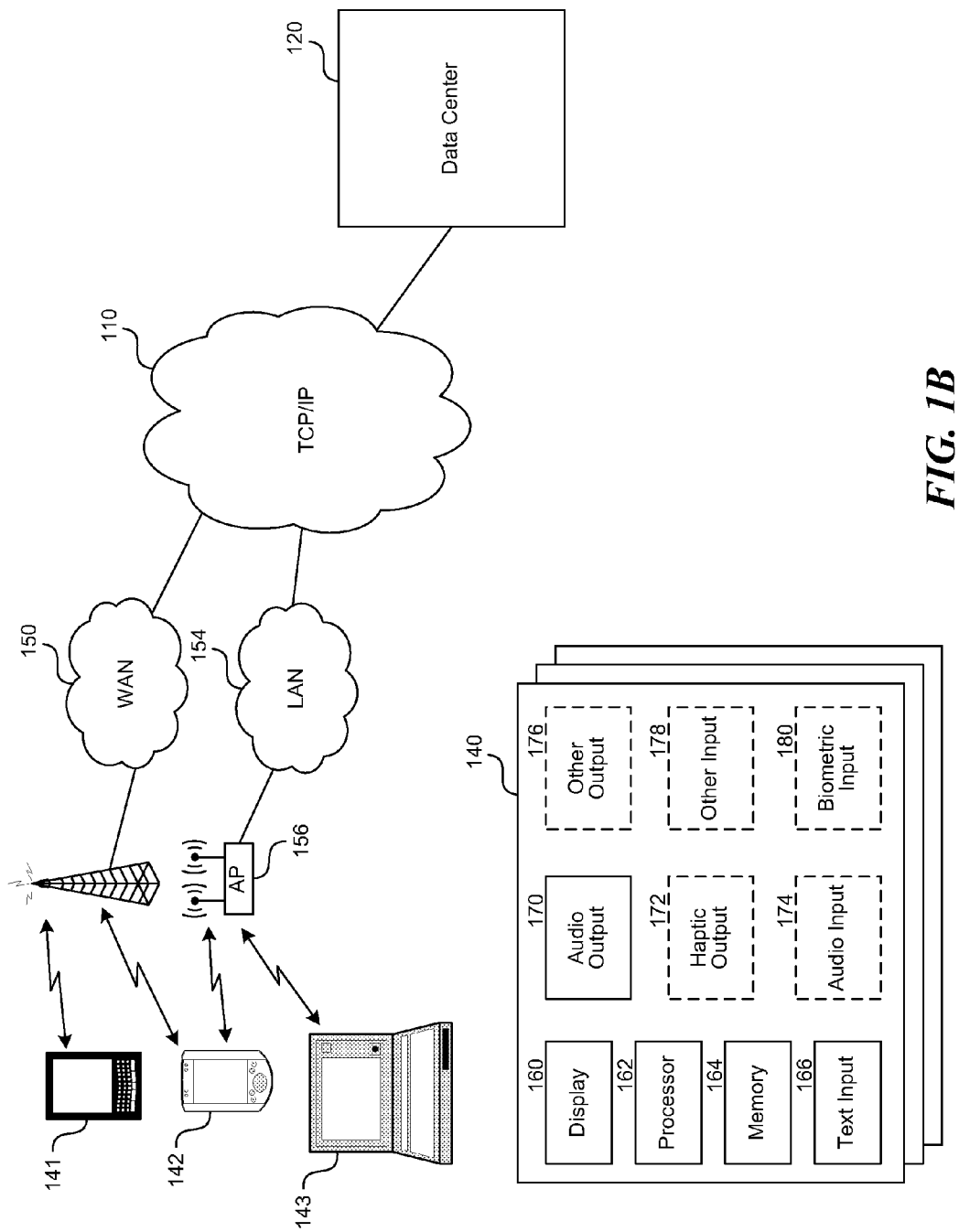
FIG. 1B is a block diagram illustrating examples of client devices that may access and use the gaming system.

Referring to FIG. 1B, an example of multiple client computer devices that may communicate with the data center 120 are shown. In particular, a generic client device 140 (described herein) is coupled to the data center 120 through a network, such as a TCP/IP network 110. The client device may be a mobile device or cell phone 141, smart phone 142, laptop 143, tablet, etc., all of which communicate with the network 110. For example, the cell phone 141 communicates with a WAN 150 (such as a cellular telephone network), via a cellular antenna 152. The smart phone 142 and/or laptop 143 may communicate wirelessly with a LAN 154 via an access port 156. Other mobile devices may also be employed, such as tablets, personal digital assistants, wearable computers, implanted computers, vehicle-based computers, and so forth.

The generic client device 140 can include multiple components, including a display device 160, one or more processors 162, and one or more types of memory 164. A text input device 166 can be a keyboard, keypad, joystick, microphone, etc., while an audio output device 170 can be a speaker, headset, earphones, audio output module, and so forth. Other input devices can be motion sensors such as accelerometers or compasses, or location-based sensors, such as those that use GPS. Further, input devices can be a video capture device, such as the KINECT by Microsoft, which can be used to generate video for video chat, be used to abstract a player to generate a motion-based avatar or animation, sense movement of the player for motion-based games, and so forth. The system may also use information or metrics associated with a user's physical performance or capabilities, for example information captured by a video capture device or via biometric feedback sensors, to match players based on physical characteristics such as their level of fitness or physical activity while interacting with a game. For example, physically active and/or coordinated players may have a preference for playing with players who exhibit a similar degree of physical activity and/or coordination as opposed to players who do not move or lack coordination and vice versa. Similarly, the system may incorporate the physical movement captured by motion sensors, such as Nintendo Wii controllers, as a basis for matching players. For example, players who tend to incorporate a lot of motion into their playing style may prefer to play with players having a similar play style and avoid players who play with very little motion. Furthermore, players may want to be matched with players based on a combination of a motion preference and the type of game being played. For example, a player playing an action or sports game may wish to play with players who move a lot while players playing a strategy game that does not encourage movement may wish to play with players who exhibit less motion. The generic client device 140 can also include a haptic output device 172 that provides vibration or motion-based output to a user, while an audio input device 174 can be a microphone or other audio input device. Other output devices 176 or input devices 178 are also possible.

For example, a location determining input device, such as a GPS radio, can help track players in a game requiring mobility among players, such as a geocaching game. Other games may require players to move throughout a town to perform a treasure hunt, solve puzzles, gather items/information, etc. In another example, the generic client device 140 can include a biometric input device 180, such as a heart rate monitor, blood pressure monitor, blood oxygen level monitor, EEG, EKG, or any other biometric sensor. Such biometric input may be employed in an athletic-type game, such as one where players compete in an athletic event using wearable devices or compete to lose weight over a predetermined period of time. Another example may be a medical-based game or training aid to determine a diagnosis among multiple health care professionals or amateurs. The system may also use GPS data to match players based on their location, thereby allowing players to meet people in their general vicinity (e.g., neighborhood, zip code, city, state). The system may also use the GPS data for exclusionary purposes (e.g., to prevent a player from interacting online with people in certain areas, such as people in the same neighborhood or city).

Other input devices may include sensors to measure environmental conditions, such as pressure, temperature, altitude, etc. In one example, the players may be underwater, using waterproof mobile computing devices, and playing a game with scuba equipment, where players perform similar activities (e.g. searching for items/animals and taking pictures of found items), but depth, direction, temperature or other environmental conditions affect gameplay. Another example may be a game involving amateur pilots who need to fly a predetermined route that includes altitude, speed, and other variables, and the game server provides instructions and feedback, and provides status reports/updates to fellow, competing pilots playing the game.

Suitable Character Display

Figure 2:
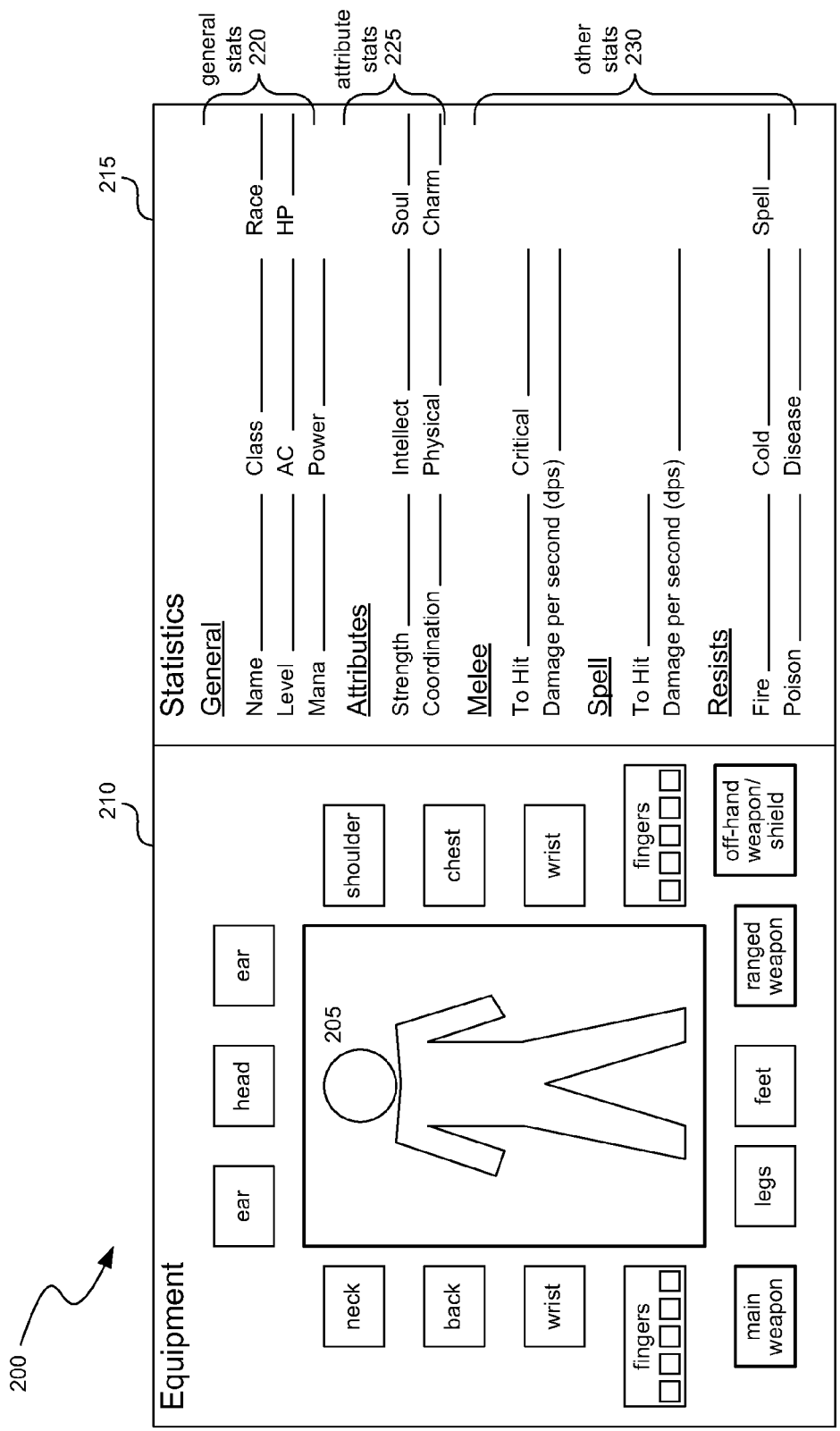
FIG. 2 is an example of a screen display showing character equipment, statistics and other data associated with a player's character in a game.

Referring to FIG. 2, an example of a screen display 200 for displaying information regarding character equipment and statistics is shown. In this example, the screen includes two sections, an equipment section 210 and a statistics section 215. Each player can have one or more characters, with each character represented by an avatar 205, which is basically a virtual representation of the character that the player uses or controls within a given game or virtual world. Most avatars in games are generally humanoid, but it could also be an animal, a single-celled organism, a robot, and so forth.

The avatar generally has equipment that it can use. In the example of a humanoid avatar 205, section 210 displays equipment that the avatar may employ on portions of that avatar's body, such as head (for a helmet, hat, wig, etc.), ears (for earrings, headphones, etc.), neck (for necklace, tie, etc.), back and chest (for armor, clothing, etc.), shoulder (for shoulder pads, armor, epaulets, etc.), wrists (for bracelets, watches, etc.), fingers (for rings, nails, tattoos, etc.), legs (for armor, clothing, etc.), and feet (for shoes, boots, etc.). For example, a character's avatar may have finely-crafted and studded leather armor covering its chest, back and shoulders that boost statistics (armor class, intelligence, resistances, etc.) for that character. Much of the equipment relates to augmentation of the character to provide enhanced statistics, abilities, or aesthetics for that character. As described herein, much of the equipment may have a point value or weighting associated with it that can help match players to a given game, a given quest, a given guild, etc.

Other equipment may include a main weapon, an off-hand weapon or shield, a ranged weapon, or other items that the user may carry, hold, or use, such as potions, scrolls, climbing equipment, lock picking equipment, trap enabling/disarming equipment, surveillance equipment, computer access equipment, keys or security equipment, and so forth. Equipment is often dictated by the game in which the character plays and most equipment is unique to that given game. However, some games may permit use of equipment obtained in other games as described herein. For game balance reasons, some equipment may only be wearable or usable by certain classes. Therefore, a warrior may, for example, use any type of armor, whereas a wizard or DPS character may not be able to use most types of armor. In some examples, the system may allow a character in one game to send or "mail" items to characters in another game. For example, a character in a fantasy-themed game may mail or otherwise transfer an item, such as a sword or potion to a character in a space-themed gamed. Other similar examples of item transfers and/or transformations among differing games and genres are contemplated.

In some embodiments, the system may "transform" the mailed item to make it compatible with the space-themed game. For example, a sword may be transformed into a raygun. As another example, chain mail armor may be transformed into a spacesuit. In some embodiments, the system provides a preview of or choices to the user regarding how the item in a first game may be changed or otherwise transformed into different items in one or more other games. Users are presented with various options to modify attributes or characteristics of the item in different games or even select among one or more different items to transform the item into in the different games. In some embodiments, the user is presented with an option to transform an item in the same game, for example when moving from one server or virtual world instance to another in the same game, taking into account differences between virtual world instances of each server such as server age, economic state, average experience levels, character diversity, etc. A user selects a first item to transfer from a first game to one or more second games. Based on one or more attributes of the first item, the system determines one or more different items in one or more second games that the first item can be transformed into. Databases or other data structures correlating items, attributes, and/or characteristics between games may be consulted to facilitate this determination. Based on the determination, the player is offered a choice to transform and/or transfer the item into one or more items in one or more games. In some embodiments, the player is allowed to keep the item in the first game and also receives the corresponding transformed item(s) in the one or more second games. The system then transforms the item or otherwise makes available the other item(s) in the one or more second games. For example, a user wishing to transform a sword in a fantasy-themed game may be offered the option to transform the sword into a pistol with certain attributes or a rifle with certain other (or similar) attributes in a western-themed game or a club with certain attributes or one or more different swords with certain attributes in a different fantasy-themed game. Similar relationships and transformations may also be tracked and offered with respect to player characters, avatars, etc. Thus, in general, the system includes a way of transferring digital objects and/or characters between electronic games or virtual worlds. This includes receiving at least one data object that defines a first digital object, where the data object defines statistics or values for use of the digital object in an electronic game, virtual world, or other online endeavor. The system normalizes or otherwise adjusts the statistics or values of the digital object, and then converts the normalized statistics/values into new statistics/values for another data object. The other digital data defines another digital object to be used in another electronic game, virtual world, or another online endeavor.

For example, one medieval-themed game may use a range of values between 0 and 10 to represent armor (or other defensive statistic), while another game (such as a space-themed game) may use a range of values between 100 and 1000, and thus the system may perform a simple scaling calculation to convert both ranges into a normalized value, e.g. a range of 0-100. (Alternatively, the system skips the normalizing and simply employs a calculation to convert a statistic of one game to that for use in another, without the intermediate step of normalizing.) The system may make other changes. For example, the original digital object can include an image file for the digital object (e.g. a sword), and the conversion substitutes that image for display to the user with another image file (e.g. an image of a ray gun), where both images are stored in one or more databases.

To assist in performing the transformation, lists of items associated with a plurality of different games may be stored in databases or other data structures. The system may use a mapping table or other means to create corresponding relationships between items of different games. Attributes, characteristics, and other aspects of items are tracked and related and/or adjusted among various games and activities. Thus, for example, a magic sword in a fantasy-themed game might be mapped to or otherwise associated with a laser sword or laser rifle in a space-themed game and each may also be mapped to or otherwise associated with a pistol in a western-themed game. In some cases, the system may provide a list of options for transforming a character and/or an item. For example, when transforming a quiver of arrows the system may prompt a player to select from a magazine of bullets, a hand grenade, etc. In this way, the player may prefer or appreciate the options and become more invested in the game. Similarly, character attributes, special abilities, classes, and other game-specific characteristics may also be related and mapped between different games permitting not just items to be transferred or mailed between games, but also entire characters along with some or all of their items, attributes, and abilities, sometimes transformed as appropriate, as further described herein. Thus, for example, a level 12 orc mage in a fantasy-themed game may be transformed into a level 17 human scientist in a modern-day military-themed game or a level 9 Jovian chancellor in a futuristic space-themed game. This permits a publisher, for example, to offer players in a first game the opportunity to come try out or join a second game using characters and/or items generally corresponding to a level of achievement and power achieved in the first game without necessarily having to start from scratch or at the beginning or a lower level in the second game. Such an opportunity can be offered on a time-limited basis: for example, a player can enjoy playing the new game for a week or a month for free, but afterwards need to purchase the game, and may need to start at the first level or at the beginning of the game. Furthermore, items associated with the character may be transformed accordingly.

In general, each item is a digital object defined by a globally unique ID (GUID) or other identifier. A game server will typically store a database of such objects, their IDs, their statistics, an image of the object, etc. The digital object is associated with the character as long as the character possesses that object. Much of the equipment affects the statistics shown in the statistics section 215. Thus, if the character employs chain mail armor, he may have a better armor class rating than a character that employs only leather armor. An example of such a digital object data structure or database is shown in Table 1 below:

TABLE 1

Digital Object Data Structure

| GUID | Item Name | Points | Abilities | Restrictions | Owner | Image |
|---|---|---|---|---|---|---|
| 345721 | Flaming Sword | 60 | +10 to hit +20 fire damage | Min. 60 Strength | [GUID for player profile and character owning item] | [URL to image File] |
| 367721 | Ring of Acid Resistance | 50 | 30% acid resistance | none | [GUID for player profile and character owning item] | [URL to image File] |
| 145721 | Hat of Memory | 100 | +20 to Intellect | Min. 80 Intellect | [GUID for player profile and character owning item] | [URL to image File] |
| 67883 | Stealth Armor | 120 | +10 to Armor Class +30% to Hiding Ability | Min. 40 Coordination | [GUID for player profile and character owning item] | [URL to image File] |
| ... | ... | ... | ... | ... | ... | ... |

In the above example, the points are used for equipments weightings, as discussed herein. The restrictions are minimum requirements for use by characters. The database tracks the current owner and links to the data structure defining a player and his character(s), as discussed herein. The database may include image files that represent the displayable image of the item. Further details regarding equipment weighting is provided below. The system may also include an "ownership table" that maintains associations between characters and items (e.g., a piece of equipment, potion, book, etc.) that each character currently owns. The "ownership table" may store, for each character, the GUID associated with each item that the character owns along with an indication of the current state of the item (e.g., condition, upgrades applied to the item, damage taken, etc.), the current location of the item (e.g., equipped by the character, in a storage location associated with the character, etc.), etc.

While the avatar 205 is shown as generally humanoid, as noted above, other avatars may be employed. For example, the player may employ or have a pet or mount, such as a winged horse, that may have associated equipment. The equipment held by another form of avatar may have a different set of parts that can be equipped (e.g., a winged horse has no fingers but may be able to wear separate pieces of equipment on its hind and fore legs). If the avatar is a single-celled organism, equipment may represent genes or DNA strands that the single celled organism can employ to obtain certain abilities. Many other variations are, of course, possible within a given game.

The statistics section includes a general statistics portion 220 that includes the character's name, class, race, level, armor class (AC), hit points (HP), mana and power. Armor class indicates how difficult it is for the character to be injured in physical attacks. Hit points represent the number of life points for the character before he or she dies or is "knocked out." Level indicates a general level of experience or effectiveness of the character within a game. Mana can represent points used to cast spells while power may represent points used to perform certain abilities. The statistics mentioned above are provided by way of example, and other statistics are contemplated.

The class, race, level and/or other general statistics may affect how the system automatically suggests games, worlds, quests, etc., for a player. For example, if a game includes a tanking class and a healing class, the system may determine that a high DPS class would be needed to help round out or balance the group. This determination may be based on, for example, the success rate and makeup of other groups in similar game interactions, information provided directly by players or the game itself, etc. Thus, the system may identify characters having a high DPS with a similar level, and possibly other similar characteristics or statistics, to join with the group. The identification may be based on the system's analysis of game interactions and/or information provided by a player. Another class may be a crowd control class, such as a type of wizard that can cast spells affecting large numbers of monsters.

For example, the system may statistically determine how quickly different users or groups achieve a particular goal or accomplish a task, for example how quickly they progress through a given level or area of an electronic game, and analyze the members of that group or characteristics of the users. The system can then determine that the groups or users that are able to more quickly progress through a given level or area all have a particular set of characters with particular classes/races/levels/guilds/other statistics, and thus the system can thereby determine a "optimal" group or user makeup. This group or user composition could also be pre-determined and the system trained to identify users and groups satisfying various criteria corresponding to desirable groupings and classifications. In either case, user actions, interactions, behaviors, items, characteristics, and other information as described herein are tracked and recorded in one or more databases or other data structures. This information is analyzed to determine information items that satisfy certain criteria and users are classified and/or grouped accordingly. Thus, the system can help players optimize their group by identifying which character classes/races/levels/guilds/other statistics are missing from the group and identify other players who may be a good match for joining that group. Alternatively or additionally, the system may employ language processing algorithms to analyze communications among players, within websites, blog postings or comment/chat boards for the game and so forth to identify preferred group makeup from analyzed postings, comments, etc.

As another example, in monitoring game interactions, the system may track the characteristics and behaviors of various groups with respect to a particular quest or activity (e.g., how often groups successfully complete the quest, how long it takes successful groups to complete the quest, the attributes of the characters in each group, how many experience points each character in the group earns while completing the quest, etc.). If groups that include certain characteristics, for example one healer, one tank, and one DPS are five times as likely to succeed in completing the quest than other combinations, the system may try to match characters in order to create a group consisting of one healer, one tank, and one DPS. As another example, if a player requests to play with a tank, the system may attempt to match that player with a tank. Furthermore, if DPS characters tend to increase experience points at a relatively high rate for a particular quest as compared to other quests, the system may be more likely to recommend the quest to a player who is looking to increase the experience points of a DPS character. Characters, or classes of characters, can have specializations. For example, wizards may have specialization in destruction spells, illusion magic, crowd control magic, etc. As another example, a warrior may specialize in a certain type of weapon (e.g., melee weapons, ranged weapons, etc.) and be matched to other characters or players based on that specialization. Other examples are of course contemplated.

The attributes statistics section 225 includes various attributes for the character, such as the character's strength (which can indicate how easily the character can inflict melee damage and is typically important for a warrior and how much damage a character takes when attacked), intellect (which is typically important for a wizard and can help with effectiveness of spells), soul (which can be important for healers), coordination (which can be important for certain abilities, such as those requiring small-motor abilities like picking a lock or a large-motor abilities, such as shooting a bow), physical (which can indicate how many additional hit points the character may have), and charm (which can indicate the diplomacy or skillfulness the character has in diplomacy, haggling when buying or selling goods, how likely monsters will attack that character, how likely the character is to obtain a monster as a pet, and so forth).

Equipment in the equipment section 210 can affect statistics in the statistics section 215. For example, the character may include a bracelet on his wrist that adds points to his strength. Other statistics portion 230 may include statistics relevant to melee combat, such as a percentage to hit, percentage to do critical damage, damage done per second (DPS), as well as ranged-attack effectiveness (not shown). Other statistics portion 230 may also include statistics relevant to casting spells, such as spell damage related to a percentage to hit monsters, and DPS effectiveness. A resistance portion indicates the character's resistance to certain types of attacks, such as attacks from fire, cold, spell, poison and disease attacks, where each resistance may be represented as a percentage. Of course, resistance to other forms of attack is also possible. Further, equipment may increase or decrease such resistance, such as a ring or body armor to increase the character's resistance to fire-based attacks.

While not shown, statistics section 215 may also include an indication of a character's traits or skills. These traits or skills can represent activities important to the game, such as running, jumping, eluding, hiding, and other gross-motor skills, as well as fine-motor skills, such as picking locks, disarming or enabling traps, forging documents, etc. While these skills may be based on strength and coordination attributes, other skills may be based on other attributes, such as intellect. Intellect-based skills may include, for example, the ability to understand other languages, specialized knowledge of information important to the game (e.g., history, customs, architecture, survival skills, etc.).

Together, the screen 200 represents the composite features, characteristics, behavior, and statistics of the character that affect how the character interacts with a world, and how effective the character is in performing particular actions. As the character gains more experience, many of the statistics can increase, new abilities can be obtained, and the character can increase its overall effectiveness in achieving goals within the game. Certain games may require one or more particular abilities or minimum general statistics, attribute statistics and/or other statistics to play in a game. The system may automatically analyze a database of all such characters to help identify characters that may be particularly effective in a world, game, quest, etc. being created. For example, a game may include a particular quest that requires diplomacy, where a goal of the quest is to influence NPCs in the game. In this example, the system may automatically identify characters that have high charm attributes and who may thus be more effective in influencing NPCs. The statistics discussed above are provided by way of example; other statistics are contemplated.

Suitable Game Environment

Figure 3:
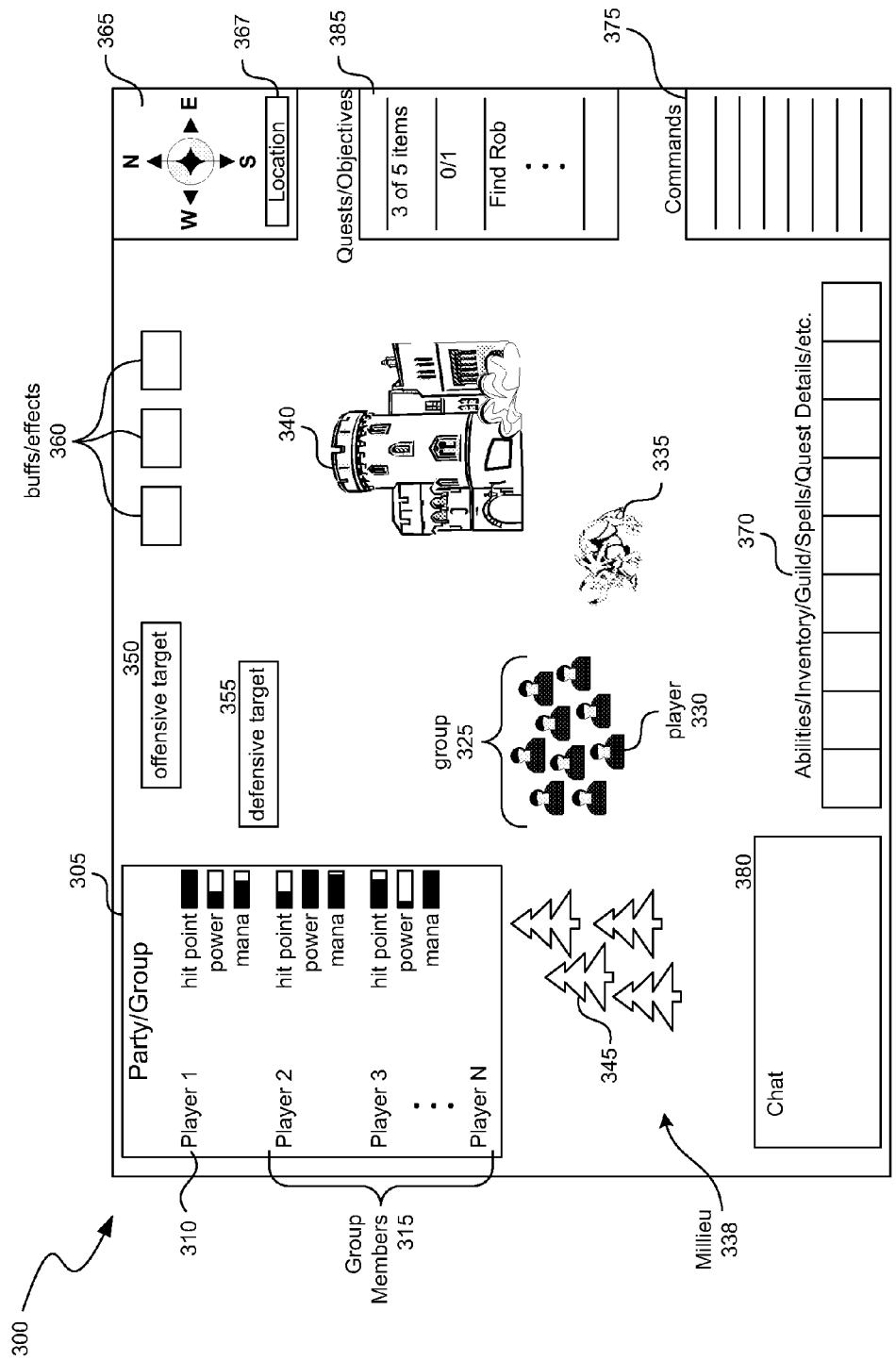
FIG. 3 is an example of a screen display showing a game and various menus and display panels of information.

Referring to FIG. 3, an example of a display screen illustrating a MMORPG user interface 300 showing a virtual world that includes a group section 305 depicting basic statistics of the player 310 and other group members 315 with whom the player is interacting. To interact with the virtual world, each player at each client device 140 inputs movement, combat and other actions via various input devices, such as keyboards, game controllers, microphones, or other input devices such as motion sensors, video cameras for capturing live action, as noted herein.

The group of characters associated with the group members shown as a group 325 with the character 330 corresponding to the player 310. (While the on-screen representation of a player's character is an avatar, for simplicity of discussion, the term character will refer to both the one or more data structures defining the attributes, statistics, and possessions of the character in a game and the on-screen displayed avatar.) As shown, the selected statistics include hit points, power, and mana but may include any other statistics noted herein. The group section 305 helps indicate how each of the players' characters are faring in the game. For example, if the group is fighting a monster 335, all players in the group can see who is losing hit points, who is faring better than others, and allow the group to communicate and determine strategy. While a group of players is shown, the player may be involved in a solo activity, and thus no group would be involved.

The game milieu 338 includes a two or three dimensional depiction of characters in the group 325 (including player's character 330), a monster 335, and as shown, a castle 340 and forest 345. Of course, any form of graphic may be provided for the game. The game may be depicted from a number of different perspectives, such as first person, third person, top-down, etc. In some examples, the depiction of the game may change perspectives for various purposes. For example, while a character or group of characters explore a map, the game may be represented in a top-down manner. However, when the character or group of characters engage in battle, the perspective may change to first person. Further, rather than being automatic, in some embodiments, the player may select the perspective. The milieu 338 represents the virtual world in which players interact. The monster 335 may be represented as an offensive target 350, with associated statistics, followed by a defensive target 355, who may be one of the characters currently engaging the monster in battle. The indicators 350 and 355 help show a near real time damage inflicted on the monster or character.

A portion of the screen 330 may indicate with icons, text or other displayable information, buffs or effects 360 that may affect the group 325. For example, an armor buff can increase the armor class of the group to make it more difficult for the monster to hit or cause damage to members of that group. Another example of a buff or effect can be a spell that permits enhanced damage to the monster based on attacks from the group.

A compass or location indicator portion 365 shows a current position of the group within the world, and a location indicator 367 may provide precise coordinates for the group 325, or player 330. The location coordinates can be x, y and z axis coordinates, polar coordinates, spherical coordinates, and so forth. As described herein, the system may track the location of each player during gameplay and analyze location data to help determine how a player plays a given game and may, for example, further determine which other players that player may wish to play with. For example, some players may have a tendency to explore an area in detail for hidden items, monsters or characters with which to fight, or paths to yet undiscovered areas and wish to play with players having similar tendencies. As another example, some players may wish to play with players who navigate directly from boss monster to boss monster or town to town without exploring other areas.

A menu bar 370 provides access to various displays of information (not shown). For example, an abilities screen can display abilities that the character currently has and those that the character can gain over time. Some abilities may be listed in the menu bar 370 so that by clicking on a displayed ability, a particular action is performed, such as climbing a tree, influencing a merchant, casting a spell, healing a party member, performing an attack, and so forth. Another item or tab in section 370 may allow the user to access an inventory to show equipment, items collected, journal pages, and other things within the character's possession.

An affiliation or guild tab may show or provide access to information regarding the character's guild, such as a roster of guild members, guild members who are online, guild members who are offline, the level for each of the characters in the guild, any affiliations of characters within the guild, where each guild member may be within the world, the current activities of the guild members, etc. Another tab in section 370 allows the player to access spells currently in possession of, or memorized by, the player's character. In some games, the player may make certain spells readily available to the character such that clicking on them within section 370 causes those spells to be cast. The guild tab may allow the player to access a group of fellow players that the system has assembled according the methods describe herein.

Section 370 may have tabs for other information, such as general maintenance information to allow the player to adjust the interface, video display, sound settings, chat settings, languages. Further, section 370 or other means allows the user to access the screen 200 of FIG. 2, and to access other screens described herein, such as those that allow the player to select or adjust personalization settings to help convey to the system how that player typically likes to play (e.g. with or without fellow players from the same town, fellow players with the same socioeconomic or educational background, etc.). For example, a player may wish to avoid playing with people in the same town to avoid mixing their real life persona with their online or game persona, etc. Alternatively or additionally, the system may exclude or filter for certain identifiers, e.g., network identifiers, domains, IP addresses, IP ranges, mail servers, social network handles, or other affiliations to allow the player to avoid playing with colleagues from work or certain social circles, or help permit the player to interact with work colleagues or individuals on a publicly available listserv, bulletin board, friends network, or other publicly available electronic list of individuals and associated electronic addresses.

A commands section 375 allows the player to enter a command or series of commands, such as a series or queue of spells to case. The command section may even include a small program or macro for executing multiple commands simultaneously or sequentially. A chat section 380 allows players to communicate via instant messaging, chat, other textual-based communication, voice over IP, other audio-based communication, video chat, other video-based communication, and so on. For example, if the player is interacting with a deaf player, the system may employ speech-to-text to provide "closed captioning" for the game. The chat section 380 may also report or display an interface of combat statistics or other information in the gameplay, such as an amount of gold the group obtains, experience points gained after defeating a monster, etc. Such status information can be displayed within the chat section 380. Furthermore, section 370 may have a tab to allow the player to filter what information is displayed within the chat section 380. For example, a filter could remove profanity, racist slurs, and other objectionable language selected from a blacklist of such words, so as to allow otherwise compatible players to communicate without allowing objectionable language or content to be exchanged between the players.

A quest section 385 lists tasks, objectives or quests that the players are attempting to achieve or perform within a game. For example, one quest may be to find five items, where three of five have already been located. Another may be to find a particular artifact, where currently that artifact has not been found. Another may be to find an NPC named Rob. Another may be to kill five specific creatures or types of creatures. In the displayed game, if the group 325 defeats the monster 335, it may gain another one of the items, and therefore the objectives section 385 may show that four of five items have been located.

Section 370 may include a quests tab that lists quests or objectives that have been completed, as well as details on how and where each element of that quest was achieved. Section 370 may also include a tab listing a number of available or selected quests, as well as who in the group is on the same quest, where the game permits individual players to pursue different quests as opposed to quests that are to be pursued in a group, etc.

In the example below, the system analyzes the quest or objectives that a player or group accepts, how quickly the player or group completes these objectives, which objectives the player or group chooses not to pursue, and so forth. For example, the system may identify players that accept or complete the same quests or types of quests. As another example, the system may match players who tend to complete similar quests in similar amounts of time as this may provide an indication of each player's skill level and/or play style. This information allows the system to further match players together for a more enjoyable or enriching experience and avoid matching players in a manner that may create a less enjoyable experience for any players involved. For example, a player who tends to be an explorer may want to avoid playing with a player whose only goal is to minimize the amount of time required to complete quests or defeat a particular monster. As another example, players who prefer to partake in combat with players who engage in a predetermined sequence or "rotation" of actions (e.g., attacking and casting spells in a particular order) to defeat a monster or complete a task may want to play with similar or like-minded players as opposed to players who improvise during battle or experiment with different techniques and tactics.

Suitable Game Map

Figure 4:
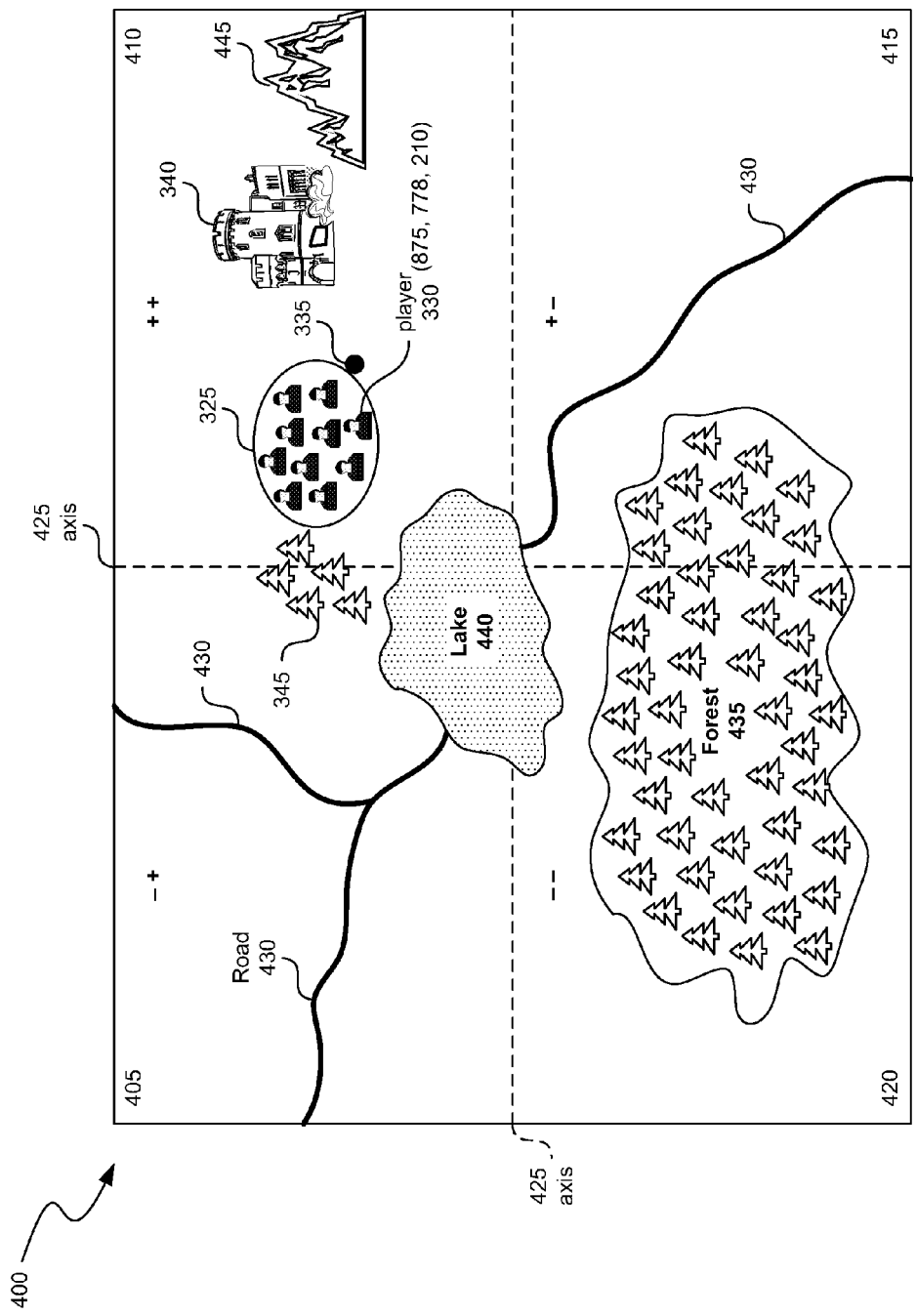
FIG. 4 is an example of a screen display showing a map for use in the game of FIG. 3.

Referring to FIG. 4, a screen display 400 shows a map of the virtual world in which the player 330 and group 325 move and interact with digital objects (movable or immovable) within the virtual world. For example, screen display 400 may show the group of characters as the characters navigate through a forest and encounter various entities, such as monsters for battle, other characters for information about the area, merchants for trade, etc. As described herein, each depicted element within the virtual world is represented by a data structure or data structures indicating, for example, its location within the world, whether it is movable or immovable, if it is a monster, its relevant statistics such as its armor class, hit points, damage per attack, etc., and an image file for visually depicting the digital object.

The digital world may be represented by a map, a portion of which is shown in screen 400, which is divided into standard Cartesian coordinates and quadrants separated by axes 425, with a quadrant 405 representing negative x values and positive y values, a quadrant 410 representing positive x and y values, a quadrant 415 representing positive x and negative y values, and a quadrant 420 representing negative x and y values. Z-coordinate values may represent a distance above (positive) or below (negative) sea level. As shown in FIG. 4, the player's character 330 is at coordinates (875, 778, 210) all positive values indicating that he is in the second quadrant 410 at a position above sea level. Each of the digital objects is similarly represented by coordinates within the coordinate system. So, a road 430, forest 435, lake 440 and mountain 445 all have coordinates defining their location within the virtual world. As noted below, it is important for the system to understand the location of certain locations within the virtual world, such as public locations (taverns, town squares, etc.), craft shops (blacksmiths, forges, mills, etc.) and so on.

The system tracks movement and interactions of all players within the virtual world over time to understand how that player likes to play, who that player often interacts with, where, and for how long, what actions the player takes, places the player visits, NPCs spoken to, etc. The map also shows the castle 340, party 325, forest 345 of FIG. 3. By monitoring the player within the virtual world, the system can determine typical gameplay for that player, map areas of the virtual world to particular activities performed by the player in that area, etc. For example, if the player has his character often go to the trade shop and spend many minutes, game cycles or even hours in the trade shop, the system can determine that he is likely fashioning items, such as arrows, to gain experience, equipment, gold or other game-related statistics. In some examples, activities performed by a player may be discerned by analyzing information other than character interactions. For example, a game publisher, or entity with access to game data, may be able to monitor a character's inventory directly via data structures maintained by the publisher and determine that the player is having his character perform particular actions based on changes to the character's inventory, such as mixing potions, repairing armor, fashioning weapons, frequent upgrades in items, etc.

The system can analyze character movement and generate metrics therefrom, either calculated locally on the client, generated at the server, or both. In general, and as described herein, the system can analyze user behavior or movement within electronic games, virtual worlds or other online endeavors by first receiving data representing locations within the game/world/endeavor, and time data representing how long the user spends in those locations. This data may be based on a grid, Cartesian coordinate system, or other location determination system. The system calculates at least one statistic or metric of the user's movement within the game/world/endeavor and determines a characteristic of the user by comparing the calculated statistic/value to a predetermined threshold or parameter. The system can then associate that determined characteristic with the user and store it in a database for later use, such as for player classification and/or matching.

The threshold can represent a statistically determined dividing line between an average among all players, and those players within a predefined category or characterization of players who are statistically more likely than the rest of the players to perform certain actions. Thus, in some embodiments as described herein, the system gathers data from all players to calculate an average time period or other values for all players for computing some of the various metrics described herein. For example, as described herein, a player characterized as an "explorer" will, on average, traverse more zones of a virtual world, and spend less time in each zone, than the remaining players in that game. In another example, a player who is characterized as a "role player" will spend more time emoting, communicating (with flowery language), and often less time moving about a virtual world, then other players. In other words, the thresholds can represent deviations from the norm for certain behaviors that are performed more often than not for certain categories of players.

For example, the system can divide the virtual world into zones and track movement between zones, or analyze more finely for movement within individual areas of a zone, such as dividing the world into smaller grid locations by overlaying a virtual grid onto the virtual world. One zone may represent a town, in which case, the system may wish to analyze movement data within the town more closely than if the player were in a prairie zone that lacked multiple discrete virtual objects within that zone.

The system may analyze other data, e.g. activity data, with the location data to help further gather important behavioral data regarding the user. For example, if gathered information indicates that the user is involved in a battle, then more accurate data regarding movement of that character in battle can provide important insights into that player's behavior. In one example, a more skilled player may frequently move about an opponent to identify areas of weakness, whereas a less skilled opponent may simply stand and fight.

Further, the system can coordinate location information with chat data to help further confirm the type of gameplay in which the player is engaged. Thus, the system may determine that the player is a "crafter" and that he is often performing crafts within a game to help build items, develop skills, obtain game points, etc. Alternatively, a player may be stationary in a given location, but be performing lots of communicating or emoting or chat with other players, which can indicate that the player is in a tavern or town, and that the player often likes to interact with various other players. Further, the system can determine whether the player is interacting with several players within a group, or players outside of that group, but are also involved in the game. Roleplayers, for example, may be determined by identifying a certain number of players interacting within a certain geographic proximity for a time period exceeding a particular threshold. The player interactions are analyzed to determine chat and emote levels exceeding a threshold. Additional language analysis may be performed to identify speech patterns characteristic of role-playing such as "in-character" language, archaic grammatical or vocabulary constructions, lack of contemporary speech patterns for a particular period of time, etc. Based on this analysis and identification, certain players satisfying these criteria and exceeding the various thresholds specified may be identified as role players. In addition, by tracking this information over time, the system can identify areas where players (previously identified as role-players or not) habitually engage in these activities. Thus, the system may first identify one or more role players based on their actions in a particular place. Over time, by continuing to track these players, the system may identify other locations where these players engage in similar activities. Players they engage with may also more easily be identified as role players. For example, the system identifies a first player as a role player (or other player type) and identifies a second player whose interaction with the first player satisfies one or more criteria or exceeds (or is less than) one or more given thresholds. The system weights or otherwise increases the likelihood in its calculations that the second player is also a role player (or other player type). In some embodiments, the second player has not been previously identified as a role player (or other player type) and in others the second player has been previously identified as a role player (or other player type) and the system increases a confidence metric or factor that the second player is a role player (or other player type) based at least in part on the interaction with the first player. In addition, by identifying and monitoring locations where previously identified role players (or other player types) interact, the system can track interactions at these locations of other players not previously classified as role players (or other player types) to more accurately identify them as such. Other types of players and game activity such as crafters, crafting, duelers, dueling, etc. may also be similarly tracked and identified.

As yet another example, the system can analyze the player's movement within the virtual world during a given session, and determine whether the player has often engaged in combat, communication, crafting, etc. If a player moves frequently about the virtual world, between multiple zones, without engaging much in combat, and stays only a few minutes in any given location, then the system can determine that the player is an "explorer", and characterize the player as such. The system may also determine that the player uses a character to perform repetitive actions and increases a particular attribute or characteristic of the character, often at a higher rate than average players in the game, then the system may characterize the player as a "grinder". Furthermore, the system may track the movement of virtual items within the game and generate an index of use and possession of that item, to thereby build a history for virtual items, which may be useful in analyzing player behavior and value of digital items. Thus, the system can generate multiple metrics based on player movement and thresholds to more accurately determine player behavior, as described herein.

Suitable Communication Protocol

Figure 5A:
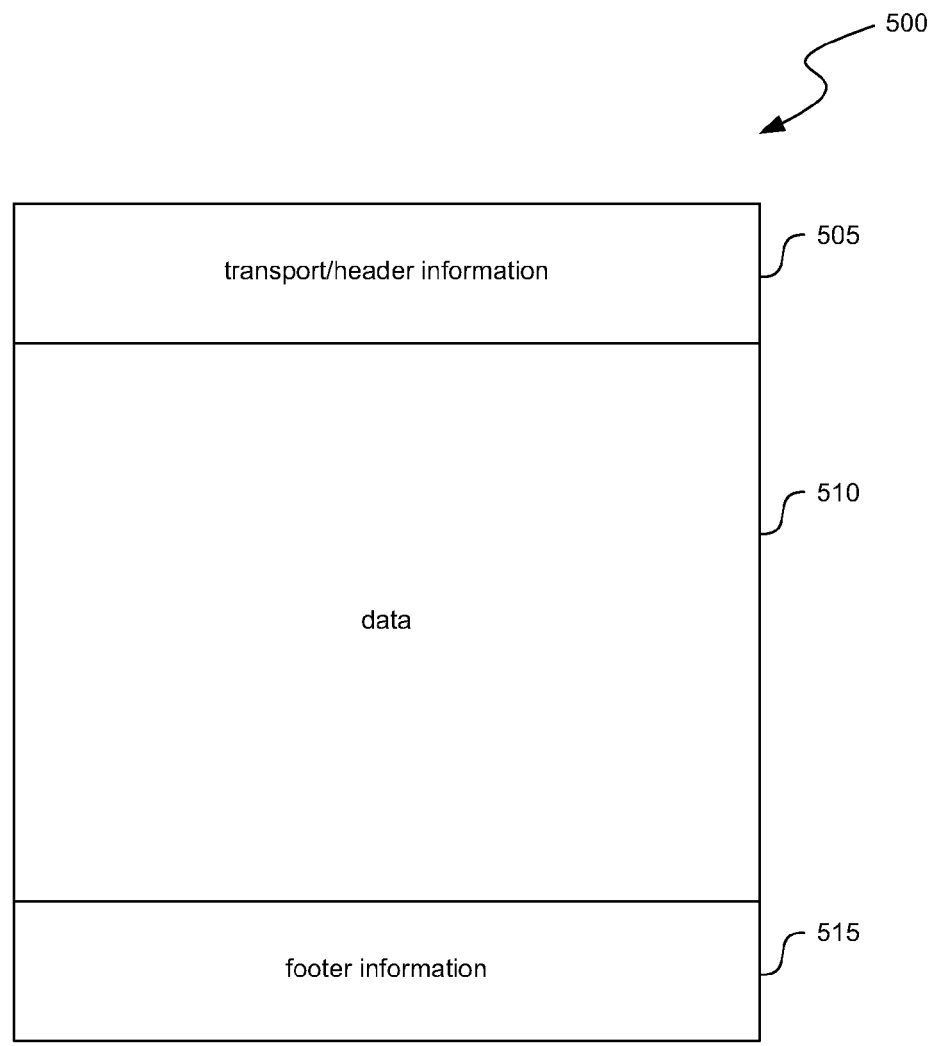
FIG. 5A is a block diagram illustrating an example of a packet exchanged within the gaming system of FIG. 1A.

Referring to FIG. 5A, an example of a data transmission unit, such as a data frame or packet 500 includes a transport header 505, a data payload 510 and a footer or trailer portion 515. An example of a suitable transmission protocol for transmitting the packet may be the well-known TCP/IP protocol. The header portion 505 may include identifying information regarding the client device, such as a client ID, cookie ID, originating IP address, MAC address, and other information identifying the client device. The header may also include game information such as a game ID, game version, virtual world identifier, etc., and/or player identifying information, such as a player ID, user name, login credentials, and other information. The game ID, game version, etc, helps identify for the data center to which server to route the packet, and game on that server if a server is running more than one game. If there are multiple versions of a game, then the header portion 505 may include a game version identifier. Typically, the header may be small compared to the payload portion 510. The header may also include security information, a game identifier, a virtual world identifier, as well as standard information TCP/IP packet, such as a destination address, a packet number, and so forth.

The data payload portion 510 includes most of the game data, such as coordinate locations in which the character is located, what items the character currently possesses or is equipped with, what actions the character took in the game, actions that the player would like the character to take, a direction of movement for the character, a rate of movement for the character, keystrokes by the player (such as for text-based communication), a player or character ID to identify the player to whom text messages are to be sent, an indication of a player's selection of characters or objects within the game, an indication of a macro to be performed, and so forth. Payload data may also include combat information, commands, interface updates, character efficiency data, timing information, an indication of sequences performed by a user, basic game play data, information reflecting changes to the state or appearance of an avatar, etc. In some examples, different data payload portions may represent different types of data. The packet 500 may end with a footer portion 515 that may include error detection/correction codes (e.g. CRC codes), other message identifier or integrity values, end of message/end of packet flag, etc.

Figure 5B:
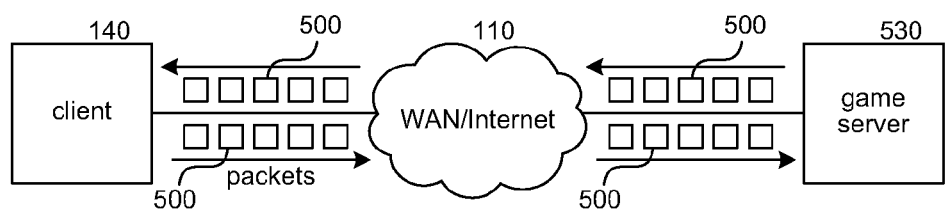
FIG. 5B is an example of an exchange of packets between clients and game servers via a network.

Referring to FIG. 5B, each of the client devices 140 transmits multiple packets 500 to a game server 530 via the network 110. The game server 530 in turn sends packets back to the client device 140 via the network 110. In this way information is exchanged between clients and the server during gameplay. The game server may receive each packet and analyze the packets to determine a player's preferences, communication styles, character preferences, play characteristics, and so forth. The server can analyze packets to determine not only the player's preferences and performance within a game via the player's interactions with the game, but also the player's preferences and performance when interacting with other players. Alternatively, or additionally, the system may determine a player's preferences and performance by analyzing game-related information captured from, for example, RAM, video RAM, information exposed through an API provided by a game, interprocess communications, data structures maintained by the game, function calls to the game or associated software, etc.

System Details

In some embodiments, the system collects data related to game interactions, aggregates the data, and analyzes the data to identify characteristics of players and/or characters and develop a profile for players and/or characters. The system may collect the data from any of a number of sources and in any number of ways, such as by capturing data packets, accessing game data stored in random access memory ("RAM") or on disk, accessing and processing image data stored in video RAM, retrieving information exposed through an API provided by a game or other source, intercepting interprocess communications, accessing data structures maintained by the game, executing function calls to the game or associated software, and so on. Regardless of how the data is collected or the source or sources of the data, the system may aggregate the data to create a repository of information representative of game play characteristics and other data of players and their associated characters.

For example, through an API exposed by a game, the system may retrieve information pertaining to the types of characters associated with a player and certain attributes of those players, such as character levels, experience points, attributes, the rate at which this information changes, the players and characters that the player plays with, the types of monsters or characters with which the player engages in battle, the types of spells or abilities that the player frequently uses for different types of characters, the frequency with which players engage in battle, and so on. As another example, this and other types of information may be determined by intercepting and processing data from video RAM.

As another example, players may provide player preference and demographic information directly, such as the types of players the player wishes to play with, where the player resides, whether the player wishes to play with local players, and so on. Based on an analysis of the aggregated information, the system can, as discussed in further detail herein, determine a player's style of play and skill with respect to different characters, tailor game play or opportunities to meet the player's desired style of play, and types of characters and the types of players that may be matched with the player to enhance the player's overall gaming experience.

In one example, the system first identifies a particular game interaction, such as an exchange between a character and a merchant or a battle between a character and a monster. Furthermore, the system may identify at least one character attribute, such as damage caused, and track the at least one character attribute during the identified game interaction. In some embodiments, the system may also track attributes of a player during game interactions, such as how often the player converses with other players in the game, etc. As the character engages in various game interactions, the system can track various character attributes associated with the character and track the progression of these attributes. For example, the system may store the attribute in a database or other data structure in association with information reflecting changes to the attribute. The system may also store a timestamp for each change indicating when that change occurred. The timestamp may be based on the character's or player's time in game (i.e., how much time the character or player has spent interacting or playing in the game) or real time. In this manner, the system can record a history of the attribute for further analysis, such as the rate at which a character increases in level, ability, etc. Furthermore, the data can be analyzed for trends and statistically significant values, such as a relatively high or low rate of improvement or loss when compared to other characters or players. In this manner, the system can identify certain types of players, such as players whose characters tend to increase in level or experience points at a relatively high or low rate, tend to obtain or lose gold or other currency at a relatively high or low rate, tend to die at a relatively high or low rate, etc. Furthermore, the system may track character attributes of other characters as well and generate one or more rankings for the characters based on the character attributes. Once the system has adequate information about the character and/or a player associated with the character, the system may attempt to identify complementary, for example similar or like-minded characters and/or players or characters or players that otherwise likely enhance the collective gaming experience, and notify the player associated with the character of the identified characters and players.

Figure 6A:
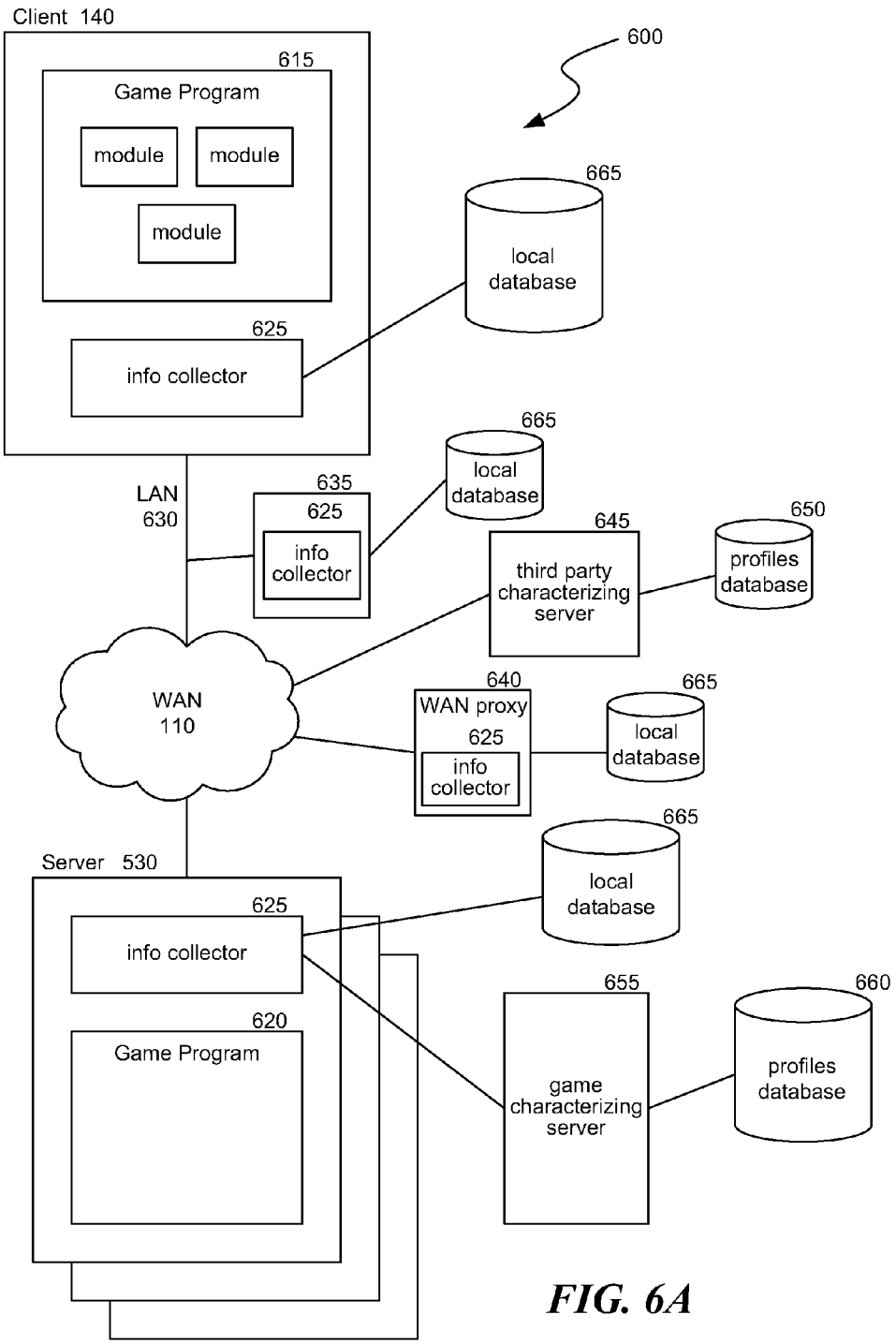
FIG. 6A is a block diagram illustrating various system architectures for the gaming system at FIG. 1A.

Referring to FIG. 6A, details of the game system in some embodiments show that the client 140 includes a game program 615 which executes one or more modules. The game program can include a communications module for exchanging information (e.g., game packets) with the game server 530, a graphical user interface module, a graphics or scenery generator module to generate graphics and imagery in the game, a combat engine module to execute combat commands and provide instructions for displayable results, as well as other modules, such as a physics engine module to represent, in the virtual world, responses to events so that displayed results appear more lifelike. The game program 615 communicates with the game server 530 via the network 110. The game server 530 includes one or more game programs 620. As noted herein, multiple servers, each running one or more game programs, are possible, particularly where each game server and associated game program(s) can run different games, the same game across different zones or geographic regions, the same game across different guilds or groups of affiliated players, and so forth.

In one example, an information collection processor or module 625, such as a packet parser and analyzer, may be used to analyze data from the game, such as the packets 500 exchanged within the system. The information collector analyzes data (e.g., packets or aggregations of packets), to extract certain data to help perform functions described herein. As shown in FIG. 6A, an information collector can be in the server 530, the client device 140, or in other locations, such as on a computer 635 in communication with the client device 140 via a LAN 630. Alternatively or additionally, a module 625 can be on a WAN proxy server 640 coupled to the network 110.

Although the example system is described herein as including an information collection module for collecting information related to game interactions and player characteristics, other methods for collecting such information are contemplated. Other methods may include, for example, reading data structures directly from storage or memory, such as a disk/SSD, RAM, video RAM or other memories. As another example, the system may collect the information from the game program itself via, for example, game program APIs to directly interface with the game program, additional subroutines or functions to access game program variables, databases and other data structures associated with the game program, system states, return values, and other game information. As another example, the system may intercept interprocess communications related to game interactions. Once the information has been collected, the system can then aggregate this information (e.g., locally, at a remote server, etc.) for further processing to characterize players and identify other aspects or statistics related to player gameplay, such as how the player compares to other players, how the player's gameplay has changed over time, etc. These characterizations, statistics, and aspects may, for example, be used to identify similar types of players, players with more skill, player playstyles, and other information as further described herein.

In some embodiments, regardless of where the information collection module may be located, it is coupled to a local database 665, and stores data captured and aggregated by the module. Each of the information gathering modules intercepts data (e.g. packets) to extract data and provides the extracted data to a characterizing server 655 associated with the game server 530. A characterizing server determines the play characteristics of a player based on, for example, that player's interactions with one or more games. Information representative of those interactions is captured, for example, from game packet information, RAM, video RAM, information exposed through an API provided by a game, interprocess communications, data structures maintained by the game, function calls to the game or associated software, etc. Once collected, the information may be aggregated and provided to a characterizing server for analysis. A characterizing server may include components, modules, and data structures for storing captured and aggregated information and analyzing the information to develop a profile for players and/or characters. Alternatively or additionally, a third party characterizing server 645 may receive the aggregated packets or data extracted from the packets, where the third party characterizing server is coupled to the client device 140 and server 530 via the network 110. Furthermore, the game program 615 running on the client 105 may include a characterizing module (not shown) to locally analyze or pre-process captured information and provide the results of such analysis or pre-processing to the network. In this manner, the load on game servers is reduced as they are not responsible for analyzing all of the captured game information. In this alternative, the parser module performs local analysis before shipping logs of its analysis to, for example, the third party characterizing server 645 or the game characterizing server 655.

Indeed, aspects of the player characterization process described herein may be performed and distributed among various components within the system. For example, the characterizing module on the client device 105 may do some initial or even all analysis and data aggregation, such as by omitting redundant data and populating a data structure related to the gaming interactions representative of, for example, the state of the game or a character, such as a log file, which can then be sent to the third party characterizing server or the game characterizing server for further analysis. Such data may be stored in the local database 665. Such local databases 665 may include raw or partially processed data, and the third party characterizing server 645 and game characterizing server 655 may store more refined, manipulated or fully analyzed data in the profiles database 650 and 660, respectively. Of course, it is possible that the fully-refined data is generated at and stored at the client device 140, and the player may have the option of whether to post or forward on such information. For example, if the client device determines a type or category for a player (e.g., crafter, grinder, etc.) based on a local analysis of that player's gameplay, the player can determine whether he agrees with that determination, and if so, send an indication of the determination to a characterizing server for storage. Alternatively, the player may be able to change or adjust that characterization to better suit that player and provide better matches with other players on the network. In some embodiments, some or all classification and analysis is performed at and stored at the local client device and users control the use and release of their own information as further described herein. For example, the characterizing server 645 and/or 655 may be implemented as a local client or node module that processes and analyzes data collected to identify and determine user, character, and/or item classifications and other information as further described herein. The profiles database 650 and/or 660 could also be stored and controlled at the local client or individual nodes rather than over the network. Game publishers, other users, various programs, or other applications may access this data in a controlled manner via standard APIs or other means according to privacy preferences and/or other constraints set by the player to govern this information release and use. For example, in some embodiments, players may make some or all of their activity data, item data, metadata, classification information, and other information described herein available to other players or to game applications, for example to facilitate matching. When looking for a group or an activity partner or other similar individual(s), the player may make their information available, and matching software, either at the local client or through one or more other third party applications hosted on the network, analyzes this information to determine other suitable matches based on similar information provided by other users. A user could also implement one or more policies or rules indicating that some subset of or all of their information should be made available automatically to certain types of requestors, such as applications of a certain type (e.g.—fantasy MMOGs), applications created by a certain publisher, users of a certain type or classification or satisfying certain criteria, etc. Different policies could be associated with and used for release of information to different types of requestors. Thus, users in such a node-based or distributed system have the ability to "opt-in" on a case-by-case basis with respect to specific uses, applications, etc. or control release of their information via a policy or rules based system regarding use of their data for classification and other purposes as described herein.

In one example, the module 625 in the client device 105 may capture raw data (e.g.—by polling every two seconds or otherwise periodically sampling for the location of the player's character), every action the player takes, and every button pressed, as well as all chat communication. The analysis module can distill captured data before sending it out over the network. For example, if the player's character generally does not change location by a certain percentage or within a certain radius over a certain period of time, no further location data may be sent since the player's character has been in the same location for a certain period of time. As noted above, rather than provide precise coordinates, the module can track movement within zones defined on the map to help provide a less granular representation of the character's movement. In some examples, the system may allow a player to opt-in or opt-out of the collection of any of the information or characteristics described herein, such as the player's movement throughout a world or the player's associations with other players. For example, a player may allow the system to track the player's success in battles but not allow the system to monitor which players that player competes or completes quests with.

Figure 6B:
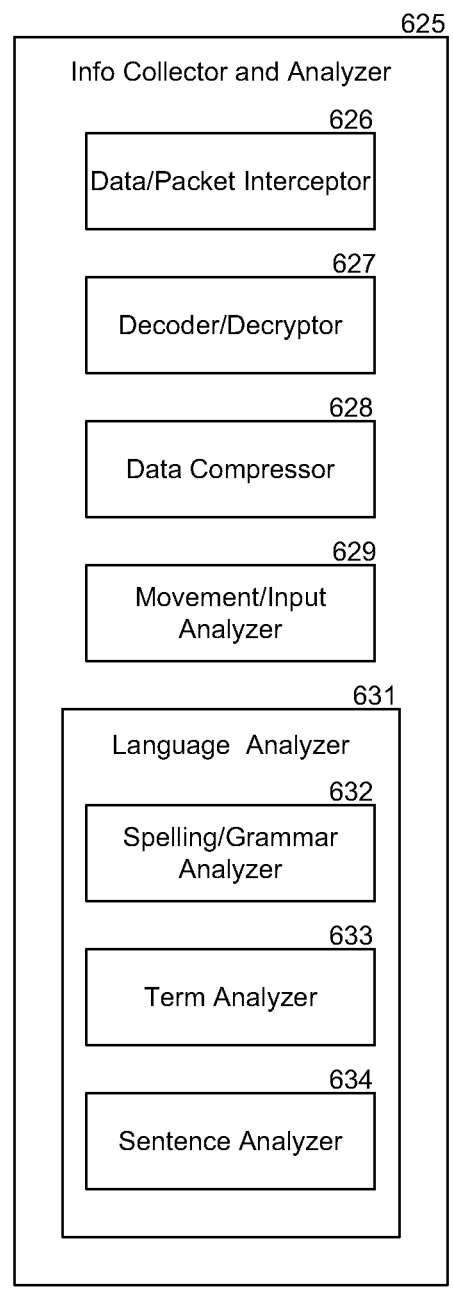
FIG. 6B is a block diagram illustrating an example of a packet parser and analyzer.

Referring to FIG. 6B, an example of the information collector module 625 is shown as including a data/packet interceptor 626. The data/packet interceptor 626 receives data, e.g., packets, in the stream of communication, and helps identify data to be analyzed versus that/those to ignore. A decoder/decrypter 627 can decode or decrypt received data, if the data is encoded or encrypted. As explained below, alternatives are possible, such as accessing already decoded data directly from memory. Although various components are shown as comprising a data/information collector and analyzer, one skilled in the art will understand that any or all of these components may exist independently of a data/information collector and analyzer. Furthermore, these components may analyze data collected from sources other than packets, such as RAM, video RAM, information exposed through an API provided by a game, interprocess communications, data structures maintained by the game, data structures maintained by the game, function calls to the game, game server, or associated software, etc.

A data compressor 628 may analyze data (e.g., multiple packets, or aggregations of data) to eliminate redundancies and analyze or process only that data that include significant differences. In some embodiments, the system analyzes only a subset of data collected, for example data exceeding a certain threshold or satisfying certain criteria, such as movement data beyond a threshold or communication content satisfying certain criteria. For example, as noted above, if a character stays within a given location, and thus the coordinates of that character do not vary beyond a threshold, then the data compressor 628 may not send out subsequent packets or portions of such packets representing no change in movement. However, if the character is in a tavern and communicating with multiple other characters, then all of the chat or other communications would be included or, in some cases, only certain relevant content of the communications included. Thus, in some embodiments, the system performs differing analysis based on differing locations or contexts. For example, the system identifies a first user or character at first location and performs one or more first actions based at least in part on the first location and identifies a second user or character at second location and performs one or more second different actions based at least in part on the second location. The first and second user may be different users or they may be the same user. Exemplary actions performed include classifying or otherwise determining user or character characteristics, performing user matching, or other functions as described herein. However, even such chat could be compressed to delete pronouns, articles, and commonly used terms, which would not be forwarded on to a language analyzer 631, described herein.

A movement/input analyzer 629 may analyze certain portions of received data (e.g. each packet) that deal with movement of the character or inputs made by the player. For example, the movement/input analyzer 629 may analyze data to determine that the character is at a location for many minutes, is spending time changing items and inventory or repeatedly doing the same series of inputs, and so on. As a result, the movement/input analyzer 629 can make an estimate that the player is, for example, trading items at an auction/store or creating arrows. Alternatively, the user may be in roughly the same location, but providing multiple inputs corresponding to battle. Thus, the movement/input analyzer understands that the player is engaged in combat.

Thus, the movement/input analyzer 629 can help determine the characteristics of the player, such as whether the player spends many sessions crafting, versus a player who spends much of his time fighting, while another player spends much of his time exploring the virtual world. The movement/input analyzer 629 can analyze data for a session, such as a two to six-hour session, and then generate a player characteristic or condensed log file for that session to help the system (characterizing server) determine the play characteristics for that player. Thus, as noted above, if the movement/input analyzer 629, when analyzing data, determines that the player's character moved around the virtual world during that session, but engaged in little combat, and stayed for no more than a few minutes at any one location, then the movement/input analyzer may characterize the player as an explorer, and provide such characterization to the characterizing server. The movement/input analyzer may also analyze distances traveled, locations visited and frequency of visits, whether the locations visited are new or repeated, etc. The movement/input analyzer 629 can compare data or averages of data, to player averages within that virtual world across all players. So, if, during a four-hour session, most players visited only two to three zones, but the current player visited eight, the system would again characterize the player as an explorer. As another example, if the movement/input analyzer determines that a player uses a character to perform repetitive actions and increases a particular attribute or characteristic at a higher rate than average, the player may be deemed a grinder.

In some embodiments, the information collector and analyzer 625 may also include a language analyzer 631, that includes a spelling/grammar analyzer 632, a term analyzer 633, and a sentence analyzer 634. The components of the language analyzer may analyze spoken and/or written language. The spelling/grammar analyzer 632 can analyze the spelling or grammar used by players to determine whether a player often misspells words or uses nonstandard grammar, because such players may often wish to play with other players that share the same vernacular or lexicon. For example, some players may wish to play with other players who spell 90% or more of their words correctly, whereas others may frequently use contractions, texting abbreviations (e.g., "LOL" for laugh out loud or "UR" for you are).

The term analyzer 633 can analyze given terms in the text communications to identify profanity, racist, homophobic, or other derogatory terminology, or other potentially offensive language. These players should be segregated from children or players who may be offended by such language. Further, the term analyzer 633 may analyze the text communications for elite speak ("I33tspeak"), which is a specialized form of textual communication often used by players who consider themselves highly-skilled or elite (spelled I"33t"). In some cases, players may use I33tspeak solely for comedic effect. Such players may substitute a "0" (zero) for a lowercase o, a "3" for a capital "E", and so forth. Such players who use these terms may wish to play with other players who likewise use similar terminology. The term analyzer may simply also count the number of letters in words used and determine whether a player uses longer, larger words of 10 letters or more, and at a frequency above the average for a given language (e.g., English) and region (e.g., New Jersey), which can help identify a higher educational background, and thus may indicate that the player may wish to play with other players with a similarly high educational background.

While the spelling/grammar analyzer 632 and term analyzer 633 may perform simple comparisons of individual words or short phrases to a stored dictionary, the sentence analyzer 634 may provide a more complex analysis of communications between players. For example, the sentence analyzer 634 may determine whether a player uses short, pithy statements, or longer descriptive sentences. Analysis at the sentence level can help determine cultural and ideological preferences, which again can help provide better matching between players.

More generally, the system may also include an interaction analyzer that tracks social interactions between the player and other characters in the game. In general, the system can characterize user behavior within electronic games, virtual worlds or other online endeavors by obtaining data regarding a user's communications within the game/world/endeavor. The system, from the obtained data, analyzes thresholds and other quantifiable or other information regarding word choice, word length, sentence length, grammar/spelling errors, number of different players communicated with, and/or other data described herein, and therefrom, determines a character profile for the user based on that analysis. For example, the system may track the number of separate social interactions, such as conversations, that the player has over a particular period of time. The system could aggregate and analyze the collected information and classify players as "social" or "non-social" and notify the players of any players who are similarly interested in the social aspects of the game. This provides a benefit to both types of players because a non-social player is likely to be annoyed playing with a very social player and vice versa.

While the various components 626 through 634 are shown as part of the module 625, some or all of these functions may be distributed among components within the system 600. For example, the language analyzer 631 and movement/input analyzer 629 may be in the server 530, with the balance of the components in the module of the client device 140 or computer 635 or 640. Similarly, the game characterizing server/module 655 as well as the information collection module 625 and other modules can also be located on the game server 530 or at other locations in the system. Where particular components are located may depend on bandwidth, latency, and other factors. For example, it may be preferable to have most or all of the functions of the information collection module and analyzer within the gaming server 530, which can result in some of the lowest latency (since numerous packets or information need not be exchanged between the client and server), and which result in a much more real-time gaming experience with the player. As noted above, components can be located within any network component, distributed among components. Indeed, as noted above, a different architecture may also be employed, such as a peer-to-peer architecture. Further, while characterizing servers 645 and 655 are shown as separate devices, the characterizing server functionality can be performed at the client device 140. Much of the architecture may depend upon certain gameplay issues such as latency, security, etc.

If the data is encrypted or otherwise secured, or if ease in processing demands such, the client device 140 may, for example, access data described herein not in its received or raw form, but after the data has been processed by the game program 615, or as inputs to the game program are received by the player. Such data may be stored in RAM, and thus, rather than employing information collection module, the movement/input analyzer and language analyzer functionality may be employed to directly analyze data stored in memory of the client device 140. Alternatively or additionally, such movement/input analyzer functionality, language analyzer functionality, or other functionality described herein may access memory on a video card of the client device 140. In these instances, the raw data itself is accessed and analyzed, before or after it has been packetized.

Figure 6C:
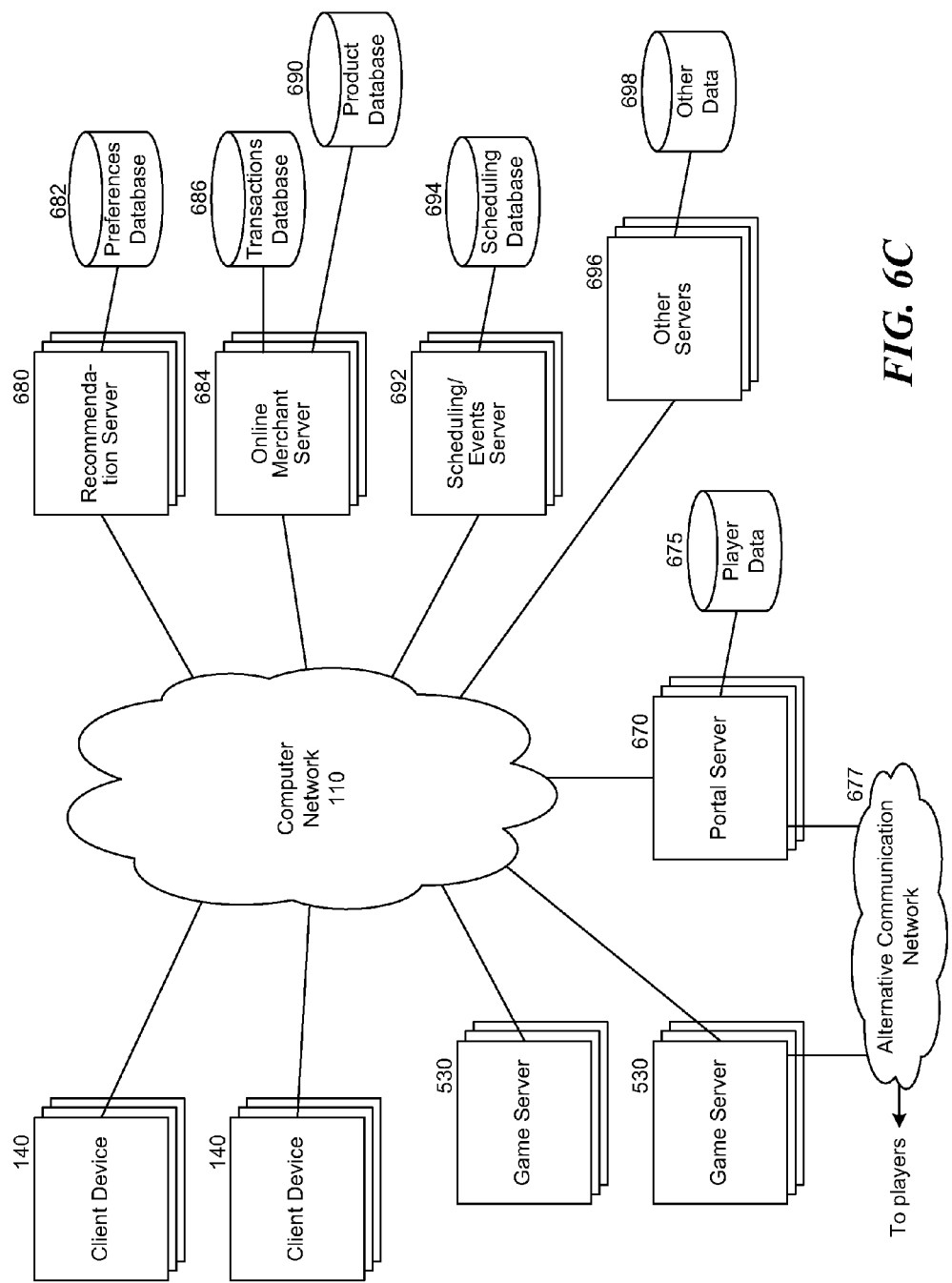
FIG. 6C is a block diagram illustrating use of a portal server and access to additional online resources.

Referring to FIG. 6C, an alternative system configuration is shown where multiple client devices 140 are again coupled to multiple game servers 530 via a computer network 110. However, in this example, a portal server 670 helps coordinate communications between the client devices and the game servers. The portal server 670 can coordinate communications between client devices and different game servers 530 operated by multiple different companies, between client devices and game serves 530 of the same company, or combinations thereof. The portal server can be a game portal that helps match players and their client devices with appropriate game servers, where the game servers may be operated or hosted by different companies or organizations. Thus, the portal server may include a player data database 675 that includes information similar to the profiles databases 650 and/or 660 of FIG. 6A. As explained herein, the game server helps to identify quests, games or virtual worlds for players or advertisements or product recommendations to be displayed or presented to a player. The game server can communicate these suggestions to the players via the network 110 and client devices 140, such as via chat or other communication methods provided in a game.

Alternatively or additionally, the portal server or other communications module can communicate with players via an alternative communication network 677, such as via SMS, MMS or other, similar messaging, via instant messaging, via voice messaging, facsimile, postal mail, broadcast or cable television, or other forms of communication. Thus, the alternative communication network 677 can include standard telephone or circuit-switched networks, cable television distribution network, wireless or cellular telephone network, and so forth. As shown, the portal server 670 may likewise communicate with players via the alternate communication network 677, and in this example, the portal server may take a more active or direct role in communicating with players to notify them of new games, new quests in games, new parties to join, and so forth, where such games need not be tied to a particular network location, games manufacturer/distributor, and so forth. The portal server (or game server) can provide communications to the player via other devices, such as to a smart phone or office computer via e-mail, by, for example, sending an e-mail to an e-mail server associated with other devices associated with the player (e.g. "non-gaming devices").

A portal server 670 can also help provide additional services to players, where such services are provided by other online resources. For example, the portal server 670 may work with a recommendations server 680 and preferences database 682 to provide improved recommendations or preferences to players. For example, the portal server 670 may gather player characterizing data described herein and provide it to the recommendation server to receive therefrom additional data to help in characterizing and/or matching the players or providing recommendations to the players. Thus, in this example, the portal server may provide questions to the players regarding favorite books, movies, music, television shows, or other games, and provide such input to the recommendation server 680, which in turn can provide data regarding other games, themes or media which the player may be interested in.

The portal server 670 can work with online merchant servers 684 to help suggest goods or services to players based on a player characterizing information gathered and analyzed, as described herein. The online merchant server 684 may be coupled to a products database 690 and transactions database 686. The online merchant server can include, for example, an auction or sale site for selling virtual objects or digital goods found, acquired or won in games.

As shown herein, the system can suggest games or quests to a player, but may not have information regarding the player's availability. For example, the system may call, email, text, send an in-game message, or contact the player by some other means. Therefore, the portal server 670 may communicate with a scheduling/event server 692 (and associated scheduling database 694), to determine availability of the player or to access data regarding upcoming games or events. Further, the portal server 670 can access data in the scheduling database 694 to provide recommendations to the player regarding upcoming events unrelated to a game, such as movie openings that may correspond to the player's preferences, conventions related to a player's interest, and so forth.

The portal server 670 may communicate with other servers 696 and other data 698. For example, one of the other servers can be an advertising server that provides advertising to the players either in a game or outside of a game. As explained below, the portal server may permit a player's characters to move between games and virtual worlds, even temporarily, without losing experience, equipment or other character statistics or possessions. The system may allow a player to opt-in to receive information or notices, such as advertisements or other promotional materials, related to products that are of interest to players with similar characteristics or purchased by other, similar players (via links and exchange of information with ecommerce sites/servers). If a particular quest, location, item, product or service becomes popular to a particular demographic, the system may advertise the product or service to members of that target demographic.

Furthermore, the system can aggregate players based on the determined classifications described herein, and offer selected offerings for products or services targeted to those aggregated players. Thus, for example, the system may identify a set of players characterized as explorers living in the New York City area, all of whom are playing an online game, and all of whom are in a level or zone having a jungle theme. The system can then offer to that identified set of players a discounted trip to visit the Amazon rain forest, together with discounted round-trip airfare from the New York City area, hotels, excursions and other offerings. The system, after having characterized players, can simply identify products and services, obtain bulk discounts to those products/services, and then offer those bulk discounts to certain sets of characterized players who would more likely than not be interested in these discounts. In some embodiments as further described herein, users/players may maintain their characterization information at their local client or another location to which they control access, thereby enabling them to control release of their information to such commerce or advertising software or networks. Thus, via an API or other means, a user may elect to allow a retailer access to some or all of the user's information, for example to receive discounts of interest, offers, and other information from the retailer. A user's purchase history, in addition to user activities and other classification information described herein, may also be stored, for example to improve the user experience, facilitate user classification, improve hardware usage, etc.

Alternatively or additionally, the portal server 670 may allow a player who has acquired gold, virtual currency or other points or items in a game or other online endeavor, for example via certain in-game achievements or experiences, to exchange it/them for real-world items, such as for pizza or other food, dollar credits to be used to purchase items at an online store (such as Amazon.com), to download other games or levels for games, etc. A player could thus pay for a tangible or physical real-world item using gold earned in-game or could exchange a favored item, for example a magic sword or piece of armor, for real world items.

The system described herein can also provide product recommendations for players. The system can access not only player data as described herein, but also other player behavior information and recommend products to players based on other products that similar players have purchased or liked. For example, the system can recommend to a grinder-type player certain music, movies, other games, or any products or services that a similar grinder-type player has purchased and/or enjoyed. Moreover, the system can provide an interface to a commerce engine to promote products for certain types of players, and even provide product placement for those products. For example, the system may recommend to an explorer-type player that he may be interested in a subscription to National Geographic magazine, whereas a player who often likes to drive vehicles in the game may be recommended an off-road automobile magazine. For example, energy drinks may be advertised in a game to a power player, whereas particular brands of tea may be recommended to an explorer-type player.

The player characterizations described herein provide a more detailed behavioral understanding of consumers beyond typical demographic data gathered by marketing data collection sites. As a result, the system can provide much more accurate targeting of products to players. This information can be reported to online advertising sites such as DoubleClick, to further drive more targeted and relevant advertising to players. By employing user identifiers such as cookies or "web bugs" linked to unique user IDs for each player, a player's online behavior can be matched to in-game behavior, which may further enhance the characterization of the player described herein, as well as the targeting of advertising to that player through online ads, product recommendations, and so forth.

The system can cross-reference data obtained and characterizations made for a player with other information about that player to thereby provide a richer experience for the user in other online activities. For example, the system may ask a player for permission to cross-reference data obtained during a game with a user's Amazon.com account. As described herein, this data may be stored at the local client and release controlled by the user, or stored elsewhere on the network. By comparing data obtained through game play with data obtained through shopping behaviors at online shopping sites such as Amazon.com, both the game and the shopping site may provide better recommendations to the user. If, for example, a fellow player having similar characteristics as the user purchased certain products at Amazon.com, then Amazon might likewise suggest those products to the user. In other words, rather than having two separate recommendations engines, the user can be provided with a richer experience in both the game and the online shopping experience (as well as other online endeavors), if the data from the two were merged or shared. A user may wish to enhance both experiences by allowing the sites to share data among them.

Profile Data Structure

Figure 7:
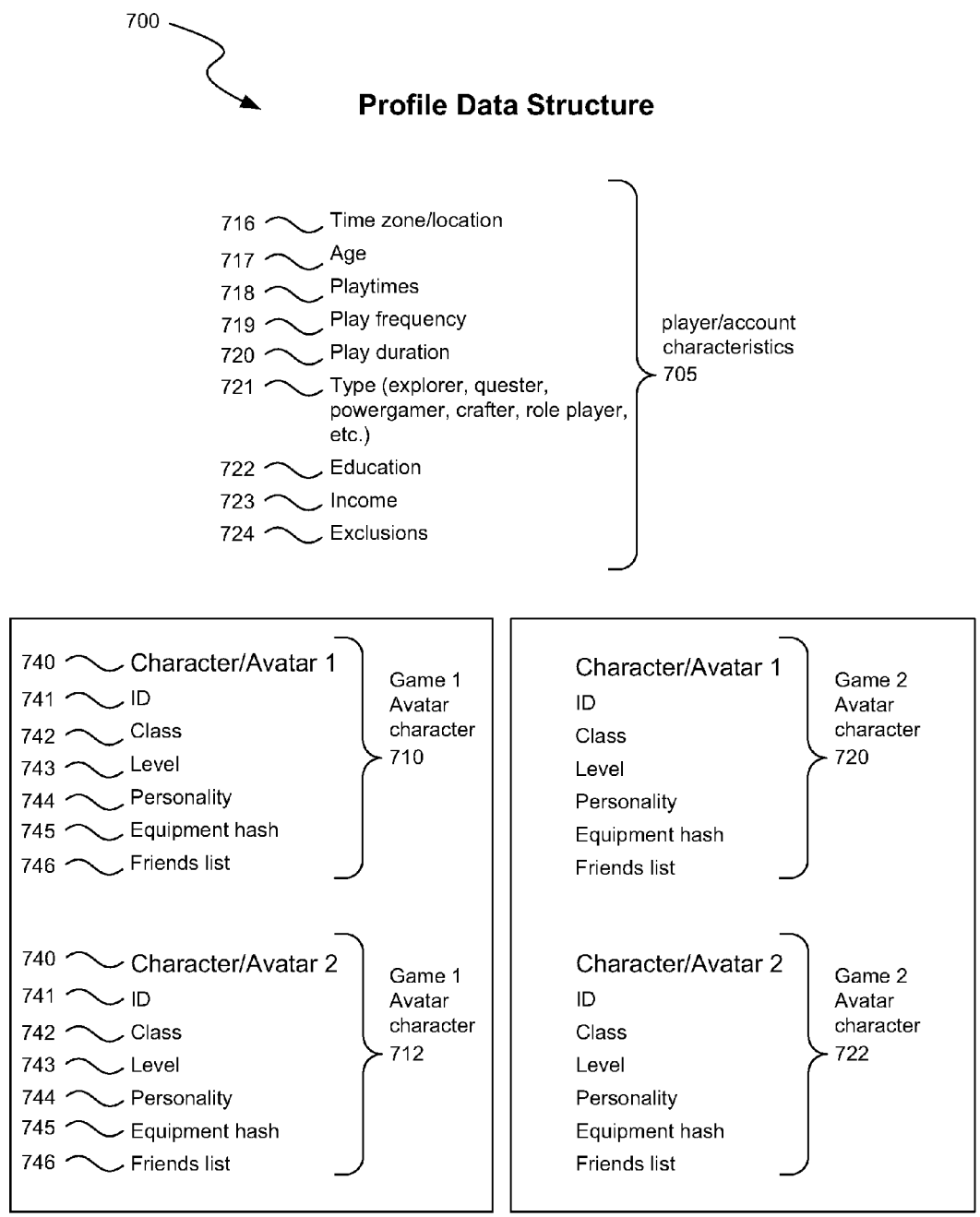
FIG. 7 is an example of a profile data structure for recording and managing player and character data.

Referring to FIG. 7, an example of a data structure 700 includes player/account characteristics 705 and one or more game or activity elements, e.g., character avatar or character data elements 710, 712, 720 and 722, purchase history (not shown), or other activity history or information described herein. The profile data structure 700 can be stored at various locations, such as in the player data database 675, the profiles database 660 of the server 530, or the profiles database 650 of the third party characterizing server 645. Further, the data structure 700 may, in an alternative example, be stored on the client device 140. Further, the profile data structure can be stored in multiple different locations, or distributed among the locations. Information stored in a data structure 700 may be personal, such as age, education, income, etc. or game-specific, such as character personality information, game server information, etc.

The player/account characteristics 705 generally has a 1:1 mapping to the player, whereas each player may have one or more identifiers or personas or characters for one or more games or activities. The player/account characteristics 705 can include network or device information, such as an IP address for the client device 140, or other identifying client device information. The player/account characteristics 705 can include information that would rarely change for the player, such as a time zone or location 716 in which the player is located, the player's birth date (from which age 717 may be determined), and other information regarding the player, such as the player's gender, race, nationality or sexual preference. The player/account characteristics 705 can include information regarding gameplay habits for the player, such as typical play time 718 during which the player typically plays online games, a play frequency 719, indicating which days of the week the player plays or how often each month the player plays, and a play duration 720, indicating how often the player will typically play during a given session, such as 30 minutes, six hours, etc. In some embodiments, some or all of this information may also or alternatively be stored in one or more data structures associated with various games or activities engaged in or with characters or avatars controlled by the user. For example, a player may spend more time per session playing a World War strategy game than a fantasy-themed game, and thus the data structure can track both.

Further, a type data field or element 721 can indicate the type of player, which is a rough characterization of the player's gaming tendencies. This information may be player specific and stored as an association for the user generally and/or it may be game/activity/character specific and also associated with particular games/activities engaged in and/or characters played by the user. Examples include an explorer (someone who likes to visit multiple locations within a game), quester (someone who likes to solve or achieve quests to gain experience points, gold or items), a power gamer (who likes to battle monsters frequently and gain levels), a crafter (someone who creates, fixes or improves items), a socializer (someone who enjoys engaging in social interactions with other players), or a role-player (someone who likes to stay in an appropriate role associated with the game and interact with other players). As another example, player types may be based on preferred weapons or other abilities, such as melee weapons, crossbows, traps, attack spells, and so on. As described herein, while the profile data structure may only associate a single type to each player, most players enjoy some combination of these and other types, and thus the types may be in order from most preferred to least preferred, or have percentages associated with each type. For example, a given player may be 50 percent quester, 20 percent explorer and 10 percent power gamer.

The player/account characteristics 705 can include other information regarding the player, as noted herein, such as an educational level 722, income bracket 723 and/or exclusion 724, which can indicate certain characteristics or traits that the player wishes to avoid (e.g. anyone from work or has a domain name associated with the player's employer). Additionally, the system may allow a player to exclude specific players or other players associated with that player. For example, if player A has had a bad experience with player B, player A may list or identify player B as an "excluded player" so that the system does not match player A with player B. Furthermore, player A may select to exclude any of player B's friends so that player A is not matched with player B's friends or associates. In some embodiments, friends of player A or other individuals authorized by player A may access or otherwise inherit player A's exclusion/inclusion/friend list, notes or information kept by player A regarding other players, or other filters (chat, etc.) or similar settings. Some or all of this information could be used by such friends or other authorized individuals to create or add to their own lists, notes or information on other players, account filters, and other settings. Thus, in some embodiments, a first user generates information regarding other users, for example an inclusion or exclusion list, notes regarding other players, etc. This information is stored in a first data structure associated with the first user. A second user, authorized by the first user, accesses the first data structure and second data structure associated with the second user is created or updated with some or all of the information contained in the first data structure. Users therefore can learn from the benefit of their friend's experiences interacting with other players among other advantages. Users may also may also allow or otherwise permit inheritance of permissions for friends of friends and other social contacts. Similarly, users may also benefit from the virtual and real world experience(s) of friends and friends of friends by viewing or otherwise accessing recommendations regarding game quests, other players, shopping, dining, tourism attractions, lodging, etc. The player/account characteristics 705 may also include information on the account's subscription type. For example, a game may provide subscription tiers at different prices, with additional features and benefits offered to accounts subscribed to a higher tier.

Each player may have one or more avatars/characters/personas/identifiers/aspects in one or more games or activities. In the data structure 700 of FIG. 7, four characters are associated with the player, two characters 710 and 712 associated with a Game 1, and two characters 720 and 722 associated with a Game 2. Each of these characters is defined by multiple data elements, such as a name 740, identifier 741, class 742, level 743, personality 744 (which in some games may be an alignment, guild association, or other affiliation or trait), equipment hash 745, friends list 746 or other data element. The equipment hash is an algorithmically generated number or other variable, described in detail below, that takes or assigns a value to each piece of equipment in the character's inventory and generates a resulting composite number/variable for all items in inventory. The equipment hash may be a unique number, but may be more simply the addition of all parts associated with each piece of equipment. Thus, plate mail armor may be worth 10 points, and if magically enhanced with a plus two value, it would be worth 12 points, a battle axe may be worth eight points, with an additional three points for fire damage it provides, and a ring that provides 20 percent acid resistance is worth four points, for a total of 27 points. In some embodiments, this information is used as a threshold to identify matches, classify players, qualify or disqualify users from certain experiences, and for other similar purposes further described herein.

A friend list 746 (and/or an exclusion list) may simply be a list of character names, user names, or other identifiers for players or characters with whom the character has interacted or played with in the past. A friends list or exclusion list may be game-based (e.g., a list of players or characters with whom a player has interacted within a particular game) or "global" (e.g., a list of players with whom a particular player may interact with outside of the gaming environment). In this manner, a player may be notified of any of their friends who are online, regardless of the game or activity in which their friends are engaging. Data structure 700 may also include additional information specific to the particular game. For example, the data structure may store an identification of a server, which may represent a URL or other network address for the game server 530, or the portal server 670 or an indication of a game subscription type (e.g., yearly, month to month, etc.) associated with a player or character.

Alternatively or additionally, the friend list 746 may also include links to social networking profiles, such as those on Facebook, to thereby permit the system to access lists of friends on these social networks. As a result, the system can not only generate lists of friends within the system, but access data regarding additional friends, external to the system, via these social networking sites. As a result, the system has access to all fields and other data provided by such sites, such as affiliations, occupations, interests, etc. Information such as religious affiliation, nationality, ethnicity, foreign languages spoken or understood, native languages, students of certain languages, etc. may be obtained. Further, other social network databases may be accessed by the system, such as the World of Warcraft finder or other game/activity finder databases that may exist now or arise later.

The system can provide weighting to an inclusion or affinity list, such as a friends list, for example so that the system will more likely match the player with someone else who may be on the player's social network friends list, rather than another person who is not on that list. Likewise, the system can match the player with someone who has a first-order or direct connection with a person on an external friends or contacts list, rather than someone who is two or more orders removed, or provide decreased weightings as a potential match for the player is more and more removed from the player's circle of contacts/friends. Thus, in some embodiments, the system associates with a first user a first data structure associating a first set of users with one or more identifiers. For example, a user could be identified as a friend, as a family member, as a friend of a friend, as a co-worker, as a classmate, as an enemy, as an individual the user does not like, etc. The system also associates at least a second user, the second user being a user identified in the first data structure, with a second data structure associating a second set of users with one or more other identifiers. When performing matching or other classification based activities related to the first user, the system accesses the second data structure, and increases (or decreases) the likelihood of matching or classifying the first user with one or more users in the second set of users in the second data structure. For example, if a user in the second set of users is identified as a friend (of a friend identified in the first data set), then the system might increase the likelihood of matching the first player with that user by 50% (versus the average player). If a user in the second set of users is identified as a friend (of a family member identified in the first data set), then the system might increase the likelihood of matching the first player with that user by 75% (versus the average player). Of if the user is an enemy (or part of an exclusion list, or otherwise disliked, etc.) of a friend in the first data set, then the user might have their matching threshold lowered relative to the first user or entirely excluded.

A profile data structure 700 in FIG. 7 is only an example. Alternative or additional data elements or fields may also be included. For example, the profile data structure 700 may store data on individual characteristics or attributes of the character (e.g., strength, wisdom, etc.), individual quests, activities, or tasks that the character has accepted and whether those quests are in progress or completed, the amount of time it took to complete each quest, other characters with whom the quest was completed, and information on any customization of the character's current or prior appearance (e.g., hair color, hair style, body size, etc.). Additionally, the profile data structure may store a metric or other indication of various "efficiencies" associated with a character, such as how effectively a player uses spells or items or how often a player inefficiently uses spells or items. For example, if the player has the ability to cast a spell that recovers 500 hit points but often uses it on characters who are only 300 hit points below maximum, the player may be considered less efficient than a player who always uses the spell on characters who are 400 hit points or more below maximum.

The system may also provide different user interfaces, different levels or even different games based on the characteristics determined for each player. Thus, a pre-teen girl may receive a user interface with bright colors, animal themes, and easy to manipulate controls, with few options, which simplifies the experience, and may make it more customizable for that demographic. Thus, fewer options than those shown in FIG. 7 and described herein are provided. In contrast, a 30-40 year old male with an advanced business degree may receive a user interface that uses a much more subdued color set, uses well known user interface tools common with word processing/spreadsheet/database applications, and that provides more options, so that players in this demographic have much more flexibility and options to customize his gaming experience. Thus, all of the options shown in FIG. 7 and described, as well as others, could be provided.

Match Preferences GUI

Figure 8:
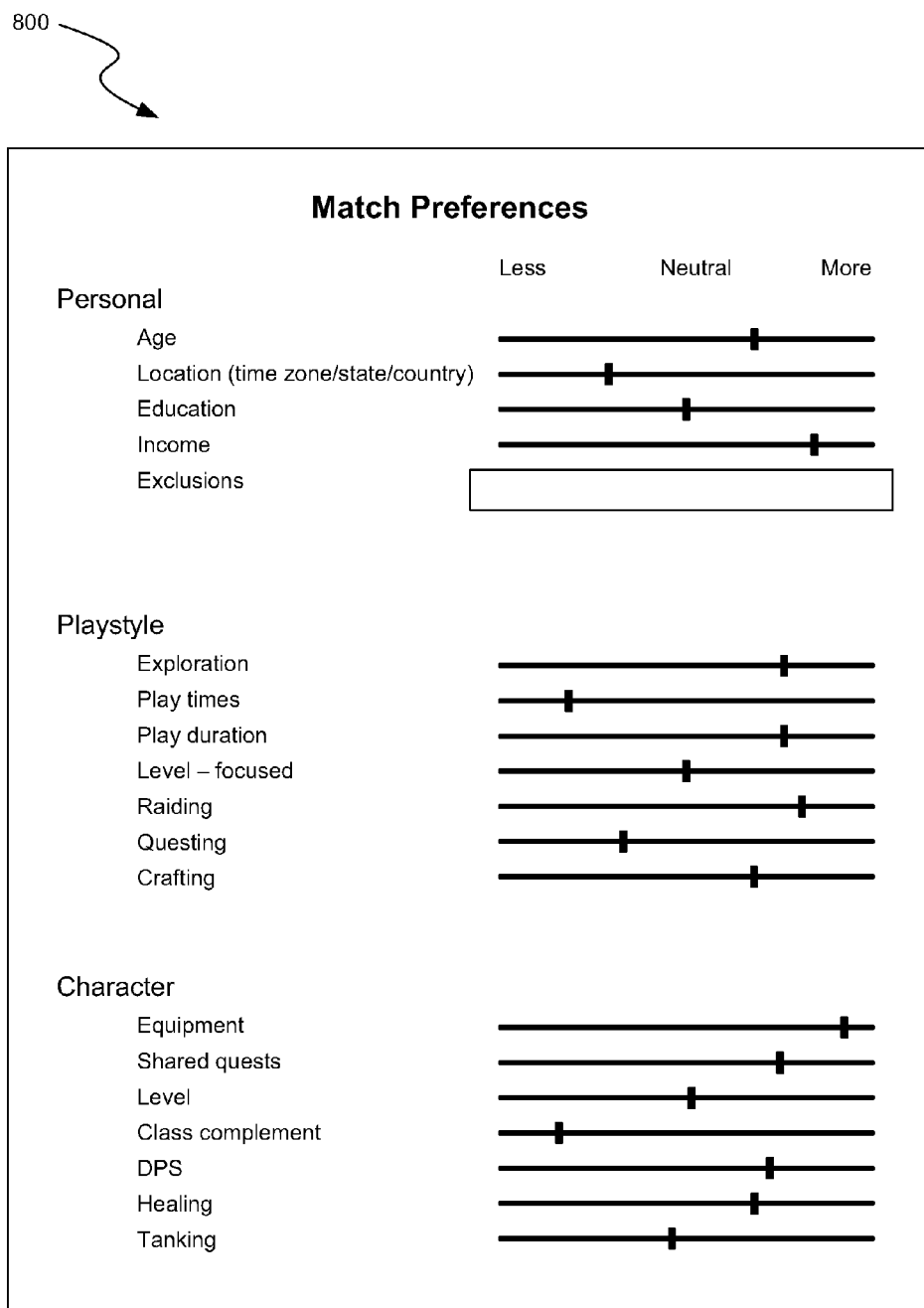
FIG. 8 is an example of a user interface to permit a player to provide personal gameplay preferences.

Referring to FIG. 8, an example of a user interface or a screen 800 is shown that allows the player to input his preferences, and which the system uses to calculate, determine, and provide improved matches for other players with whom the system predicts or otherwise calculates or determines would provide an enjoyable gaming experience for the players. As shown, the screen 800 includes multiple user interface elements, such as sliders that allow the player to indicate a degree of or level of preference, for example, between "Less," "Neutral," and "More" for particular characteristics. For example, a player who is not concerned with the age of the players she plays with may move the "Age" slider closer to the "Less" end of the spectrum. As another example, a player who has a strong preference for playing with other players of a certain level of education may move the "Education" slider to the "More" end of the spectrum and specify a preferred level of education. Alternatively, the system may by default assume that the player's preferred level of education is equivalent or approximately equivalent to the player's level of education. Other examples may include political views, with this slider ranging between liberal and conservative. In a Personal section, which includes, for example, certain biographical information, the player can indicate the importance of age to the player in playing with fellow players. Likewise, the player can use the sliders to indicate the importance of location (e.g. time zone, zip code/city/state/country), as well as educational level or income. The personal section can also include an exclusion section that allows the player to enter text or other information to indicate exclusionary criteria, such as types of other players that the player wishes not to play with, domains, network addresses, geography, political views, play styles, guilds, etc. These can also include the user names or character names of players that the player has previously not enjoyed playing with. In some embodiments, the system receives user input or otherwise determines that a first user is not compatible with at least a first character of a second user. Based on this determination, the system excludes on or more other characters (some or all) of the second user from interactions with the first player in some manner. For example, the other characters might be associated with exclusionary criteria with respect to the first player, added to a not friends list of the first player, added to an exclusionary communications filter for the first player such that the first player does not receive communications, such as chat or voice communications, from characters associated with the second user, does not match the first user's characters with characters of the second user, etc. In some embodiments, the system does not identify the other second player characters to the first user and merely associates these characters with exclusionary criteria, for example to preserve anonymity or privacy for the second player's other characters. The system may also prompt a user regarding whether they want to take this step, for example when a user adds a character to an exclusion list, the system queries "Do you want to add all other characters associated with this player to the exclusion list". Thus, by indicating (or having the system determine) a lack of compatibility with a first character a user can avoid interactions with some or all other characters associated with the player of the first character. Generally, any inclusionary criteria tracked may also be used as an exclusionary criterion. The system generally collects and aggregates a robust data set regarding users. This information is algorithmically generated, user supplied, etc., and used to include or exclude characters, experiences, users, provide matches, and for other purposes as further described herein.

The screen 800 also allows the player to indicate how important various play styles are, such as whether the player wishes to play with other players who like exploring, prefer a certain style of combat (e.g., melee, long range crossbow attacks, traps, etc.) play at different play times, for different play durations, are focused on gaining levels, prefer raiding games, questing, or crafting. Further, the screen 800 allows the player to indicate how important various attributes, criteria, and other information associated with character matches are, such as how important a match in equipment is, how important it is to share quests with other players, how important it is to have the same level, how important it is to have a good compliment of classes (e.g., a healer, tank, and DPS), and how important it is to play with each of these individual classes. Of course, alternative or additional preferences can be provided. For example, a player may prefer to have a well-rounded group that includes most basic character classes, and thus may be most effective at achieving most quests. If, for example, the player has a healer character of an appropriate level and temperament, and an existing game has a warrior or "tank" character and a high DPS character, that group would benefit from a healer, and thus the system, as described herein, would recommend to the player to join that group.

In some embodiments, a player may be able to configure separate instances of the user interface for different games, such as different preference interfaces or sections of an interface for different games. For example, in one game a player may have a strong preference for playing with players in a similar age bracket whereas in other games age is not a factor for that player. In some embodiments, users may also implement various preference policies and associate these policies with specific games or activities. Thus, a user may have a first preference policy and a second preference policy, the policies indicating desired matching criteria, exclusionary criteria, etc. The user may elect to associate certain games or activities or certain genres of games (e.g.—fantasy-themed MMOGs) with the first policy and certain other games, activities, or genres of games with the second preference policy. When a user engages in games, activities, or genres associated with the first policy, matching, excluding, or other classifications, etc. are performed using the first policy. Similarly, when a user engages in games, activities, or genres associated with the second policy, matching, excluding, or other classifications, etc. are performed using the second policy. Furthermore, each game may be associated with a different user interface. For example, certain character classes may be removed from the user interface for games that do not include those classes. The system may match players based on weighted characteristics relative to the player's own characteristics. For example, the system may match players based on weighted characteristics relative to characteristics specified by the player, which may or may not be consistent with the player's characteristics. For example, a 20-year-old player may specify that "Age" is a "More" important characteristic but specify a "target" age of 40 years old or older. As another example, a player in one country may specify a strong preference for avoiding players from another country. In some embodiments, the system may use a combination of a player's own characteristics derived by the system or provided by the player as a player's specified characteristics.

Additional Player Preference Gathering

In addition to the screen 800 of FIG. 8, alternative or additional methods of gathering player data directly from the player are possible. For example, when a player first registers with and/or later provides preference information or other information to the portal server 670 or game server 530, the player may be required or encouraged to complete a player preferences screen, such as that shown in FIG. 9. As shown, the player in Section 1 can identify one or more languages that the player speaks or reads, or in Section 2 provide an age/birth date and an address/zip code/neighborhood/city, as well as a gender or sexual preference. In Section 3, the player can identify an educational level and possibly schools attended, while in Section 4 identify ethnicity and faith. In Section 5, the player can identify where he or she grew up, and where he or she considers home. In Section 6, the player can identify one or more vocations, as well as identify one or more hobbies or avocations. In Section 7, the player can identify the type of gamer he or she is or thinks she is, while in Section 8 the player can identify various interests. In some examples, a player may be able to specify an interest for playing with players who "know" their game style, such as a player who identifies themselves as an explorer and who is algorithmically determined by the system to be an explorer, as opposed to a player who self-identifies as a tank but behaves more like a healer. Thus, the system receives input from a first player providing information regarding a characterization or criterion associated with the first player as determined by the first player, compares this information determined by the player with information determined by the system regarding the same characterization or criterion, and based on the degree of similarity (or difference) between the player-determined information and the system-determined information, creates, modifies, and/or associates a confidence level, a self-knowledge level, or other metric with the first player and the characterization or criterion. Based at least in part on this metric, the system performs actions (such as matching, creating positive or negative correlations between, calculating compatability with, etc.) regarding the first player and at least second player. In some embodiments, the system also considers a similar metric associated with the second player in performing these actions.

Section 9 allows the player to identify certain media and other content such as favorite books, favorite movies, favorite television shows, favorite music and/or favorite games. By identifying other media enjoyed by the player, the system may help to provide a better recommendation for other players, since other players who may like the same books, movies, televisions shows, music and/or games may similarly like to play with the player. Such favorite media can be provided as input to recommendations engines or sites noted above. Further, sliders, radio buttons or other input devices or interface widgets may be provided to indicate how each of the items one through nine rank in terms of "Not Important" to "Very Important" to that player.

In some embodiments, a player may also identify the activities, games or types of games or activities that the player prefers to play and an indication of the characters or types of characters or roles that the player prefers to use in each of those games. Moreover, the player may specify preferences for each character. For example, the player may specify that he not only prefers certain fantasy-style games, but also that he prefers to play with explorers when he is using a healer character but prefers to play with grinders when using a DPS character. As another example, a player may specify a preference for playing with players within 5 years of his age when playing a sports game and a preference for playing with younger players when playing an MMORPG.

In general, a player may specify even more generic aspects, criteria, or preferences to help aid in matching. For example, the user may specify that she prefers puzzles to solve, and therefore, the system can suggest games related to mysteries. Further, she may even specify types of puzzles, such as word puzzles, spatial-relation puzzles, etc., which the system may suggest. As another example, a user may specify that he prefers problem-solving, and thus may be recommended under the system described herein not only problem-solving games, but also online events designed to solicit help from a network of individuals (such as social needs or neighborhood collective activities). Thus, the system can solicit and receive more general information from the user related to recreational desires and types of endeavors that the user likes to engage in.

Referring to FIG. 10, following completion of a game session/zone, or after playing for a threshold number of hours with a particular group, the system may provide a game survey to the player. As shown at FIG. 10, the game survey may allow the user to provide input regarding their experience, for example to select between satisfied and very satisfied for answers to a number of questions shown in FIG. 10 in order to provide information related to their gaming experience. Further, the user can provide likes or dislikes about a recent gaming experience in Section 8 and 9. Of course, the game server can include alternative or additional questions.

While not shown, the system can provide an opt-in/opt-out system where the player can affirmatively provide permissions as to whether other players can see some or all that player's data. If so, then players may be able to review profiles of other players to help perform a more manual method of searching for and identifying potentially compatible gaming partners. However, in many other instances, the system can automatically select a likely appropriate fellow player or groups of players with or without indicating why they were selected.

Create Player Data Structure

Figure 11:
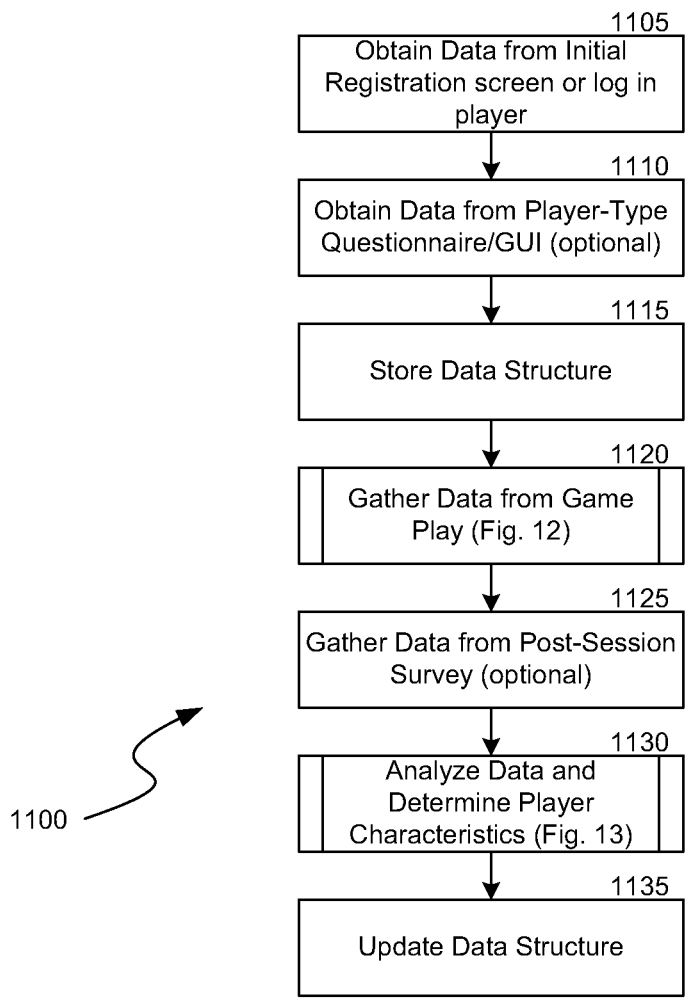
FIG. 11 is a flow diagram illustrating an example of a process for generating a player data structure.

Referring to FIG. 11, a routine 1100 begins in block 1105 where the system creates a player/user record or identifies a player, for example, by obtaining data from an initial registration screen provided to a player or user. The initial registration screen can be provided at the time of registration or at other times and can include basic information such as the game identifier, the player's ID or username, communication methods and electronic addresses for the player (e-mail address, SMS/MMS number, IM handle, etc.), name, password, address, and so forth. In block 1110, the system may obtain data from a questionnaire or GUI provided to the player. Examples of such an optional questionnaire or GUI are described above with respect to FIGS. 8 and 9. In block 1115, the system stores data obtained under blocks 1105 and 1110 in a data structure associated with that player.

In block 1120, the system gathers data from gameplay. As noted above, this can include analyzing data provided by the client device 140. Further details are described herein, and also, for example, below with respect to FIG. 12. In block 1125, the system optionally gathers post-session data, such as from a survey or other information gathering means. Exemplary information gathering means and surveys are described herein and, for example, described above with respect to FIG. 10. In block 1130, the system analyzes data obtained from the player under blocks 1105, 1110 and 1125, together with data gathered during gameplay from block 1120. Further details regarding analysis of such data are provided herein and also, for example, below with respect to FIGS. 13A-13D. Under block 1135, the system updates the data structure associated with the player based on the analysis. While not shown, the routine 1100 can periodically loop back to again obtain further information, such as adjustments to player-entered data under block 1110, and data from further gameplay under blocks 1120 and 1125.

Gathering Gameplay Data

Figure 12:
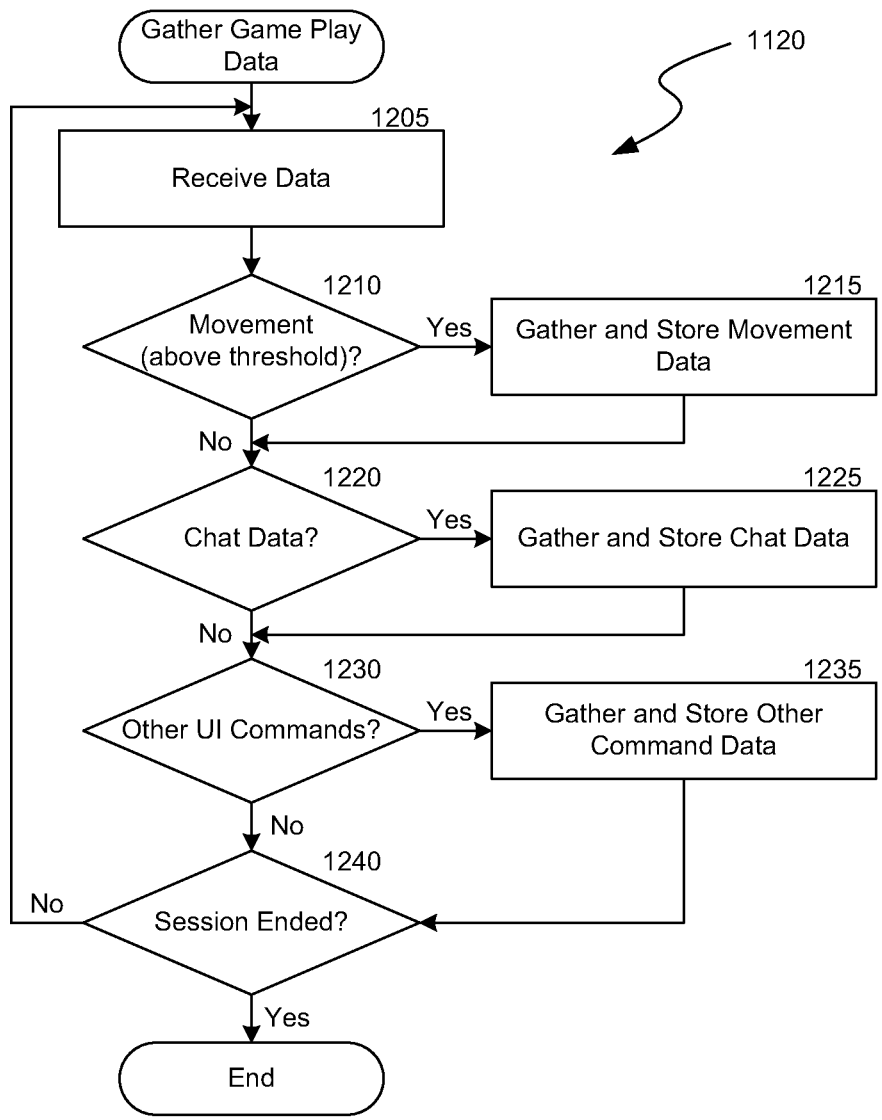
FIG. 12 is a flowchart illustrating an example of a routine for gathering gameplay data.

Referring to FIG. 12, a subroutine 1120 for gathering gameplay data begins in block 1205 where the system receives information regarding the player's game interactions from the player's client device 140 or other networked interactions. In block 1210, the system determines whether the player's character has moved. To avoid too many computations, movement may be required to exceed a threshold, as noted herein. If movement is beyond a threshold (e.g., outside of a predetermined radius, a distance, a Cartesian value, etc.), then the system gathers and stores such movement data under block 1215, including position information, direction and rate of movement. If so, then in block 1215, the system gathers such movement data and stores it for later analysis.

Under block 1220, the system determines whether the collected information includes any chat data. If so, then in block 1225, the system gathers such chat data and stores it for later analysis. As noted herein, the system may filter such data to reduce the amount of data stored, such as reducing articles, pronouns, and possibly even adjectives and adverbs. In block 1230, the system determines whether the player has entered other commands. If so, then in block 1235, the system gathers and stores such further commands. These commands can include "emote" commands, which correspond to a command to the game server to cause the game server to display a particular facial expression or movement for the character. For example, the player may enter "/grin", and in response, the character will display a grin expression. Other commands may be "/bow", "/sit", and "/grimace", and the displayed character will in response bow, sit or grimace, respectively. Other commands can represent any combat commands, selection of equipment, interaction with objects, trading, crafting, etc.

Additionally, as described herein, the system may track metrics associated with the timing of sequences and/or events or metrics associated with a player's gaming interactions to further analyze the player's skill. For example, a player may be deemed skilled in combat if there is a relatively short period between the time the player engages in battle and the time the player defeats a monster or monsters in the battle. In block 1240, the system determines whether the session has ended, and if not, the subroutine loops back to block 1205.
Determine Player Characteristics Referring to FIG. 13A, an exemplary subroutine 1130 begins in block 1305 where the system analyzes the movement data gathered and stored as noted above. For example, as also noted herein, if the player's character moves about the virtual world to more zones than the average player, the system in block 1305 associates points, values, or weights to one or more of multiple player characterizations, such as "explorer". The system may, for example, identify various zones within the virtual world and identify the amount time the player spends in each zone. Alternatively, the system may track the distance traveled throughout the world or each zone or in multiple games, etc. This information may be stored in a player's global profile and/or in game-specific or character-specific profiles. In addition to analyzing the character individually, the system analyzes the movement (and actions) of the character when he is in a group. For example, if the character is not associated with a group, and is frequently moving throughout the virtual world at a rapid rate, then the system may determine that the player prefers to explore when playing alone, but when the character is with a group, recognizes that the character is killing monsters over and over again ("grinding"), and rapidly moving up in levels, and thus the system can provide data or weighting to classify the player as a grinder or power-gamer when in groups or some combination thereof. Thus, the system tracks and periodically updates user behaviors and interactions over time to identify different user classifications specific to a variety of settings and contexts in individual games and across multiple activities.

As described herein, a data structure may track the players' in-game behavior, including average movement per game session, zones visited, and so forth. By identifying, e.g. commonly visited zones, the system can match the player with other players who also like to frequent that zone, thereby providing an enhanced playing experience for both of those players.

Figure 13A:
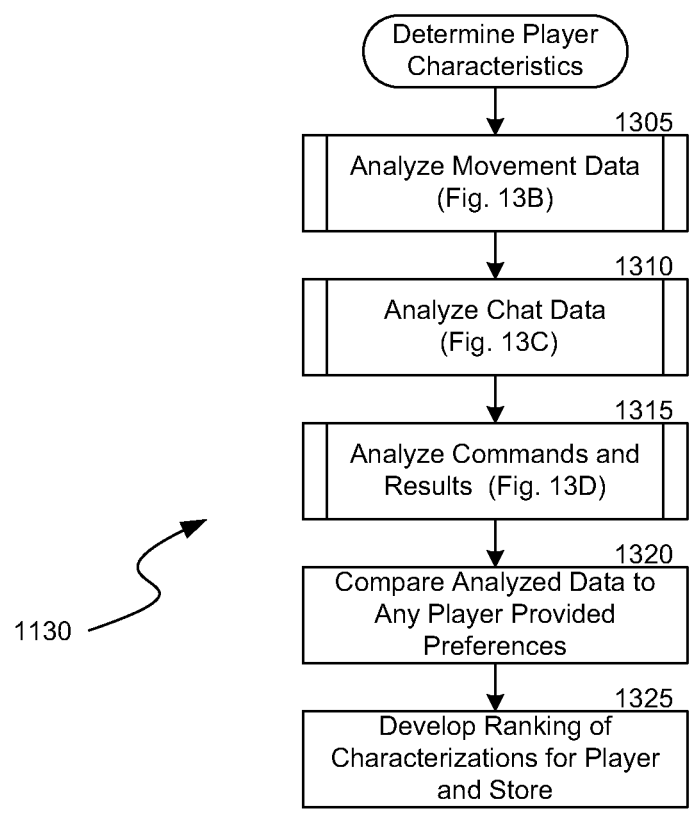
FIG. 13A is a flowchart illustrating an example of a routine for determining player characteristics.
Figure 13B:
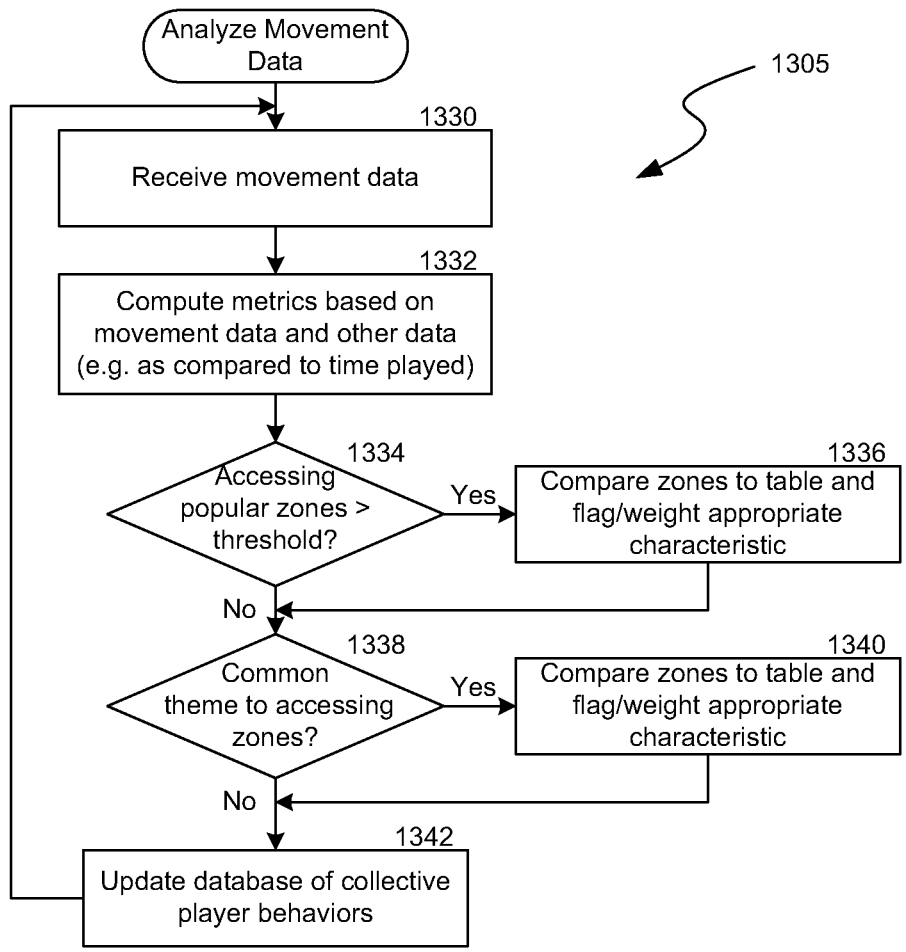
FIG. 13B is a flow chart illustrating an example of a subroutine for analyzing movement data.

Referring to FIG. 13B, an example of a subroutine 1305 to analyze movement data begins in block 1530 where the system receives movement data. After receiving movement data, the system employs one or more of the processes described herein to analyze the received data; however, some or all of the processes described herein may be optional, and additional processes for analyzing movement data are of course possible.

In block 1332, the system can compute metrics based on received movement data and any other data available to the system. For example, the system may compute a ratio of distance traveled by the character per gaming session or divided by an amount of time played within a contiguous block of time. The system may also analyze for "bursty" movement where a player may stay idle for relatively large blocks of time, interspersed with quick bursts of travel. Such bursty behavior can be compared to player averages within the game. For example, an average player may have large periods of relative stillness or lack of movement or movement not exceeding a threshold within a certain location of the game (e.g. in a tavern), followed by movement throughout a zone. Such movement may represent average play, but a role player may show little movement for longer periods of time at the tavern/in a town (often in conjunction with higher than average chat or text communications), while an explorer would frequently move about the virtual world. Another player may have small movements within one zone, interspersed with larger movements throughout that zone (e.g., fighting a monster, then traveling to the next encounter).

In block 1334, the system can analyze whether the character accesses popular zones above a game-average or other predetermined or algorithmically determined threshold. For example, the game may define portions of a virtual world by Cartesian coordinates (as noted above), and assign zone identifiers for such regions. The system analyzes average character behavior throughout the virtual world (or in the "real" world, for example via GPS, mobile device locations, or other means to identify where users shop, play and engage in other activities, etc.) to identify those zones that are more popular than others. (While described herein as analyzing zones, these zones can be of any size within a virtual world, from the size of a room or small discrete location, to an entire city, country, planet or other larger geographic designation.)

The system can employ a frequency metric that compares, for example, popular zones with a given threshold. A game may include popular zones applicable to certain level players, where most players, regardless of their play style, frequently visit the popular zone at that level. Thus, only players who exceed (or are less than) a threshold amount of time spent in that zone at that level would be recognized as being outside of the norm, and thus the system could recognize the player's actions within that zone as data useful in helping to characterize the player. Moreover, the system can also analyze actual geographic location of the user, not only virtual location. Thus, if the player were playing the game or activity while in a new city, the system can make appropriate changes to recommendations or actions made by the game, such as offering advertisements for food/restaurants local to that geographic location, recommend play with players in that time zone, and so forth.

In block 1336, the system can compare the zones visited by the character to a table of the zones to flag or weight appropriate characteristics. The system can store a table or other data structure that maps zones to particular characteristics. Player interactions at various levels and times can be compared to this data to further classify and characterize players. Examples of data structures that may be employed are shown in Tables 2a and 2b below.

TABLE 2a

Zone Characteristics

| Zone | Characteristic Weighting |
|---|---|
| 1 | Grinder = +10; Explorer = 2 |
| 2 | Role Player = +10 if average time spent in zone/section >3x game average |

TABLE 2a-continued

Zone Characteristics

| Zone | Characteristic Weighting |
|---|---|
| 3 | Grinder = −10; Explorer = +15 |
| ... | ... |

TABLE 2b

Zone-Characteristics

| Zone | Characteristic Weighting |
|---|---|
| 1 | Optimal level = 20; ZonePopularity = 1 |
| 2 | Optimal level = 20; ZonePopularity = .8 |
| 3 | Optimal level = 50; ZonePopularity = .75 |
| ... | ... |

For example, certain zones may be popular among players because they typically lead to a greater increase in levels per time played than other zones at that particular level. In some embodiments, for example as shown in FIG. 2a, the table or data structure can also map particular zones to types of player behavior, because certain zones may be more appropriate for grinders, and players may have learned or discovered that certain zones favor grinding or rapid increase in character levels. Likewise, the table or data structure may also associate particular zones with other player behavior, such as certain obscure zones having a different aesthetic or different theme than the rest of the game, where such zones are favored by explorers. The table or data structure can simply flag these zones with an initial or seed characterization for the player, or may be more sophisticated and provide varying weights that are applied to compute a characterization for the player (as described herein). Thus, the system may associate one zone with a grinder weight of 10 and an explorer weight of two, while another zone may have an explorer weight of 10 and a role-playing weight of five. When these weights are combined with other weights calculated by the system, the system can provide a more sophisticated and robust player characterization.

In some embodiments, for example as shown in FIG. 2b, an optimal level or level range may be specified for a given zone. Players exceeding a certain time threshold in that zone at sub-optimal levels might be characterized or weighted as explorers. Players exceeding a certain time threshold in that zone beyond optimal levels might be characterized or weighted as less skilled players or players desiring less challenge since the player would be overpowered at higher level and the zone challenge and risk versus reward would be minimal at those levels which are common indicators of player skill. Players moving from zone to zone in the optimal level ranges might be characterized as grinders. Thus, certain player characterizations or weightings might be calculated as follows. PlayerMetric=(OptimalZoneLevel(s)/PlayerLevel). In the case of a range of levels, an average of these levels may be used in calculations. The system could periodically perform and sum or otherwise generate time-based data for the player. For example, every five minutes, every half hour, etc. Players with values closest to 1 could be weighted as grinders since they generally spend their time in popular zones at optimal levels. Players with values significantly greater than 1 could be weighted as explorers. Players with values less than 1 could be weighted as less skilled or desiring less challenge.

In some embodiments, a ZonePopularity metric is also employed. The ZonePopularity metric may be predetermined or algorithmically generated. For example, the system periodically takes a census of all game activity in various zones or locations. Player populations are determined as well as, in some embodiments, other user data and characteristics such as level, equipment information, user classification data and other user criteria, and other information. By comparing the total number of players to the number of players in a given zone, including in some cases additional information such as player levels and such, the system can determine, for that particular moment in time, how popular a zone is relative to other zones, what kinds of and levels of players frequent that zone, and other zone-related information. Periodically and repeatedly sampling this information in some embodiments may provide more accurate zone information. Thus, for a given zone, one exemplary calculation to determine popularity is ZonePopularity=ZonePlayers/TotalPlayers. In some cases, a multiplier or other normalization factor may used, for example ZonePopularity=(ZonePlayers/TotalPlayers)*Normalization Factor, to provide a desired range of values.

Thus, once a player is classified, for example as a grinder or an explorer, the ZonePopularity metric can be used to indicate degree of classification among other things. PlayerClassification Degree=PlayerMetric/ZonePopularityMetric. For example, if a player is level 20 and in a zone with an optimal level range of 20, then the player metric would be 1 indicating that they are a grinder. Grinding in the most popular zone at that level versus a less popular zone, however, is not necessarily the same thing. Players in a less popular zone might like variety, exploring, etc. Thus, if the ZonePopularityMetric in the prior example is 1 (indicating the most popular zone or one of the most popular zones at that level), the classification degree would still be 1 indicating the player is a solid grinder sticking to the popular/established path at a particular level. If the ZonePopularityMetric is 0.8, however, the classification degree becomes 1.25 indicating the player has a propensity for exploration or deviating from the normal path. The higher the number, the greater the deviation. Similarly, an explorer type could also be categorized using this calculation yielding even higher values. Players could also be classified or weighted among multiple categories as hybrid types or otherwise. Additionally, other zone weightings and calculations are contemplated and should be evident to those skilled in the art.

In block 1338, the system can determine whether a common theme is associated with the character's accessing of zones, and if so, compare such zones to another table or data structure to flag or weight appropriate characteristics under block 1340. An example of a data structure to analyze common themes for zones is shown in Table 3 below.

TABLE 3

Common Zones per Characteristic

| Zone | Characteristic Weighting |
|---|---|
| 1 | Grinder = +5 if average game time/session = >2x game average |
| 2 | Social-needs preferred gamer |
| 3 | Social-interaction needs gamer |
| ... | ... |

The system under block 1338 determines whether the character exhibits repeat behavior based on the received movement data and recognizes that the player may commonly access the same zones. By comparing those zones to the table, a flag or weight can be applied to the player. For example, if the player frequently accesses city zones, and spends greater than average time in these zones, then the table or data structure may indicate to the system to provide an initial flag or weight to the player as being a role-player, because role-playing-type characters often spend time in cities, chatting with fellow players. Alternatively, certain zones may be designated as "out-of-the-way," "obscure" or otherwise rarely visited by players, and thus the table/data structure may flag/weight the player as an explorer if she visits these zone.

The table/data structure may also have particular characteristics associated with certain zones, where such zones may have been designed by the system or the game designer for particular moods or player personalities. For example, one zone may be associated with multiple, fearsome monsters, and have lots of treasure to be gained from their defeat, and such zone would typically be more enjoyable to a combative/aggressive/grinder-type player. Other zones may be beautifully rendered aesthetically, which may appeal to explorers or players who seek a measure of escapism.

Further, other zones may be associated with ethical/moral/social issues or concerns, and thus the table/data structure may appropriately flag or weight a player who spends greater than average time in these zones as someone who is interested in ethical/moral/social interests. (As one example, one zone may have oppressed peoples, degraded environmental quality, famine, or health concerns, and players can receive experience points or other in-game benefits/compensation for solving, rectifying, or ameliorating these concerns.) As yet another example, one zone may be populated with fellow player characters or in-game characters that wish to romantically engage with the player's character, befriend the character, or otherwise build an in-game social bond, and thus the table/data structure can apply an appropriate flag/weight to the player who seeks greater social involvement with the game/other characters.

In block 1342, the system updates a database of collective player behavior based on the previous analysis. By continually updating a database of character behavior within a game, the system can improve averages discussed herein regarding analyzing and/or identifying character behavior. For example, if a new zone or region is introduced into a game, that new zone may become more popular for a given period of time, which can affect the analysis described above.

In general, many of the analyses of not only zones visited, but other metrics determined herein may be compared to game averages or other metrics or thresholds to identify those players who are above the game average for a particular game metric/statistic. While the tables above show a simple numeric weighting applied, regardless of the deviation from the average, a much more complex weighting may be applied that is tied to deviations from the average. Thus, to determine player characteristics, the system may employ statistical analyses with weightings representing non-linear deviations from game averages can help to provide greater skew in weighting to particular players. Thus, if a player can be characterized as a "role-player", and he spends three times more per session in a tavern or a city than the average, then the system under block 1340 can apply a weighting or multiple that is three times greater; likewise, a player who may be characterized as an "explorer", and spends four times more time per session moving about multiple zones than the average player, then the system under block 1340 can apply a four times greater weighting.

Referring back to FIG. 13A, in block 1310, the system analyzes the gathered and stored chat data. As noted above, the chat data can indicate certain player characteristics, such as use of profanity, elite speak, flowery/archaic language (e.g., use of "thou," "my lord"), etc. Chat data can provide a strong indication of a player's characteristics. For example, aggressive language, with many exclamations and taunts can represent a power-gamer, and thus the system provides points or weighting for power-gaming characterization when found in the chat data. An explorer might not communicate much, whereas a role player would likely communicate quite a bit, often in a flowery manner. As noted herein, the term "chat data" refers to any communication between players (e.g., text, audio, video, etc.). However, if players communicate audibly, the system may employ speech-to-text to convert such speech to text for easier analysis by the system. In addition, the system may use the chat data to evaluate characteristics of the player's social interactions that are independent of the content of the chats. For example, the system may use timing or other frequency data to determine how frequently a player engages in chats with other players during a particular gaming session and how long these chats last. Frequent or long chat sessions could indicate a player who puts a high value on these interactions. Such a more simple analysis of length and frequency, versus analysis of content, could be preformed with less computational resources.

Figure 13C:
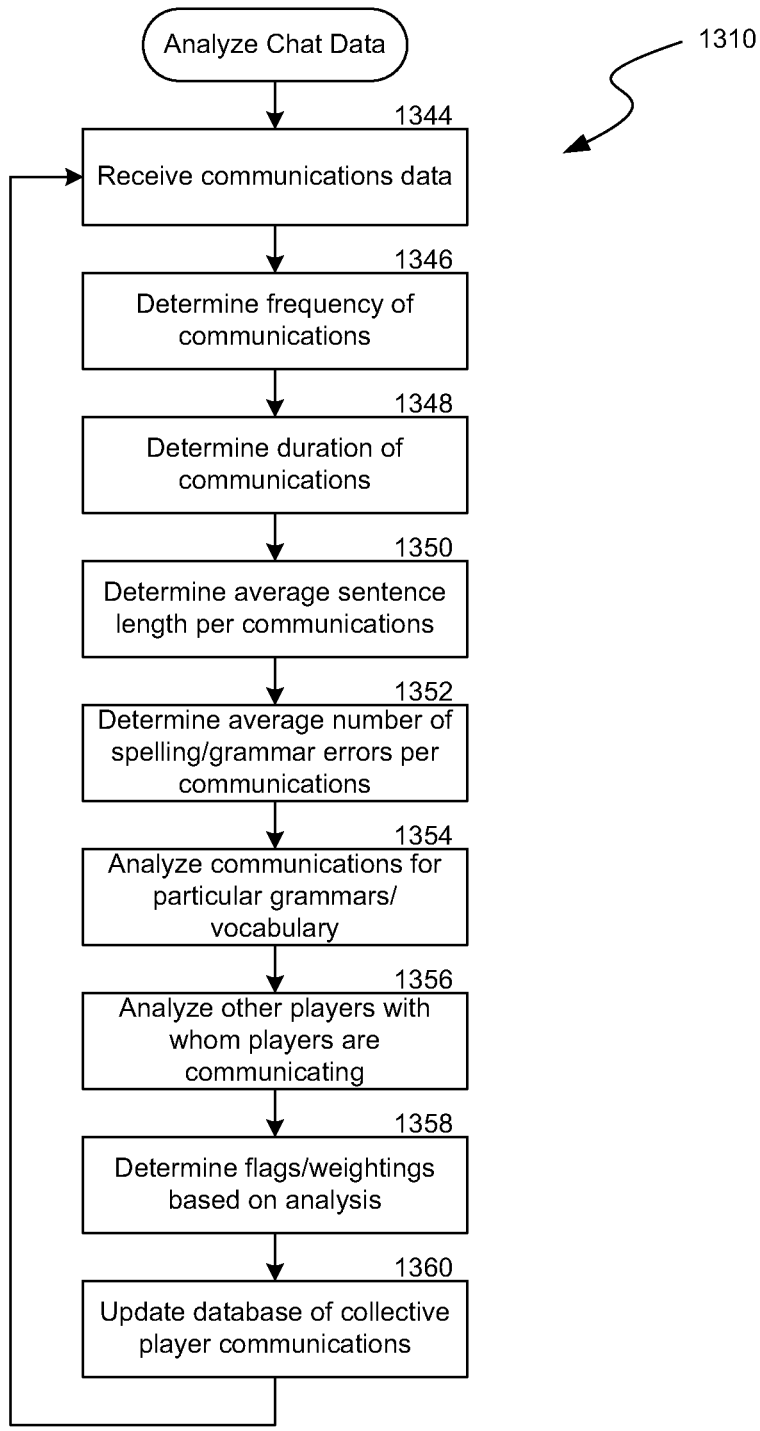
FIG. 13C is a flow chart illustrating an example of a subroutine for analyzing communications data.

Referring to FIG. 13C, an example of a subroutine 1310 to analyze chat data begins in block 1344 where the system receives communication data. While sometimes described herein as "chat" data, the system can analyze not only in-game text-based communications, but also voice communications (converted from speech-to-text), or communications through alternate channels, such as via cell phone, instant messaging, SMS, or other forms of communication between players. After receiving communications data, the system employs one or more of the processes described herein to analyze the received data; however, some or all of the processes described herein may be optional, and additional processes for analyzing communications data are of course possible.

In block 1346, the system can determine a frequency of communications. In some embodiments, the frequency is represented as an average number of communications by a user in a given time period or interval. Communications may include textual chat, verbal communications, emoting, and other communications techniques further described herein. In some embodiments, the metric for measuring the frequency of communications can be based on a set time interval, such as every 10 minutes, hourly, per game session, and so forth. In general, the system can normalize or use a standard periodicity for analysis provided herein, although the periodicity may differ based on the metric. For example, movement data discussed above may be analyzed per game session or per hour for players in a game, whereas frequency of communications may be analyzed in 10 minute intervals for players. For example, during the specified time interval, the system identifies individual conversations or protracted communications between a first player and one or more other players as further described herein. The system further identifies periods when a user is communicating in this manner or when a user is performing other actions and not communicating with other users. The system then generates a metric or other information regarding a frequency of communication. In some embodiments, this metric can be compared among users to determine relative levels of frequency of communication by users.

In block 1348, the system can determine a duration of each communication. The duration can be how long a communication with one or more other players occurs relatively continuously, before a pause less than a given threshold. For example, the system may analyze communications to see if a subsequent communication occurs within one, two, five minutes or less, and if so, would append consecutive communications together to be represented as a single communication interval (e.g. a "single conversation"). Some players may have bursty communication, with long and frequent communications when in a particular location (such as in a tavern) while others may have bursty communications in other instances (e.g., while in a battle). Some players may have lengthy conversations, whereas others may be more reserved and communicate only when needed and in clipped sentences. These players would be identified and categorized and classified accordingly.

In block 1350, the system can determine an average sentence length per communication. This can be done by simply counting a number of words employed in a single message. The system may parse longer messages for certain punctuation, such as periods, semi-colons, etc. Alternatively, the system may employ more sophisticated text analysis algorithms to parse strings of text to identify discrete sentences, and therefrom, count a number of words.

In block 1352, the system can determine an average number of spelling, grammar and/or other errors per communication. The system may simply employ a standard spelling checker, grammar checker, or both for each received communication, and identify the number of errors per communication. The system can also take these errors and perform additional processing, such as number of errors made per hour, per message, etc. Further, these errors can be compared against average errors for all players, or divided based on a given geographic area, time zone, etc. Alternatively or additionally, the system may employ a tone checker to analyze the tone of messages to see if the player often communicates in a hostile tone, a conciliatory tone, a flirtatious tone, etc. An example of a tone checker is ToneCheck provided by Lymbix, Inc.

In block 1354, can analyze communications for particular grammars or vocabulary. As described herein, certain players may employ certain grammars particular to gaming, some players may use profanity/vulgarity, players may employ objectionable terms or phrases, and so forth. Thus, the system under block 1354 can analyze or receive communications to compare it against stored dictionaries, indices or tables that have associated therewith flags or weightings to help characterize players. Thus, use of certain words, phrases, constructions, or grammar can positively and negatively affect metrics and other information associated with a player or character. For example, one dictionary may include profanity or other objectionable terms, and thus use of those terms (or use of those terms above a low threshold), can cause the system to flag or otherwise characterize the player as using language that many others may find objectionable, such as children or their parents. Similarly, another dictionary may include slang terms common among a "hip hop" crowd or other urban-speak, and thus a player employing such terminology may prefer to (and may only be understood by) players who have similarly flagged by the system as employing such a vocabulary/grammar.

Under block 1356, the system can analyze identities of other players with whom the current player communicates. For example, the system can compare a user ID or other designation of fellow players with whom the current player is communicating, and keep a count of those players to thereby identify, over time, those fellow players with whom the player more frequently interacts. This can aid the system in determining whether the player frequently communicates with the same group of fellow players, or enjoys communicating with numerous other, unknown players (e.g. has a high count for a few players, or low counts scattered among numerous players). In some embodiments, the system further analyzes the speech patterns, communications, and other interactions and gameplay of frequent contacts or partners to further categorize or classify a player. For example, the system may identify a first player as having certain characteristics (speech patterns, interactions, etc.) When frequent partners of the first player share similar characteristics as determined by the system, the confidence level is increased regarding identification of those first player characteristics and also regarding those second player characteristics. However, the system can provide more sophisticated analysis, such as analyzing the quality of conversation between the player and other players to identify discussions unrelated to game play that may represent a more personal bond between the player and certain fellow players (e.g. by identifying mentions of personal interests, current events, pop culture references, references to current movies, music, etc.) and so forth. For example, the system may maintain and periodically update one or more data structures containing information regarding certain topics such as current events, sports, hobbies, etc. Users communicating regarding or otherwise referencing items or information contained in the data structure will cause the system to create associations between the users and information associated with the data structure or topic or otherwise adjust metrics or criteria associated with the user. The system can thus identify, through communications and/or the nature of the communications, if a player is developing a closer relationship with a fellow player, and thereby recommend future game play between those players.

In block 1358, the system determines flags or weightings based on the analysis. Such flags/weightings are similar to that described above with respect to subroutine 1305, and as discussed herein. For example, use of terms "thou," "my Lord," and other flowery/archaic language can indicate a role player, and thus the system may flag or weight that player accordingly as a role player, flag players who frequently use profanity, and so forth. As another example, a player who uses an aggressive tone and profanity may be flagged as a potential grinder. Other examples are provided herein. Under block 1360, the system updates a database of collective player communications to help improve game-wide, player-wide, and other global averages and metrics, as described herein.

Referring back to FIG. 13A, in block 1315, the system analyzes commands input by the player and any results therefrom. For example, if the player frequently uses emote commands, then the system would provide points or weighting to the role playing characteristics for that player. If the player has numerous commands for buying and selling items, then the system may provide points or weighting to the player indicating the player is trying to trade or engage in commerce.

Figure 13D:
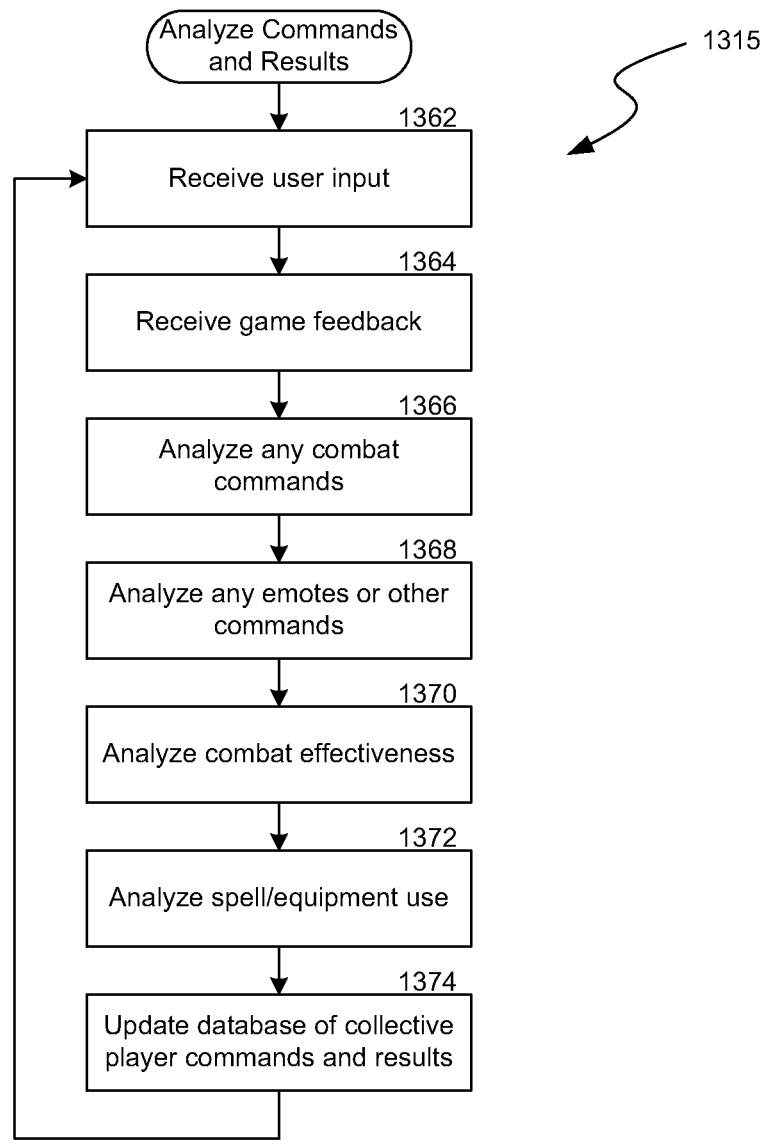
FIG. 13D is a flow chart illustrating an example of a subroutine for analyzing player input and responses thereto.

Referring to FIG. 13D, an example of a subroutine 1315 to analyze commands and results begins in block 1362 where the system receives user input. As described herein, the input can include combat commands, emotes, spell use, equipment use, bartering transactions, or other user input. In block 1364, the system receives feedback from the game based on the user input (although block 1364 may be performed later in the subroutine). After receiving the user input and any game feedback, the system employs one or more of the processes described herein to analyze the received data; however, some of the processes described herein may be optional, and additional processes for analyzing the data are of course possible.

In block 1366, the system can analyze any combat commands. For example, the system can determine where the user strikes an opponent, with what weapon, and how often. Alternatively or additionally, the system can analyze spells cast or abilities used during combat, their sequence, and so forth. Certain players may perform certain actions for different results. For example, some players may prefer a more comedic style of combat, and may push an opponent over a cliff, cast ineffective spells that result in some comedic effect, and so forth. The system can then flag or weight the player accordingly, as noted above.

In block 1368, the system analyzes any emotes or other commands input by the user. For example, as noted above, a player who uses emotes with a frequency and/or variety exceeding a certain threshold may be classified as a roleplayer. The system can even analyze the type of emotes used to determine a characteristic for the player. For example, a player who frequently bows may further represent a roleplayer, whereas a player who uses aggressive emotes may be characterized as aggressive and should not be matched with children or other players who could be offended. Another example is commands input may be command to barter for digital items within a game, and the player's frequency of bartering, effectiveness in bartering, and so forth. For example, in some embodiments the system maintains a database or other table of average values or trading values of a plurality of digital objects. Users trading, selling, or otherwise exchanging digital objects for values exceeding their average values may be weighted as more skilled than users accepting less. The system can then flag or weight the player accordingly, as noted above.

In block 1370, the system can analyze combat effectiveness for the player. For example, certain spells, in a certain order, can have a greater affect in defeating an opponent than others. The system can analyze damage inflicted per second by a player of a given level versus an average for players of that level (and possibly of that same class or in a specific encounter or against a specific opponent) to determine whether the current player is more effective than others. For example, if the player is able to target a weakness of an opponent, use spells that produce more damage of an opponent, and so forth, the system can flag the player as more effective than others. Under block 1370, the system can also gather additional data, such as number of opponents defeated per unit of time (e.g. per hour). The system may normalize such a metric based on the player's level or total level of the party, or normalized based on the combined hit points or level of the opponents. Obviously, more effective players can defeat stronger and greater numbers of opponents than less effective players, and thus the system can flag or weight such players accordingly.

In block 1372, the system analyzes spells cast by the player, equipment used by the player, and so forth. For example, the system can analyze what healing spell a player may cast, and when, to determine how effective a healing-class player is. If a player were to cast a powerful healing spell, but when fellow players in the party have not suffered much damage, the player has "wasted" much of the spell by over-healing (not efficient use of mana), and thus the system tracks use of certain attributes such as mana efficiency or usage and can flag the player as less sophisticated/experienced (despite whatever level the character may be). Likewise, the system can determine whether the player frequently changes equipment (weapons, armor, rings/amulets, etc.). Such a player may be an optimizer and the system may flag or weight that player accordingly, and fellow players may wish to play with fellow optimizers (or be annoyed by such players, and may not wish to play with such a player). Alternatively or additionally, the system can analyze the input combat commands to determine the player's aggressive ("aggro") effectiveness.

In block 1374, the system updates the database of collective player commands to help improve game-wide, player-wide, and other global averages and metrics, as described herein.

Referring back to FIG. 13A, in block 1320, the system compares the analyzed data to any player-provided preferences. For example, if the player provided input indicating that he is a quester, and the data analyzed under blocks 1305 through 1315 agree with this assessment, then the system assigns a high confidence value to its characterization of the player as a quester, and stores such a determination. However, if the player indicates that he is an quester, but the gathered data conflicts with this self-assessment and finds the player to be more of a power-gamer, then the system would in some cases provide a higher percentage or weighting to the power-gamer characterization, with a lower, but still relatively high, characterization for questing. As an example, the player may be characterized as 65% power-gamer, 35% quester, and thus the system would attempt to find similar players with such a makeup. Indeed, the system may attempt to identify players that self-describe themselves as questers, but whose gameplay reflect a power-gamer. Thus, the system can have a higher confidence in matching like players who have similar self-described characteristics, as well as similar gameplay characteristics.

In block 1325, the system develops rankings of characterizations for players and stores such data. Thus, in the example above, the system determines that the player is 65% preference for power-gaming and 35% preference for questing, and thus stores such characterizations with the data structure for that player. Additionally, the system may store preference information and/or rankings related to different games, gear, chat, skill by class, efficiency, and so on.

An example of a data structure or table for storing certain data from players is shown in Table 4 below. The data structure or table may be stored with the player's profile noted above. The system may continually modify or update this data structure or table as the player plays games or undertakes other online endeavors, and the system uses such a data structure/table for matching, as described herein.

TABLE 4

| Metric/Characteristic | Values |
| --- | --- |
| PlayerID | |
| GameID | |
| CharacterID | |
| Average movement/game session | |
| Zone counts | |
| Average time spent within a zone/session | |
| Frequency of communications | |
| Duration of communications | |
| Average sentence length | |
| Average number of spelling/grammar errors | |
| Grammars/vocabularies used | |
| Player counts for other players communicated with | |
| Emotes used/session | |
| Digital object trades/session | |
| Combat effectiveness | |
| Healing effectiveness | |
| Spell use effectiveness | |
| Equipment use effectiveness | |
| Equipment adjustment/session | |
| Opponents defeated/hour | |
| Damage produced/seconds | |
| Aggro effectiveness | |
| Critical hits/battle | |
| Gold acquired/session | |
| Experience points gained/session | |
| Damage inflicted/session | |
| Other characters count | |

TABLE 4-continued

| Metric/Characteristic | Values |
| --- | --- |
| Number of alternative characters | |
| Number of players interacted with/session | |
| . . . | |
| Watts/Hour | |
| KilowattRating | |
| AvgPlayTimes | |
| AvgPlayDuration | |
| Crafter weight/percentage | |
| Grinder weight/percentage | |
| Explorer weight/percentage | |
| Role-player weight/percentage | |
| Quester weight/percentage | |
| Twinker weight/percentage | |
| Trader weight/percentage | |
| . . . | |

As shown above, only some of the metrics described herein are shown in Table 4. For example, the data structure or table can include information regarding preferred servers or shards that the player typically joins for a given game, energy/power/mana used per encounter/gaming session/hour, etc. While each player is generally described herein as being associated with a particular type (or blend of types), the system can also accommodate more complex players who enjoy acting as different types depending upon a given game or character, and thus the various tables/data structures can include further partitioning or granularity of the data to account for this. For example, when the player is playing a warrior in one game, the player may prefer to act as an explorer, whereas when the player is playing a wizard in another game, the player may prefer to act as a role player.

The data structure/table of Table 4 can include many other metrics, or include fewer metrics. Further, a user may have multiple profiles associated with different user IDs, games, or activities each with different characters and associated statistics. As shown above, an overall metric of a player's effectiveness can be represented by gold gained per session, experience points gained per session, damage dealt to opponents per session, and/or other metrics. A grinder would typically have higher experience points per session and/or higher damage dealt per session, and likely also higher than average gold obtained per session. However, a player with a high gold gained per session with associated commands indicating trades could represent a player who likes to optimize his character or otherwise trade (e.g. a trader's). While most metrics are shown above as being dependant on or compared to a given gaming session, other comparators may be employed, such as being dependent on the party, on a particular level of character, on all players within the game, and so forth. In other words, the system can normalize metrics based on a variety of factors. Further, the system can normalize metrics based on equipment weightings (described herein).

The "other characters count" may represent a count of other characters that the player wishes to play with in any given session or have in his party. In other words, this can represent a "bonding metric", and indicate whether or not the player wishes to play with numerous fellow players, or have only a party of close friends when playing. Further, "number of players interacted with per gaming session" can represent another "bonding metric", to indicate how social the player is in the game.

"Number of alternative characters" can represent a player who, rather than focusing on a single character, has multiple alternative characters, and enjoys playing each of these different characters, rather than optimizing any single one of them. Such players may wish to play with other players who also like to frequently use alternative characters.

The grinder, explorer, role-player, questor, twink, etc. fields can represent weights or percentages for how the system interprets the player as behaving. As noted herein, some players may always act as a grinder, and have a 100% value for that field; however, other players likely have a mix where they might be 60% explorer, 30% role-player, and 10% questor. The system can then attempt to find players with a similar breakdown or otherwise determined complementary criteria or characteristics, which can lead to harmonious game playing between players.

Automatically Identifying New Games/Quests for Players

Figure 14A:
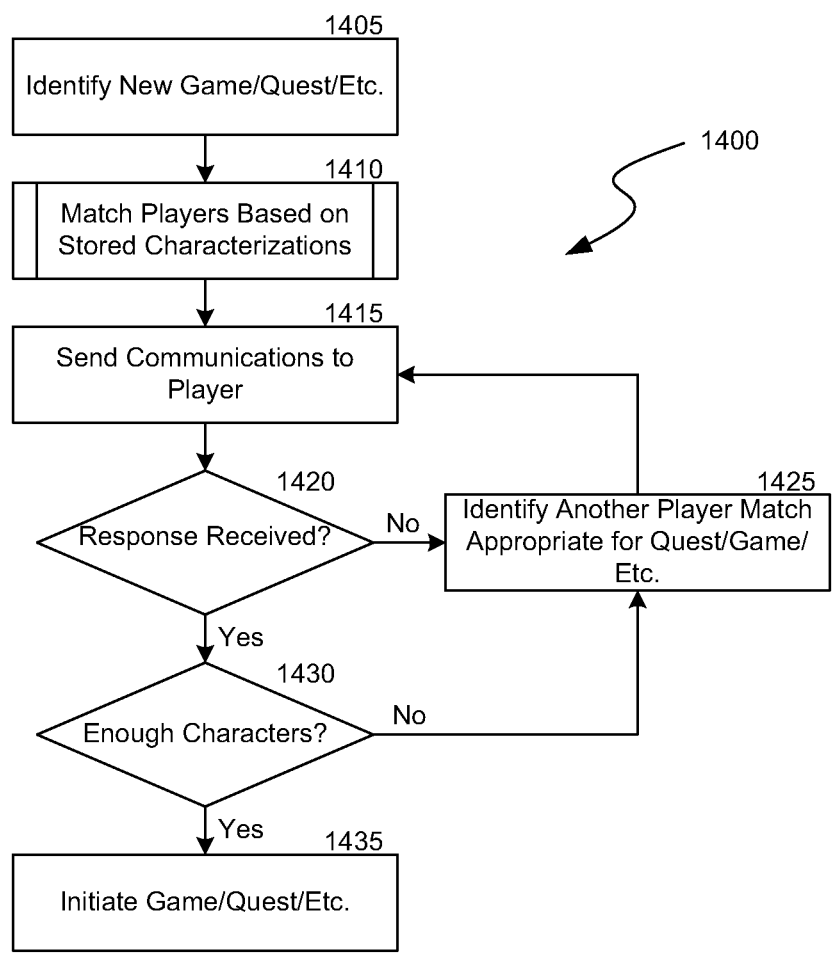
FIG. 14A is a flow diagram illustrating an example of a routine for establishing a new game/quest/endeavor with multiple players.
Figure 15:
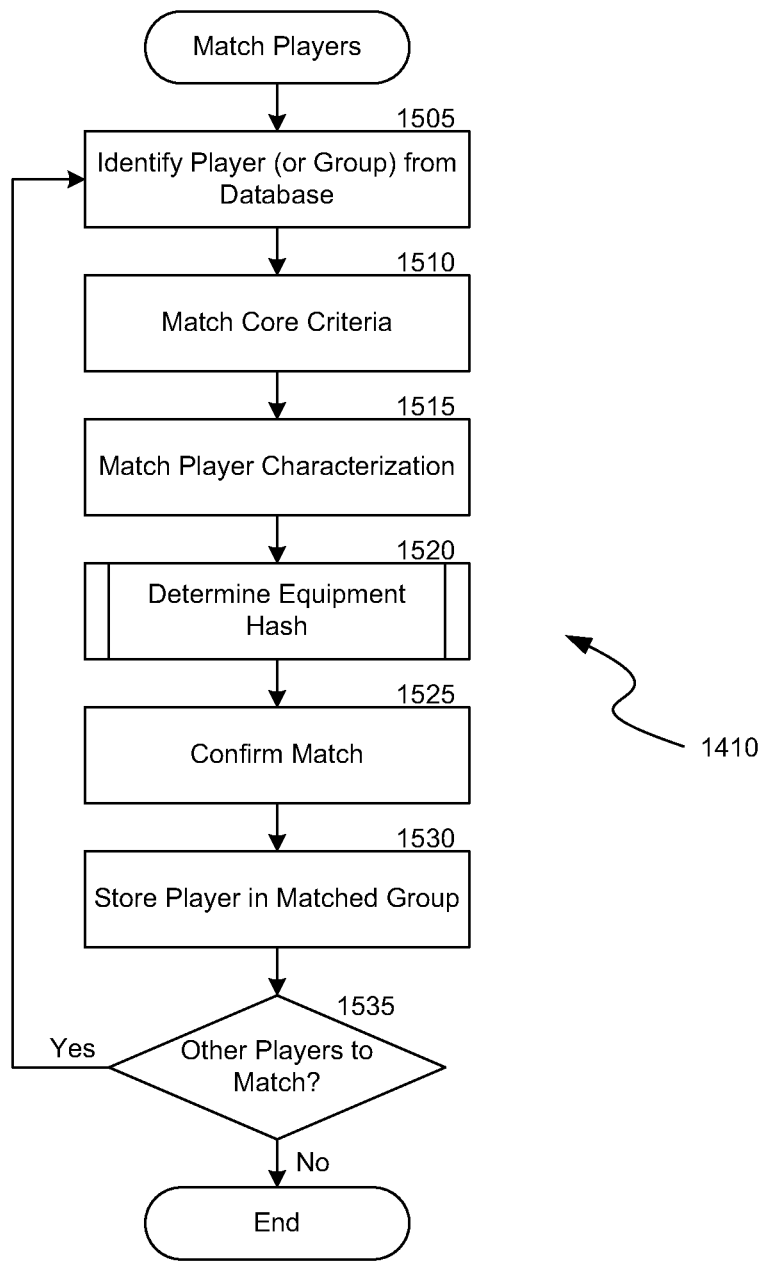
FIG. 15 is a flow diagram illustrating an example of a routine for matching players.

In some embodiments, the system collects, aggregates, processes, and analyzes information about users and users engaging in networked activities to match users to other users and/or determines correlations (positive and/or negative) between users, for example as further described herein and in FIG. 15. Based at least in part on some or all of the information gathered, the system suggests or discourages various activities, relationships, or other items which may or may not be of interest to the user. Referring to FIG. 14A, an example of a routine 1400 for identifying new games, sessions, quests or other online endeavors in which players can share an experience is shown. In this manner, the system can tailor the game play to the player's preferences and/or style. For example, if a player is known as an explorer, the system can identify quests that will cause the player to explore new lands or undiscovered territory. As another example, if a player is known as a grinder, the system can, for example, offering quests or other incentives, or direct the player to better grinder areas and offer rewards for defeating monsters in those areas. Furthermore, the system may identify players who have not logged in for a threshold period of time and incentivize their return to the game by offering those players a significant reward for returning to the game and completing a particular game interaction. The game interaction could be tailored to a player or group of players who have not played for awhile in order to bring the players back to the game and also possibly introduce them to new players. For example, an explorer may be enticed by the opportunity to explore a new map and be rewarded with access to a new map with a group of similar or like-minded players or some ability that makes exploring more enjoyable. In this manner, players are incentivized to return to the game with the opportunity to play the game in a manner that they are likely to find enjoyable and with other players that are likely to enrich their experiences.

Beginning in block 1405, the system identifies a new game, session, quest, or other shared endeavor, which may be of interest to the user. For example, such as identifying a pending game which requires additional players or in which a player has dropped out and needs another player, or the system initiates a new quest or session within a game, etc. Alternatively or additionally, the system can launch a new game or new expansion portion of a game, in which to populate it with new or migrated characters as described herein. Alternatively, the system may receive a selection of a game or shared endeavor from a user and identify players based on the selection. For example, the system may display to a player a list of available quests or other endeavors that can be completed. Upon receiving a selection of a quest from a player, the system may identify other players who may provide a good match for the player based on skill level, style of play, character attributes, and so on. In some cases the other players may be playing the same game as the player or may be playing a different game or may be offline. Once the system has identified matching players, the system can notify any or all of the players of the opportunity to complete the selected quest. Alternatively, the system may send the player who selected the quest a list of matching players and allow the player to select the players with whom the player would like to complete the quest. Upon receiving the selection of players, the system may notify those players of the opportunity to complete the quest with the player(s) with, for example an invitation to join a party to complete the quest. In some embodiments, the system determines a negative correlation between a user and a given activity, item, or relationship. For example, the system may identify a game likely of little interest to the user, a quest of a type not suited to the player's classification, an item that does not complement the players existing equipment, one or more other players whose play style or other criteria or characteristics might be less suited or undesirable to the user, etc. Based at least in part on the negative correlation determined, the system discourages, does not suggest or make available, provides disincentives, and/or otherwise reduces the likelihood that the user encounters, experiences, or engages in the activity, item, or relationship.

In block 1410, the system matches players based on stored characterizations. Details regarding such matching are described herein and, for example, with respect to FIG. 15.

In block 1415, the system sends one or more communications to a player identified under block 1410. The player may have indicated a rank ordering of communication methods, such as:

1. In-game text communication;
2. E-mail;
3. SMS/MMS message;
4. Voice message.

In some embodiments, the system may call or send a message to an offline player indicating that a suitable match, for example a match exceeding a threshold and/or other positive correlation, has been found or is likely to be found at a particular time. In this manner, the player need not wait online for an adequate match to be found. Such a message can indicate when the new session is to begin, and provides some information regarding the new session, such as which of the player's characters is best suited for the endeavor, who else may be joining, and so forth. The message can also indicate the confidence level as to how enjoyable the gameplay may be for the player based on how close of a match the system has generated. For example, in some embodiments, the system quantifies the positive correlation of a match as a percentage and provides an indicium of the percentage to the user. In other embodiments, the system provides additional information including factors used to determine the positive correlation or match such as play style, user characteristics and criteria, equipment information, shared activity information such as related quests, play times, and other classification data and information. In some embodiments, the system displays one or more of the criteria used to determine the match and receives feedback such as an indication from the user regarding preferences for which criteria are more desirable and which are less desirable or important in determining the match. Users effectively train the system or provide information used to create a profile that assists in determining positive and negative user correlations. Different users, therefore can have different matching profiles as maintained by the system and determined according to the user preference indications provided. Additionally, different preference information and user preference profiles are maintained in some embodiments for different networked activities, characters, etc. Before sending the communication, the system in block 1415 (or 1410) determines whether the new endeavor is to occur during the player's preferred play time.

Under block 1420, the system determines whether it has received a response from the player, for example within a particular time period or threshold, and if not, identifies another player to match under block 1425 and then loops back to block 1415. As noted herein, the system attempts to match players that are appropriate for the game/quest/endeavor. If a response has been received, the system determines under block 1430 whether enough players have responded affirmatively to joining the new endeavor. If not, the process loops back to block 1425. If enough players have been assembled, then the system initiates the game/quest/endeavor under block 1435. Under the routine 1400, players can receive messages and look forward to substantially immediately joining a new endeavor without having to wait in any queue.

Conserving System Resources

Data centers consume heavy amounts of power, particularly the servers described herein. However, many servers may not be active, or may have only relatively few players on such servers, but the servers are nevertheless powered up because they represent individual virtual worlds, or are waiting for peak loads which occur only periodically during the day or week. By identifying user power-related characteristics as described herein, the system, based at least in part on the user power-related characteristics and/or power-related criteria, performs various actions such as migrating users between servers; providing incentives or disincentives for users to engage in various activities at certain times or under certain conditions; adding, removing, powering up, or powering down activity-related hardware and/or software; and other actions designed to improve power and hardware efficiencies. In some embodiments, users are identified according to power-related characteristics and associated with one or more groups. These groups are associated with power-related characteristics themselves, for example, an average electrical load at a given time or an electrical load profile over a given time period such as a day, and based on these group characteristics, the system, with respect to the entire group, performs the various actions described herein designed to improve power and hardware efficiencies. Users have individual characteristics and classifications used for matching purposes and other purposes as described herein whereby the user is viewed and treated more as an individual as well as power-related characteristics whereby the user is viewed and treated less as an individual and more as a consumer or as a unit of power generally. Thus, in some embodiments as further described herein, the system identifies a first user and at least a first power-related characteristic associated with the first user. Based at least in part on the first power-related characteristic, the system performs one or more actions. For example, the power-related characteristic may include an average unit of power consumed by the user during a specific time period and the system performs an action such as providing the user an incentive to engage in a networked activity during the specific time period or during a different time period. The system also identifies a second user and at least a second power-related characteristic associated with the second user. Based at least in part on the first power-related characteristic and the second power-related characteristic, the system performs one or more actions. For example, the system may determine, based at least in part on the first and second characteristics, that a unit of power consumed by the first and second user together during a certain time period is likely to exceed a certain threshold and provide an incentive or disincentive for the first and second user not to both engage in one or more networked activities during the certain time period.

Figure 14B:
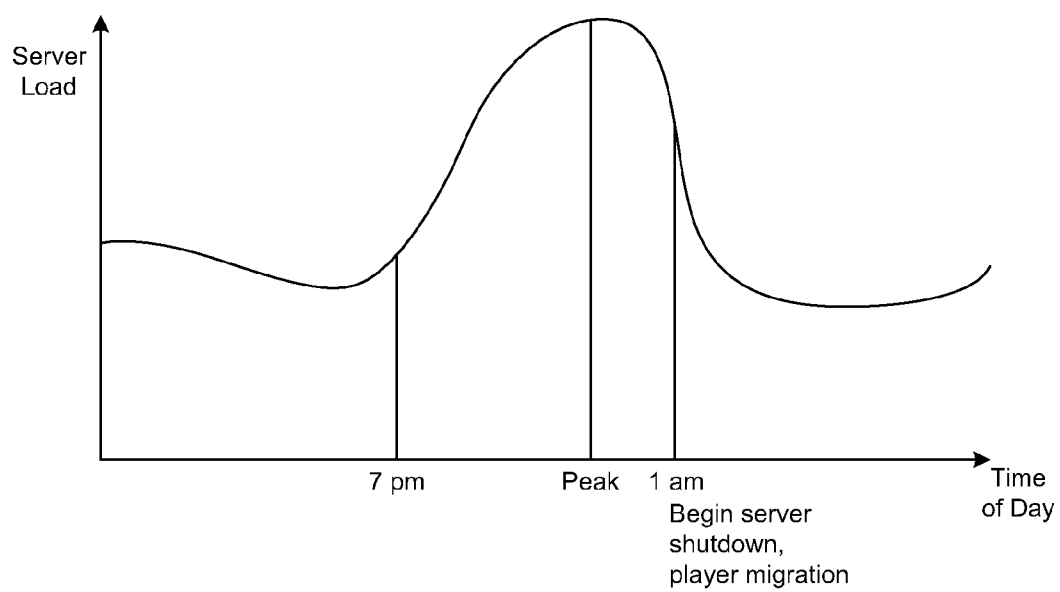
FIG. 14B is a graph showing an example of peak load on servers.

For example, referring to FIG. 14B, within a given time zone, a peak load on the servers can be at about 10:00 p.m., with a sharp rise occurring at 7:00 p.m., and a large drop off occurring after 1:00 a.m. As described herein, the system can begin shutting down one or more servers and migrate players to other servers after 1:00, to thereby conserve resources; likewise, the system can predict that more servers must begin to be powered up at around 7:00 p.m. to prepare for the 10:00 p.m. peak. Conserved resources include not only reduced energy consumption, but also reduced wear and tear on servers, data storage devices, and other network resources, thereby reducing a number of servers or other network elements that could crash and need to be scrapped/recycled.

Figure 14C:
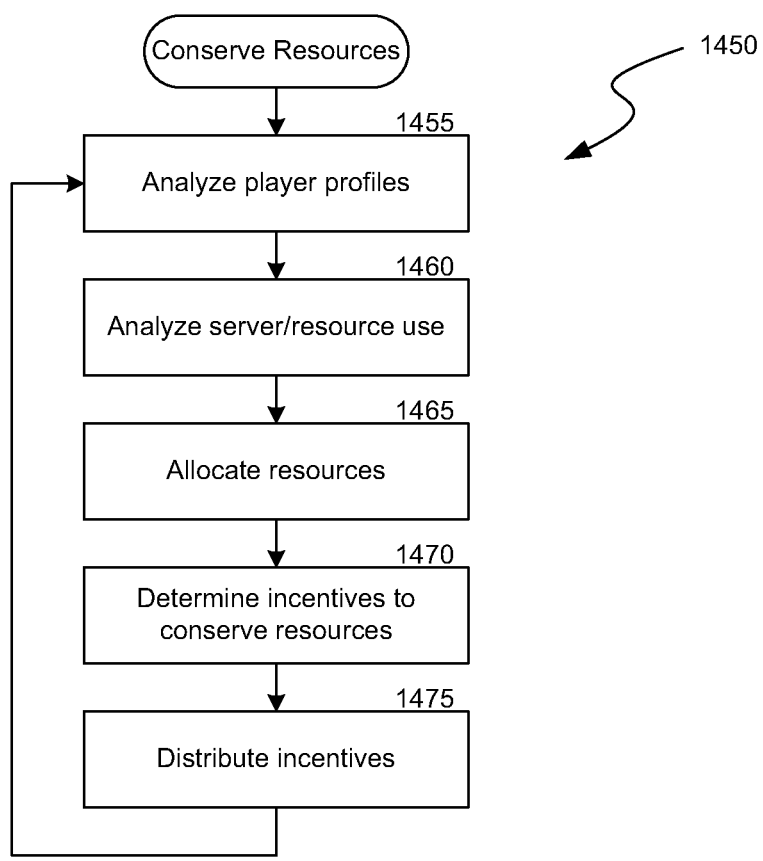
FIG. 14C is a flow diagram illustrating an example of a routine for conserving resources.

Referring to FIG. 14C, an example of a routine 1450 to conserve resources begins in block 1455 where the system analyzes player profiles and determines a typical playtime for players, and in block 1460, analyzes logs of server and other network resource consumption. In block 1465, the system not only determines the peak usage (typically from the data under block 1460), but also determines from player usage which players have been playing continuously up to the peak, versus players who have joined at the peak and will be playing thereafter. The system then, under block 1465, allocates resources to place players who historically play from 10:00 p.m. past 1:00 a.m. on servers that will remain powered on past the peak. The system also, in some embodiments, powers down unused servers past the peak. Further, the system may identify certain servers to handle certain types of players. For example, role-players, "chatty" players, and other players who may consume lots of network traffic exchanging communications may be moved to one or more servers and certain network equipment that can handle a large amount of traffic, whereas other players who may consume server cycles, but not as many other network resources, would be allocated to one or more different servers.

Likewise, the system can analyze players who play well together, and aggregate those players on a particular server. For example, among 10,000,000 players of a given game, the system can identify 20,000 players who play well together, and move those players to particular servers, since they may be playing at particular times. Those servers would also be powered off or operated at reduced loads, etc. when those players typically do not play. (The system, of course, must take into account different time zones, as well as holidays, daylight savings changes, and so forth.) The system works to find servers that may have a low number of players (e.g. under 1,000) and move those players to a higher use server (e.g. a server with approximately 10,000 players).

In block 1470, the system can determine incentives to provide to players to conserve resources. For example, the system may help provide certain incentives to players to reduce the peak load, while not impacting too severely the player's enjoyment of the game. The system may provide certain quests that would be available only during certain off-peak time periods, provide use of certain digital objects during off-peak hours, suggest game play between players (possibly even an additional new zone) during off-peak hours under the player matching described herein, and so forth. Of course, the system can likewise provide disincentives for players, such as higher charges, reduced experience, fewer quests, a reduced set of services, etc. during peak hours.

In block 1475, the system distributes these incentives to players. For example, the system can provide messages during a game to encourage players to drop out of a game as the peak load approaches. Alternatively or additionally, the system can send an e-mail, voice mail, text message, or other communication, in a manner similar to that described herein for matching players.

Of course, the system can perform further optimization to conserve resources, beyond that which is described above. The system may offer a selection of servers or shards for the user to join at the beginning of a gaming experience, but actually assign the user to a different server depending upon system resources and a desire to conserve power. For example, the user may select to join the "red" server, but the system may actually log the user into the "blue" server because the red server is currently in standby state or to be powered down. Furthermore, the system may switch the user from the red to the blue server during game play to conserve energy or other resources, as noted herein.

Moreover, the system can determine additional incentives, beyond the examples provided herein. The system could provide tiered pricing based on the number of hours per week, the number of units of energy used per month, and so forth. The user could be provided incentives to drop off a game, to move to another server, etc., to thereby allow the given server to be put into standby mode, powered down, etc. According to some embodiments, the system may also only make available certain of a user's characters based at least in part on power-related criteria. For example, the system may determine that a first user character on a first server is associated with a first power-related characteristic or criteria and, based at least in part on the first characteristic, a power-related threshold is likely to be exceed on the first server if the user engages in a first networked activity with the first user character at a specific time. The system may therefore during the specific time prohibit the user from playing the first user character, provide incentives or disincentives (such as increased/decreased experience, special quests, monetary rewards, faster group matching or queuing for activities, etc.) for playing the first character or for playing a second character having a second power-related characteristic whereby if the user engaged in a networked activity (such as the first networked activity or a different networked activity) with the second character, a power-related threshold would not be exceeded.

Suitable Player Matching

The system helps foster community by analyzing user behavior, characterizing users from the analysis, and then aggregating or otherwise grouping users together based on positive or negative correlations determined. The system can match a given player to another similar player, a given player with a group of similar players, or groups of similar players together. Thus, the system can identify a player or group of players from the database, identify certain criteria, such as core criteria, for him/them, identify player characteristics, and determine positive and negative correlations, such as likely matches or lack of compatibility, among players. The system may also optionally determine an equipment hash, or store matches, as well as any other functions described herein.

For example, the system may have analyzed a player and noticed that the player likes to move around multiple zones within a virtual world, and thus the system has characterized that player as an explorer. Therefore, the system can match that player with fellow players who are explorers and like to move about and explore the virtual world. Alternatively, the system may have analyzed the player's communications and determine that the player is most accurately characterized as a role-player, and thus the system matches that player with fellow role players. Indeed, as described herein, the system may even segregate such like players to common servers or shards so that only players that share those characteristics play together.

The system includes the following: identifying a first player; tracking or recording a first set of activity information, actions, behaviors, or other data associated with the first player; storing the first set of information, actions, behaviors, or other data; analyzing the stored first set of information, and based on the information, classifying or categorizing the first player as at least a first type of player; and then, based on the identified or classified first type, determining certain criteria from the first set of information to match the player to one or more other players sharing the first type. The system also identifies negative correlations based on the information between the player and other players as further described herein. Thus, in some embodiments, the system matches or otherwise groups or associates or performs actions related to users based on similar characteristics shared between users, for example positive correlations exceeding or below a given threshold based at least in part on the user characteristics, preferences expressed by users related to the characteristics, etc. and/or also based on different and dissimilar characteristics of the users, for example negative correlations exceeding or below a given threshold based at least in part on the user characteristics, preferences expressed by users related to the characteristics, etc.

Furthermore, the system includes the following: identifying a second player; tracking or recording a second set of activity information, actions, behaviors, or other data associated with the second player; storing the second set of information, actions, behaviors, or other data; analyzing the stored second set of information, and based on the information, classifying or categorizing the second player as at least a second type of player; and then, based on the identified or classified second type, determining certain criteria from the second set of information to match the second player to one or more players sharing the second type, wherein at least one of the certain criteria in the second set is a different criteria from the criteria used to match in the first set of information.

Thus the system is configured to match different types of players using different information depending on the type of player. For example, along with a number of common characteristics among all types of players, the system can associate greater weight on level, similarity of equipment/gear, playing skill, and the like when matching power gamers. Conversely, when matching role players, the system can associate less weight to these factors and look more closely at types of activities they engage in, their chat characteristics, their play times, etc.

Furthermore, the system can employ different matching algorithms for different types of players. For example, the system can first identify a player of a first type. Then the system can apply a selected or appropriate matching algorithm to the first type of player based on that type. In the case of multi-typed players (such as a player who is 40% of the first type, and 60% of the second type), the system may use a number of different matching algorithms based on type, with appropriate weighting.

An example of a player matching subroutine 1505 is shown in FIG. 15. Referring to FIG. 15, the subroutine 1410 begins in block 1505 where the system identifies a player from the database of profile/player data structures. While individual players may be selected, alternatively or additionally, players may be grouped by the system, or players may have chosen to always play together, but may wish to have additional members join. For example, the system may find players that often explore the world independently and attempt to match them with players or groups having a similar or complementary play style and/or skill level. Thus, the system can match one player with another player with a similar or complementary play style, one player to a group of players who may enjoy playing together, or similar groups together.

Under block 1510, the system matches additional criteria, such as core criteria. For example, the system may determine that the player is a minor (under the age of 18), and thus looks to match that player with fellow minors. In another example, the system determines that the player frequently uses profanity in chat, and therefore, the system matches that player with other players who use profanity. In some embodiments, a player may be able to specify which certain core criteria they wished the matching system described herein to employ so as to allow them to amplify their own experience (e.g., language requirements so that the player can communicate with other players, or location requirements so that the player is in the same time zone or shares similar pop culture or geopolitical references), as well as identify exclusions or certain criteria the player wishes to highlight and avoid making matches with other players. Under block 1510, the system attempts to make an initial match of the selected player to a group or categorization of players that have initial core characteristics, whereby a mismatch of such core characteristics could lead to a less than enjoyable gaming experience, a very upset player, or even a lawsuit.

Under block 1515, the system matches player characterization data. Such player characterization data can include, the relative weights between the types of gameplay (power-gamer versus quester), as well as some other less definitive or more subjective data described herein. The system may, for example, determine how much experience the player generally gathers on average per session, such as a level adjusted experience points per hour value. If this value conflicts with an experience points per hour for other players, then a match with these other players might not lead to an enjoyable gaming experience for the particular player because the other players prefer "grinding" to quickly raise their levels or because the other players are more proficient. Under block 1520, the system determines an equipment rating or hash, and whether such equipment hash provides a rough match with other players. For example, if the particular player matches the core criteria and matches player characterizations, but is to be put in a group with well-equipped players having high equipment hash values and the particular player has a low equipment hash, then the particular player may not have a good gaming experience because he may be killed or defeated easily in a game, as compared to other players who have high equipment hashes. Further details regarding computing the equipment hash are described herein with respect to FIG. 16.

In block 1525, the system confirms the match by analyzing other characteristics, such as those within the group previously created, or with a player previously identified and who may have been looking for another player to play with. If matching within a group, the system can perform statistical analysis of all statistics among the characters in the group, and compare that with the character for the player to see if the characters align, even if the player characteristics align. For example, the particular player may provide a good match with other players, but their characters may provide a mismatch (e.g., are too common, and thus would not lead to a well-rounded or balanced party, as noted herein). The confirmation can also check other factors, such as faith, sexual preference, and so forth. The system in block 1525 helps provide an increased confidence that a match will be successful, and may associate a weighting or probability the match.

As noted above, the system can match individual players together so that a plurality of geographically separated players may work together with a given online endeavor, game or virtual world. However, the system can also aggregate like players into groups. For example, under optional block 1530, the system associates the player with the matched collection of players, and thus the system helps build associations of similar or like-minded players or identify alternative play options for a player. The players may, for example, choose to create a group or clan and play a game together or may choose to play alone or with a different group of people. In block 1535, the system determines whether there are other players in the database to match, and if so loops back to block 1505. While described herein as matching players, the system can provide greater granularity and match characters of players. Thus, the particular player may be matched with other players, and the system may further provide matches between the particular player's characters and the characters of other players in that group.

In some embodiments, the system may identify matches for a particular character and notify the player of these matches even if the player is currently using a different character or playing a different game. For example, a user may be playing a first game with a first character and the system determines that the user's performance with the first character is below (or exceeds) a particular threshold such as a lack of experience gained, a lack of movement for a specific time period, some indication of boredom or lack of efficiency, etc. The system then notifies the user of a match or other opportunity (undertaking a quest, etc.) for a second character associated with the user in the first game or in a second game. Thus, the user's time might be spent more productively or enjoyably by playing the second character instead of the first character. As another example, a user may require a certain set of conditions to be fulfilled or criteria to be satisfied before undertaking an endeavor or performing an action with a first character. For example, a user might need a certain group or group composition, be waiting for certain friends to be online playing specific characters, require a certain opponent to be present, etc. While the conditions or criteria are not satisfied, the user may elect to play a second character and have the system inform them when the conditions are satisfied or other events occur. They could then return to playing the first character instead of the second character when conditions are favorable or otherwise desirable. As another example, a player may have two characters for a particular game, a level 40 healer, a level 10 healer, and a level 25 tank. While the player is playing the game as the level 40 healer, the system may find a matching group looking for a tank with similar characteristics to the player's level 25 tank. The system can then notify the player and allow the player to exit the game with the level 40 healer and join up with the matching group using the level 25 tank. Additionally, the system may identify matches for different characters regardless of a player's online status and regardless of which game the player is playing.

For example, if a player is playing a fantasy-themed game and the system identifies a player, group of players, character, or group of characters that may be a good match for the player and/or one of the player's characters in a pirate-themed game based on skill, style, location, interests, etc., the system may notify the player of the match and prompt the player to switch to the pirate-themed game. Furthermore, the system may recommend games to a player that the player does not own or may have never played including newly launched or newly available games. For example, if the system identifies the player as a DPS and a grinder, the system may recommend games that promote, specialize, or focus on this combination of styles of play. As another example, if a player is consistently underperforming in one game because the game does not suit the player's play style, the system may recommend another game that may be a better fit for the player's style.

Determining Equipment Values

Figure 16:
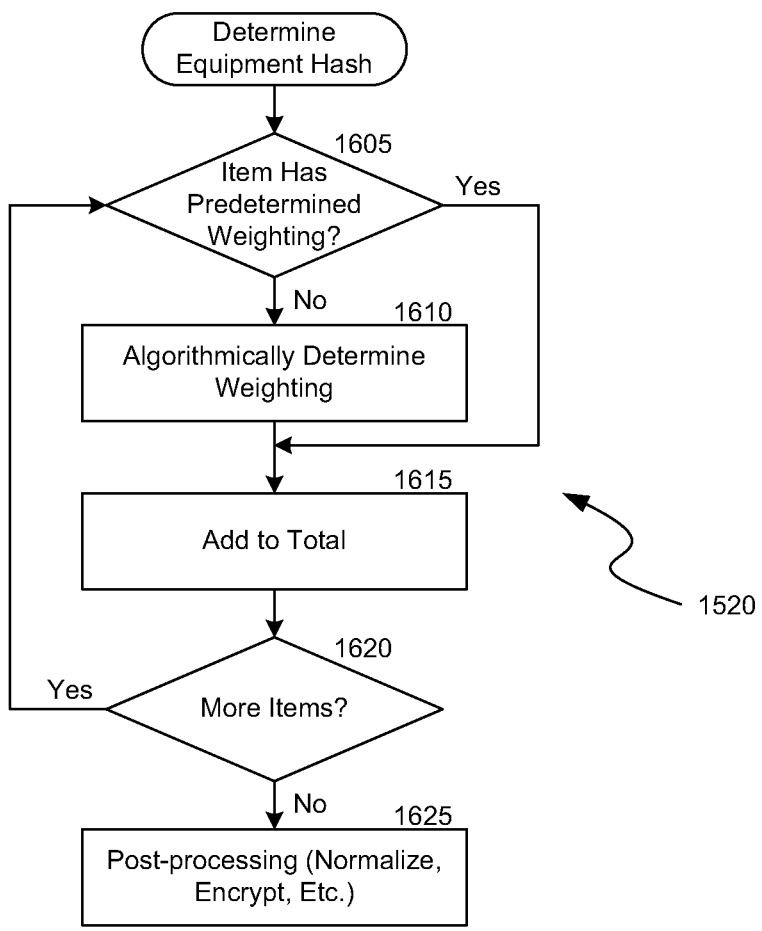
FIG. 16 is a flow diagram illustrating an example of determining equipment weighting totals.

Referring to FIG. 16, a subroutine 1520 for determining equipment hash values begins in block 1605 where the system determines whether the item has a predetermined weighting. For example, some games may associate a level or point value to each digital object or equipment item, despite the fact that the item may have multiple properties (e.g., boost one or more statistics, increase one or more resistances to damage, etc.). If not, then the system in block 1610 determines a weighting algorithmically. Such an algorithmically determined weighting can convert percentages to normalized integers (30% or 50% to 3% or 5%), and add such values to other values for the item. For example, certain items may be assigned corresponding values based on the properties they provide. If leather armor provides an armor class of 2, chain mail an armor class of 4, and plate mail an armor class of 6, then leather, chain or plate armor would have values of 2, 4 or 6 respectively. These base values may then be increased if the items have particular special characteristics. For example, if a particular item of armor confers resistance to a particular type of attack, the base value might be increased by 1 or 2 to account for the greater power of the item. Furthermore, base values for items may be increased if equipped simultaneously, such as a leather helmet, leather armor, leather shield, and leather boots.

In block 1615, the system may simply add the item weightings. Under block 1620, the system determines whether there are more items to consider. Under the subroutine 1520, the system computes a combined total equipment weighting or hash for all items in a character's inventory. Thus, under the subroutine 1520, the system determines or computes a single number to reflect the entire inventory of digital objects possessed by each character. Under block 1625, the system performs any post-processing necessary, such as normalizing data if characters are moved between the virtual worlds that use different values for equipment. Other post-processing can include encrypting values, compressing information, and so forth.

Pre-Qualified Virtual World Play

In some embodiments, the system may also provide pre-qualified virtual worlds. Pre-qualified virtual worlds allow world access, entry, and/or transfers not based on preference or payment, but on user characteristics, criteria, and/or classifications described herein, for example based on performance metrics, play styles, play times, etc. Thus, based on a player's actual performance, classification, and/or other quantifiable criteria or other information described herein, the system determines whether a player is qualified to move to another instance of the virtual world. For example, one instance of a pre-qualified virtual world may allow characters to enter if they have achieved a certain level or number of experience points while another instance of a pre-qualified virtual world allows characters to enter if the system has, based on an analysis of their gaming interactions, deemed the characters to be used primarily as explorers. As another example, one pre-qualified virtual world may allow characters to enter if they have proven to be highly proficient in at least one character attribute, such as characters that tend to maximize the use of their healing spells or some other ability. In this manner, although characters in the world may be diverse in terms of play style and attributes, players know that characters they meet in the world will be highly skilled in at least one particular area relative to game play.

In some embodiments, the system allocates specific electronic games, virtual worlds or other online endeavors based on characterized user behavior. Thus, the system determines one or more characteristics of the user by analyzing user behavior within an electronic game/world/online endeavor and compares the analyzed behavior to predetermined parameters associated with multiple characteristics, as noted herein. Based on the determined characteristic, the system can pre-qualify or authorize the user to access a new game/world/endeavor/activity specifically established for users who all share that same characteristic or who have other characteristics that satisfy certain criteria or thresholds required for access to the new game/world/endeavor/activity. The system can then send a communication or other indicia to the user offering the user to join the new game/world/endeavor/activity. For example, the system might identify a player whose criteria or classification or other information or characteristics are determined to provide an advantage or to be otherwise desirable in a given virtual world or for the player to participate in a given networked activity. For example, some users are more helpful to other users and often act as guides or mentors. In other cases, a world might need characters of a certain class for balance purposes. Or the world might need the player to satisfy certain other criteria. Based at least in part on this determination, the system provides access to the world or invites the user to participate in the activity. In some embodiments, the system provides incentives for the user to play in a particular pre-qualified world or engage in a particular networked activity such as by providing free play, increased experience or advancement bonuses, starting the user at a higher level or more advanced or powerful position, etc.

As a result, the system can establish separate servers or shards associated with particular types of players who share a similar play style or have other desirable (though not necessarily similar) associations together, which can help enrich the gaming experience for those players. As one example, players who are characterized as role-players may more often like to interact with fellow role-players, and thus a separate server/shard may be established on which all players characterized as role-players would be pre-qualified or assigned, and other types of players would not have access to that server/shard. Likewise, players who have a high "bonding metric" or players who tend to interact with only a close circle of the same fellow players could likewise be aggregated on servers that have been established primarily for such players.

Generally, as characters are moved from one virtual world to another virtual world, including pre-qualified virtual worlds, they would move with items and gold intact since the world qualification system would take such unbalancing effects into account. Players could start in a single generic world or begin elsewhere based on prior play in one or more games or based on player characteristics described herein. Then, based on a variety of criteria, they would gain points or other assessment characteristics that would potentially allow them to qualify for transfer to one or more other virtual worlds, which had players who played similarly to themselves or who had other qualifying characteristics. The system can apply tiers of matching players to help further consolidate common players together. Pre-qualified virtual worlds could be used to group so-called power gamers, role-players, or other similar type players on similar servers. Pre-qualified virtual worlds could also be used conversely to create more diverse or balanced servers. In this latter case, the system might qualify more tanks, healers, tradesmen, races, factions, or other avatars to create an optimized playing environment. By consolidating like players on one or more common servers, the system can help further conserve resources, as described herein.

The different world instances might have slightly different or entirely different content. There could be more characteristic-specific content based on the types of avatars transferring to the world (e.g., more raid content for higher level raiders, more quests or lands for explorers, more solo content for solo players, etc.). In this manner, the pre-qualified virtual world can be configured to present opportunities to the players that will further enrich their gaming experience. The system identifies a first player and determines one or more characteristics associated with the first player. Based at least in part on one or more of the first player characteristics, the system provides access to a first networked activity, such as a pre-qualified virtual world. In some embodiments, the system further identifies a second player and determines one or more characteristics associated with the second player. Based at least in part on one or more of the second player characteristics, the system does not provide access to the first networked activity. In some embodiments, based at least in part on one or more of the second player characteristics, the system provides access to a second networked activity. For example, the system can analyze the player's profile to determine the type of gamer the player is, and then match that player with a virtual world more appropriate (and thus more enjoyable) for the player. For example, if the player's profile indicates he is a grinder, then the system will recommend (or simply place) the player in a new virtual world that appeals to grinders. Likewise, the system can provide virtual worlds with more raid content for higher level raiders, virtual worlds with more quests or lands to explore for explorers/questers, virtual worlds with more solo content for solo players, and so forth, as described above.

Figure 17A:
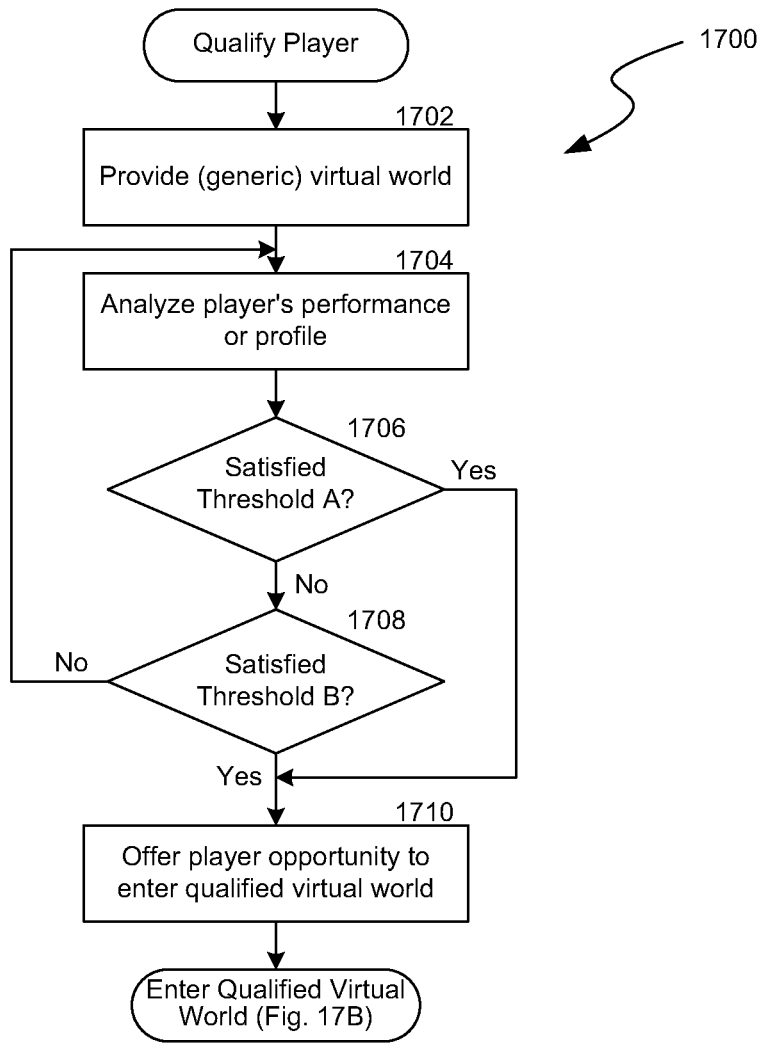
FIG. 17A is a flow diagram illustrating an example of a process for employing pre-qualified virtual worlds.

Referring to FIG. 17A, the system performs a routine 1700 to determine whether a player is pre-qualified. In block 1702, the system may provide a generic virtual world, or the virtual world, generic or not, may be provided by a third party. Under block 1704, the system analyzes the player's performance within the virtual world. Alternatively or additionally, the system analyzes the player's profile described above, to access a player's performance within one or more games.

In block 1706, the system determines whether the player has satisfied a given threshold. As noted above, this threshold can be whether the player has achieved a certain level or number of experience points or based on other player criteria or characteristics as further described herein. The system can establish certain thresholds that must be met for a player to be authorized to access certain pre-qualified servers/worlds. The thresholds could be based on certain criteria stored in the player's profile. For example, if a player is characterized as a power gamer, the player must also have established a certain level of skill as a power gamer, and thus the system can analyze equipment metrics, character level, zones played, manna efficiency, experience gained efficiency, and other metrics against preset thresholds for more-skilled power gamers (an "elite-level" of power gamers). As a result, a separate server/virtual world can be established for power-gamer-style players who have a quantifiable level of skill over fellow power gamers, and thus may prefer to play with equally skilled power gamers, rather than with inexperienced players. Additional performance-based virtual worlds are contemplated and the system provides a plurality of worlds comprising a hierarchy or "ladder" of various performance levels.

The system may also, under block 1708, determine whether the player has satisfied a second, alternative threshold, such as whether the player has proven to be highly proficient in at least one character attribute, such as combat effectiveness or ability to maximize use of healing spells. If the answer to either of the threshold inquiries is affirmative, then the player is offered, under block 1710 the opportunity to enter a pre-qualified virtual world. The offer may be in the form of an in-game message, or an out-of-game message, such as e-mail, SMS/text message, or other communication described herein.

Rather than providing two alternative thresholds, the system may employ a single threshold, or two or more thresholds, all of which must be met before the player is pre-qualified to enter or otherwise access the virtual world. For example, the player may not only need to have acquired a given level, but also proven to be proficient or have a propensity to play as an explorer. Thus, the virtual world to which the player is recommended under block 1710 may be a virtual world that appeals to players of a minimum threshold of competency, and have a common play-style. This can result in a more pleasing game experience among such pre-qualified players within the new virtual world.

Figure 17B:
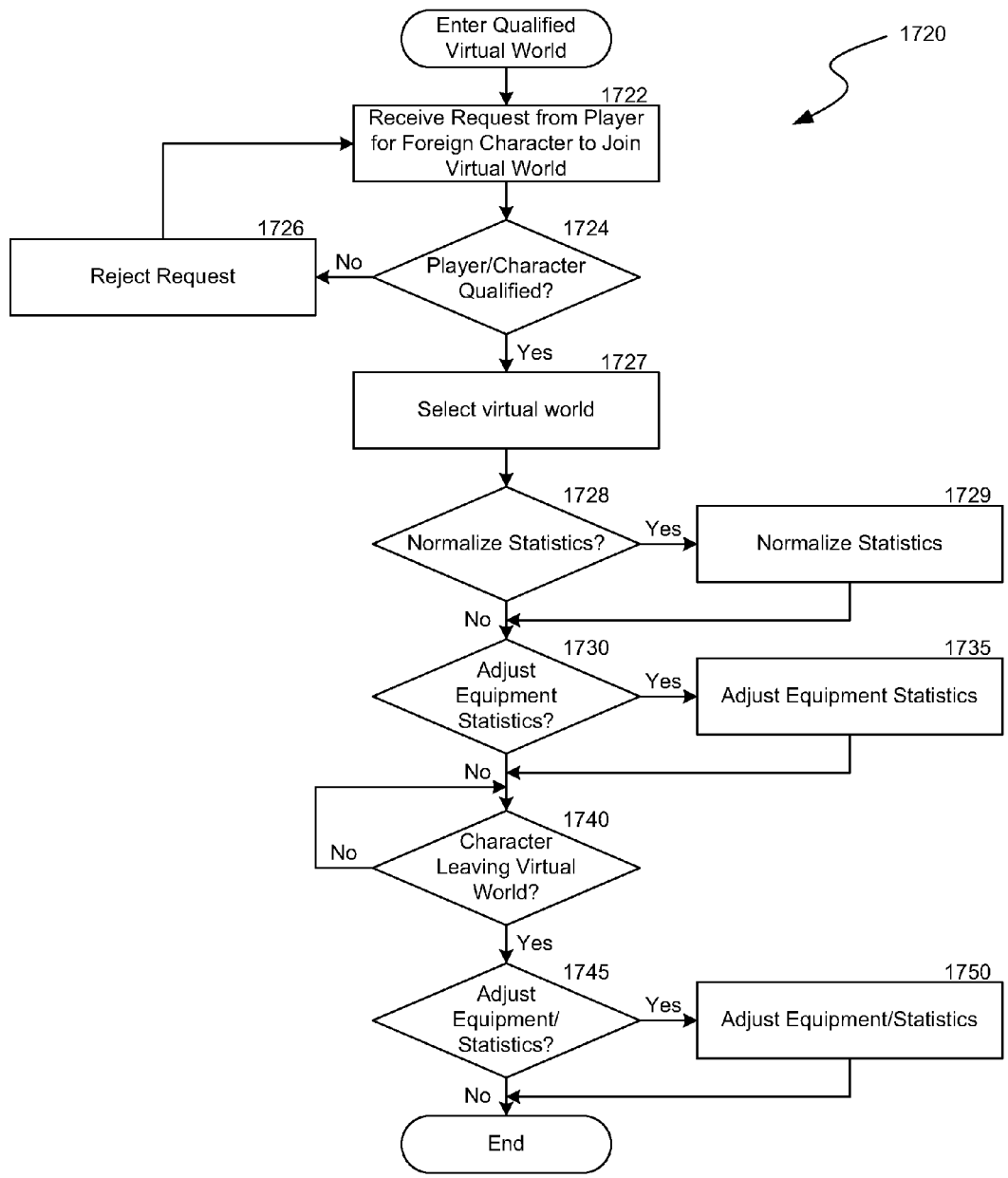
FIG. 17B is a flow diagram illustrating an example of a process to qualify players to enter new pre-qualified virtual worlds.

FIG. 17B shows a routine 1720 for allowing players to move to a virtual world, even temporarily, without losing experience, equipment or other statistics. The routine 1720 begins in block 1722 where the system receives a request from a player or otherwise identifies a player to have that player's character join a virtual world in which that character has not previously played. Such a "foreign" character typically may have gathered experience, equipment, and other enhanced statistics or abilities in another virtual world (e.g., the generic virtual world), and the player wishes to import this character into another virtual world. In block 1724, the system determines whether the player or character is pre-qualified. During such qualification check, the system can first determine whether the player is authorized to play within the virtual world. Some players may have failed to meet the above thresholds, or may be blacklisted or banned from certain virtual worlds because of misbehavior, failure to pay the monthly fee, and so forth. Alternatively or additionally, the character may simply be inappropriate for the virtual world, such as a fantasy-based character requesting to be used in a science-fiction game (or the system may offer a transformation of the player's character into one appropriate for the new game as further described herein). As another example, qualification may require that the player pay a fee (real or virtual currency) for entering or accessing the virtual word. For example, certain virtual worlds may require fixed entry fees or determine variable access fees based on player characteristics. If not pre-qualified, then in block 1726, the system provides a rejection notice to the player. In some embodiments, the system indicates why the player was not pre-qualifies and/or provides additional entry-related information to the player, for example, that the player had a characteristic of 80% and the world required level of 85%, or other indicia of requirements for access to a particular world or activity.

Assuming the player and character are pre-qualified and the player and character are moved to a new virtual world, then in block 1727, the system determines or selects a virtual world. For example, the system may analyze the player's profile, determine that the player is characterized as 65% grinder and 35% explorer, and then match that pre-qualified player to a virtual world limited to players with at least a 50% grinder and 20% explorer characterization. The system may have a database or other data structure that maps multiple games/virtual world to different qualifications.

Another example is a virtual world for role-players or players who exhibit a greater "bonding metric", and thus the system matches such players to a virtual world that facilitates or encourages interactions among players. The system can, for example, analyze which fellow players a given player frequently plays with, the number of communications with particular players, and so forth, to thereby determine whether the given player likes to play only with a certain group of other players or that their play with a certain group of players exceeds a given threshold, communicate with those players beyond a threshold, and so forth. The system can thereby determine that players of this type enjoy a more closer bond with these fellow players, as opposed to players who frequently move from group to group, and rarely play with the same players within a given week or month. In some embodiments, the system, based at least in part on identifying certain users exhibiting strong bonds with each other, may create associations between these users, automatically create "friend lists" between these users, propagate or otherwise modify exclusionary criteria between the users as further described herein, and other similar actions to enhance the users' mutual experience. Thus, a server could be created comprising players that are more prone to group and bond with other players as opposed to "loners."

The system can also analyze not only interactions of the player, and the player's characters, but also interaction of those characters within multiple different groups. Therefore, the system can, for each of the player's characters, track what other characters of other players with whom that character plays. For example, a player may, when playing his wizard character, frequently play with certain other players and their associated characters, whereas when the player plays his fighter character, he may then play with a different group altogether. Nevertheless, the commonality between that player's characters and two specific groups week after week, would increase the bonding metric for that player.

In block 1728 the system determines whether any statistics for that character need to be normalized or otherwise modified or adjusted. For example, the system determines whether the new virtual world employs characters having statistics and values that appropriately map and are scaled to those for the character. If normalization is required, then in block 1729 the system performs such normalization. The system may further adjust or exchange currency of one virtual world with the currency of another virtual world based on, for example, predetermined exchange rates, the going rate of a particular item or items within each virtual rate, and/or a dynamically determined exchange rate based on the extent to which players are exchanging currency. Thus, characters transferring or otherwise accessing worlds with differing inflation rates are provided with relatively similar levels of wealth in the different worlds. Other normalization techniques and factors are also contemplated. For example, the system may consider auction prices for particular items, average wealth, play times, levels, the age of a world, and other world-based criteria. In some embodiments, based at least in part on these factors, users prior to transfer are provided with indicia of how their various characteristics and/or items would change if a user accesses a different world. A user can then confirm their intent to access a world if these changes are acceptable.

In block 1730, the system determines whether any equipment statistics are to be adjusted. For example, the system may determine that certain items that the character holds in inventory are too powerful (or too weak) for the current virtual world, were never supported by the current virtual world, or have been retired or removed from the virtual world. If so, then in block 1735, the system adjusts statistics for that equipment to help ensure that the player has an enjoyable gaming experience in the new virtual world, without sacrificing the gaming experience of existing players within that world.

In block 1740, the system determines whether the new character is leaving the virtual world (voluntarily, or involuntarily for failing to meet certain qualifications, noted below). If so, then in 1745, the system determines whether to adjust statistics or equipment values. For example, the system may convert statistics for the character back to those that the character had before joining the new virtual world, possibly with increases based on successes achieved during gameplay in the new virtual world. Such adjustments to equipment or statistics are performed by the system under block 1750. Alternatively, the system may perform a conversion when the player enters another virtual world.

In some embodiments, players would maintain certain qualifications to remain in the pre-qualified virtual world or else be transferred elsewhere. For example, the system determines at a first time that a player satisfies a given criteria for access to a first virtual world or activity. At a second time occurring after the first time, the system determines that the player no longer satisfies the criteria. In some embodiments, the player is immediately transferred to a second world or no longer permitted access to the first world, for example, until the player again satisfies the criteria. In other embodiments, the player is provided with an indicia at the second time that they no longer satisfy the criteria and, at a third time occurring after the second time, if the player still no longer satisfies the criteria they are then barred from accessing the first world, and/or transferred to the second world, etc. The system may check for such continued qualifications/thresholds in block 1740. For example, a player might have to play a minimum amount of time each month or be moved, perhaps with one or more warnings prior to being world-transferred. As another example, players may become disqualified from a pre-qualified virtual world if they no longer meet qualification criteria (e.g., top 1000 DPS, healer, and tank characters across all game servers). In some embodiments, the system may allow a character to exist in a pre-qualified virtual for some threshold period of time (e.g., 72 hours) before disqualifying the player. This would address the issue of dead worlds, etc.

Qualifications or requirements for access could be dynamically and flexibly adjusted for each world based on current world characteristics and populations. If the world was overcrowded, the system might require higher standards for transfer or eliminate transfers entirely for a period. If the world needs more players, standards might be lowered or otherwise adjusted. Moreover, a character may become overqualified for a pre-qualified virtual world and prompted to enter a more advanced virtual world. As an example, the system may establish of hierarchy of pre-qualified virtual worlds, such as a series of virtual worlds for raiders, each successive pre-qualified virtual world providing more difficult and more rewarding raid content for raiders. If a character proves to be successful in the world based on, for example, the character's accomplishments in the virtual world compared to other characters in the virtual world, the character may be promoted to a "higher" pre-qualified virtual world. Alternatively, if the character is not successful, the character may be relegated or demoted to a "lower" pre-qualified virtual world. In some embodiments, lists of characters and relative achievements in various worlds such as leader boards, etc. based on various user criteria and classifications described herein are displayed or provided to users.

Characteristics used to qualify players and/or characters for pre-qualified virtual worlds could include, but are not limited to, play frequency, time of play, chat frequency, chat content/style, how much they explore, how much they repeat the same content, how often they group, power or other characteristics of equipped items, class, race, title, real world characteristics, and other user and/or character characteristics, classifications, and/or criteria described herein. The system may maintain data structures storing characteristic information for different characters and analyze this information to dynamically determine a pre-qualified set of characters for each pre-qualified virtual world. The system may perform this analysis in real time or may perform the analysis periodically (e.g., once per day, once per week, once per month, and so on).

Some Alternative or Additional Features

Those of ordinary skill in the relevant art will recognize that many alternative or additional implementations of the system are possible. For example, in addition to having multiple characters, a player can have different characters associated with different moods or play styles for that player. The player may be in a questing mood, and have a character associated with that mood. Likewise, the player may have a tank character that the player typically employs when that player is in a more aggressive mood. For example, if the player had a bad day, then the player may wish to engage in some power-gaming with other players in a hack and slash fashion in defeating multiple monsters. However, if the player is more reflective, he may wish to enjoy more escapism, and thus explore the virtual world. Further, if the player is in a more playful mood, he may wish to engage in more role play, and then may have a character appropriate for such role play. Thus, the system determines, for a first character and a second character of a first user, a first classification for the first character associated with a first networked activity and a second classification for the second character associated with the first networked activity and/or with a second networked activity. The system tracks these classifications and recommends activities, for example based on information related to a user's mood, preferences, etc.

The system can access other engines and databases to extract further information regarding the player and other players. For example, the system may employ a social networking application programming interface (API), such as the Open Graph API, to access social networking data. Such external data can provide further refinement of computed characterizations of players.

The system can employ a progression dynamic, such as a status bar, that helps motivate the player to complete a longer questionnaire. Such a progression dynamic can help motivate the player to complete such long forms, where such forms gather better player data.

To help further motivate behaviors, the system can provide a medal, award or seal that is displayed on or with the player's characters in a game or other endeavor, which provides an indication to fellow players of that player's skills in playing the game.

While described herein as enhancing online gaming, the system can be applied to any online activity involving multiple users. For example, the system may be used for crowd sourcing, in that it may be able to help match similar users to help cure social ills. Thus, rather than playing games, the system can match users to particular causes, and allow those users to collectively work together to help with social reform or other beneficial ends.

As another example, the system can provide a method for multiple players to be involved in a "game" that encourages players to participate in and create a digital work that has value beyond the "game". One example is a "competition"

where players are encouraged or incentivized to create entries for WiKi pages on particular topics, to derive ways to solve particular problems (such as social, ethical, environmental, or other problems), and so forth.

Alternatively or additionally, the system may provide indicia, presets, policies, or other predefined filters that show common statistics or presets for players sharing common characteristics. This can allow a player, particularly a new player, to understand common or typical statistics for players sharing a common profile. For example, such a predefined filter can show statistics common for an explorer, such as average movement per session, average number of communications per session, average experience points or gold obtained per session, and so forth. Likewise, such filters can help define a typical role-player with higher than average statistics for number of communications per session, reduced movement per session, greater use of emotes and other non-combat user input commands, etc.

Alternatively or additionally, the system can provide examples on how a player can become a power gamer, explorer or other type. For example, the system can publish or post updates on a website regarding the average metrics for players characterized in each of various categories.

The system can suggest a mentor to the player, typically a fellow player who has achieved a certain level of expertise, and who may typify that type of player. Thus, other players who have such expertise can hire themselves out as a tutor. The system can provide a database with a website front end (or other user interface) to allow players to access the database of potential tutors, where such tutors may be listed based on their user name, common type of character they play, their gaming style, hours played of a given game, and so forth. Such tutors may be paid by the requesting player, and the organization running the system can receive a percentage of such payment.

The system may use the gathered or tracked information for many purposes beyond those described above. For example, the gathered information may be used to help game designers in developing future games or in modifying existing games. Thus, a game designer may have estimated that a puzzle, quest or goal in a game would typically be solved or fulfilled within an estimated time. However, by analyzing data gathered by the system described herein, the game designer may conclude that most players require a much greater time period to solve that puzzle or fulfill that quest or goal. Therefore, the game designer can modify the existing game, or release a new game, that permits a similar puzzle to be solved more quickly, or similar quest/goal to be fulfilled more quickly. Likewise, the game designer may determine that a greater than average number of players participate in a particular activity or quest, thereby implying to the game designer that most players enjoyed that goal or quest more than others that may be provided within the game. Thus, the game designer can release a new version of the game, or create a new game, that includes a similar goal or quest, or employs similar themes or creative elements from the existing goal/quest that most players apparently enjoyed. Overall, the system can, in addition to providing compatible player aggregation, provide an automated feedback loop to game designers to permit them to analyze data and metrics from game play to identify strengths or weaknesses in a given game and help guide future game development, all without the to formally query or survey players. Further, such a system may be embedded within or accessed by a game and thereby employed solely for use in gathering feedback data to game designers, rather than for the player classification and aggregation described herein.

CONCLUSION

While the system is generally described above as being applicable for use in an MMOG and particularly a fantasy-themed game, it bears repeating that the invention is not so limited, and can apply to not only any game, but also to any online or real world endeavor between two or more people. Further, while the system is generally described above as being employed in an on-line system involving numerous computers, and possibly inferring that these computers are connected via cables, the invention is readily usable in a wireless environment or even offline periodically. Indeed, some or all aspects of the invention are applicable to a wireless environment where games or any other online endeavor is performed on portable devices, such as smart phones, cell phones, tablets, laptops or other portable devices. Further, the player/user analysis, profile generation, and matching can be distributed wirelessly among multiple portable devices, and may not be limited to running on one or more stationary servers.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C §112, sixth paragraph, other aspects may likewise be embodied as a means-plus-function claim, or in other forms, such as being embodied in a computer-readable medium. (Any claims intended to be treated under 35 U.S.C. §112, sixth paragraph, will begin with the words "means for", but use of the term "for" in any other context is not intended to invoke treatment under 35 U.S.C. §112, sixth paragraph.) Accordingly, the applicant reserves the right to pursue additional claims after filing this application to pursue such additional claim forms, in either this application or in a continuing application.

It is claimed:

1. A method for characterizing users of networked computer games, the method comprising:
   identifying one or more characteristics of a first user of a first networked computer game;
   automatically identifying, with computer hardware comprising one or more processors, one or more actions performed by the first user, wherein the first user employs a data processing device in communication with the networked computer game via a public computer network;
   determining a first criterion based at least in part on the one or more characteristics of the first user and the one or more actions performed by the first user, wherein determining the first criterion is based at least in part on a distance travelled by a first user avatar in the first networked computer game;
   associating the first criterion with the first user;
   identifying one or more characteristics of one or more second users of the first networked computer game;
   automatically identifying, with computer hardware comprising one or more processors, one or more actions performed by the one or more second users, wherein the one or more second users employ one or more data processing devices in communication with the networked computer game via the public computer network;
   determining one or more second criterion based at least in part on the one or more characteristics of the one or more second users and the one or more actions performed by the one or more second users;
   associating the one or more second criterion with the one or more second users; analyzing the first criterion and the one or more second criterion to determine one or more relationships between the first criterion and the one or more second criterion; and
   providing, based at least in part on the one or more relationships between the first criterion and the one or more second criterion, the first user with an option related to a networked computer game.

2. The method of claim 1, wherein providing the first user an option related to a networked computer game comprises providing the first user an option related to the first networked computer game.

3. The method of claim 1, wherein providing the first user an option related to a networked computer game comprises providing the first user an option related to at least a second networked computer game.

4. The method of claim 1, wherein the one or more actions performed by the first user comprise movement of the first user avatar in the first networked computer game.

5. The method of claim 4, further comprising:
   determining a metric associated with the distance travelled by the first user avatar at least in part by comparing the distance travelled by the first user avatar to the distance travelled by one or more other user avatars in the first networked computer game.

6. The method of claim 4, further comprising:
   determining one or more locations of the first user avatar, wherein the one or more locations comprise locations in the first networked computer game;
   identifying one or more characteristics of the first user avatar; and
   wherein determining the first criterion is based at least in part on the one or more locations of the first user avatar and the one or more characteristics of the first user avatar.

7. The method of claim 4, the method further comprising:
   determining one or more locations of the first user avatar;
   wherein the one or more locations comprise locations in the first networked computer game;
   identifying one or more actions performed by the first user avatar at the one or more locations; and
   wherein determining the first criterion is based at least in part on the one or more locations of the first user avatar and the one or more actions performed by the first user avatar.

8. The method of claim 1, wherein the one or more actions performed by the first user comprise one or more combat actions performed by a first user avatar in the first networked computer game.

9. The method of claim 8, the method further comprising:
   determining a metric associated with the one or more combat actions performed by the first user avatar at least in part by comparing the one or more combat actions performed by the first user avatar to one or more combat actions performed by one or more other user avatars in the first networked computer game; and
   wherein determining the first criterion is based at least in part on the metric associated with the one or more combat actions performed by the first user avatar.

10. The method of claim 1, wherein the one or more actions performed by the first user comprise one or more communications by the first user to one or more other users of the first networked computer game.

11. The method of claim 10, the method further comprising:
   determining a metric associated with the one or more communications by the first user at least in part by comparing the one or more communications by the first user to one or more communications by one or more other users in the first networked computer game; and
   wherein determining the first criterion is based at least in part on the metric associated with the one or more communications by the first user.

12. The method of claim 11, wherein determining a metric associated with the one or more communications by the first user at least in part by comparing the one or more communications by the first user to one or more communications by one or more other users in the first networked computer game comprises comparing a frequency of communications by the first user to a frequency of communications by the one or more other users.

13. The method of claim 12, the method further comprising:
   identifying a frequency of communications by the first user to one or more recipients that exceeds a threshold related to the first networked computer game; and associating the first user with the one or more recipients.

14. The method of claim 1, wherein the first criterion comprises a power-related criterion.

15. The method of claim 1, the method further comprising:
   creating an association between the first user and the one or more second users based at least in part on the one or more relationships between the first criterion and the one or more second criterion; and
   wherein providing, based at least in part on the one or more relationships between the first criterion and the one or more second criterion, the first user with an option related to a networked computer game comprises providing, based in part on the association between the first user and the one or more second users, the first user with an option related to a networked computer game.

16. The method of claim 1, wherein analyzing the first criterion and the one or more second criterion to determine one or more relationships between the first criterion and the one or more second criterion comprises determining one or more relationships between the first criterion and the one or more second criterion to a threshold related to the first networked computer game.

17. The method of claim 1, wherein the first criterion comprises a type of user.

18. The method of claim 1, wherein providing, based at least in part on the one or more relationships between the first criterion and the one or more second criterion, the first user with an option related to a networked computer game comprises providing the first user with an option to transform an item associated with an avatar of the first user in the first networked computer game into a different item.

19. The method of claim 18, wherein the different item comprises an item in a second networked computer game.

20. The method of claim 1, wherein providing, based at least in part on the one or more relationships between the first criterion and the one or more second criterion, the first user with an option related to a networked computer game comprises providing the first user with an option to transform a first avatar of the first user in the first networked computer game into a second avatar.

21. The method of claim 20 wherein the second avatar comprises a second avatar in a second networked computer game.

22. The method of claim 1, wherein providing, based at least in part on the one or more relationships between the first criterion and the one or more second criterion, the first user with an option related to a networked computer game comprises providing the first user with an option to transfer a first avatar of the first user in the first networked computer game from a first a virtual world in the first networked computer game to one or more second virtual worlds in the first networked computer game.

23. The method of claim 1, wherein providing, based at least in part on the one or more relationships between the first criterion and the one or more second criterion, the first user with an option related to a networked computer game comprises providing the first user with an option to interact with the second user in the first networked computer game.

24. The method of claim 1, wherein providing, based at least in part on the one or more relationships between the first criterion and the one or more second criterion, the first user with an option related to a networked computer game comprises providing the first user with an option to exclude interacting with the one or more second users in the first networked computer game.

25. The method of claim 1, wherein identifying one or more characteristics of a first user of a first networked computer game comprises:
   identifying one or more items associated with a first avatar of the first user in the first networked computer game; and
   determining a metric associated with the one or more items; and
   wherein determining the first criterion is based at least in part on the metric associated with the one or more items.

26. The method of claim 1, the method further comprising:
   identifying a first data structure associated with the first user, wherein the first data structure associates a first set of users with one or more identifiers, and wherein at least one of the one or more second users is a member of the first set of users; and wherein the one or more relationships between the first criterion and the one or more second criterion is determined at least in part by the membership of the at least one of the one or more second users in the first set of users and the one or more identifiers associated with the at least one of the one or more second users in the first set of users.

27. The method of claim 1, the method further comprising:
   identifying a first data structure associated with the first user, wherein the first data structure associates a first set of users with one or more identifiers, and wherein a third user is a member of the first set of users;
   identifying a second data structure associated with the third user, wherein the second data structure associates a second set of users with one or more identifiers, and wherein at least one of the one or more second users is a member of the second set of users; and
   wherein the one or more relationships between the first criterion and the one or more second criterion is determined at least in part by the membership of the at least one of the one or more second users in the second set of users and the one or more
   identifiers associated with the at least one of the one or more second users in the second set of users.

28. The method of claim 1, wherein determining the first criterion comprises automatically transforming, with computer hardware comprising one or more processors, the one or more characteristics of the first user and the one or more actions performed by the first user into the first criterion, and wherein determining the one or more second criterion comprises automatically transforming, with computer hardware comprising one or more processors, the one or more characteristics of the one or more second users and the one or more actions performed by the one or more second users into the one or more second criterion.

29. The method of claim 1, wherein identifying the one or more characteristics of the first user and identifying the one of more characteristics the one or more second users comprises automatically identifying, with computer hardware comprising one or more processors, the one or more characteristics of the first user and the one or more characteristics of the one or more second users.

30. A system for characterizing users of networked computer games, the system comprising:
- at least one data storage device;
- at least one server computer providing at least a portion of a first networked computer game, wherein the at least one server computer is coupled to the data storage device and to multiple user data processing devices via a public computer network, wherein the at least one server computer is configured to:
  - identify one or more characteristics of a first user of the first networked computer game;
  - automatically identify one or more actions performed by the first user;
  - determine a first criterion based at least in part on the one or more characteristics of the first user and the one or more actions performed by the first user, wherein determining the first criterion is based at least in part on a distance travelled by a first user avatar in the first networked computer game;
  - storing in the data storage device the first criterion with the first user;
  - identify one or more characteristics of one or more second users of the first networked computer game;
  - automatically identify one or more actions performed by the one or more second users;
  - determine one or more second criterion based at least in part on the one or more characteristics of the one or more second users and the one or more actions performed by the one or more second users;
  - store in the data storage device the one or more second criterion with the one or more second users;
  - analyze the first criterion and the one or more second criterion to determine one or more relationships between the first criterion and the one or more second criterion; and
  - provide, based at least in part on the one or more relationships between the first criterion and the one or more second criterion, the first user with an option related to the networked computer game.

31. A system for characterizing users of networked computer games, the system comprising:
- computer hardware comprising one or more processors,
- means for identifying one or more characteristics of a first user of a first networked computer game;
- means, coupled to the means for identifying one or more characteristics of the first user, for automatically identifying one or more actions performed by the first user via a data processing device in communication with the networked computer game via a public computer network;
- means for determining a first criterion based at least in part on the one or more characteristics of the first user and the one or more actions performed by the first user, wherein determining the first criterion is based at least in part on a distance travelled by a first user avatar in the first networked computer game;
- means for associating the first criterion with the first user;
- means for identifying one or more characteristics of one or more second users of the first networked computer game;
- means, coupled to the means for identifying one or more characteristics of the one or more second users, for automatically identifying one or more actions performed by the one or more second users via one or more data processing devices in communication with the networked computer game via one or more public computer networks;
- means for determining one or more second criterion based at least in part on the one or more characteristics of the one or more second users and the one or more actions performed by the one or more second users;
- means for associating the one or more second criterion with the one or more second users;
- means for analyzing the first criterion and the one or more second criterion to determine one or more relationships between the first criterion and the one or more second criterion; and
- means providing, based at least in part on the one or more relationships between the first criterion and the one or more second criterion, the first user with an option related to a networked computer game.

* * * * *

UNITED STATES PATENT AND TRADEMARK OFFICE
CERTIFICATE OF CORRECTION

| | | |
|---|---|---|
| PATENT NO. | : 8,651,961 B2 | Page 1 of 1 |
| APPLICATION NO. | : 13/700707 | |
| DATED | : February 18, 2014 | |
| INVENTOR(S) | : Marcus S. Muller | |

It is certified that error appears in the above-identified patent and that said Letters Patent is hereby corrected as shown below:

In the Drawings

On drawing sheet 4 of 16, Figure 3, please change "Millieu" to --Milieu--.

In the Specification

In column 3, line 50, please change "Games'UltraCorps" to --Games' UltraCorps--.

In column 5, line 67, after "examples" please insert --.--.

In column 8, line 30, please change "that that" to --that--.

In column 13, line 61, please change "threshhold," to --threshold,--.

In column 25, line 53, please change "character"language," to --character" language,--.

In column 33, line 4, please change "I"33t")." to --"I33t")."--.

In column 40, line 66, please change "may by" to --may be--.

In column 43, lines 12-13, please change "compatability" to --compatibility--.

In column 56, line 38, please change "awhile" to --a while--.

In the Claims

In column 77, line 12, in Claim 29, please change "one of more" to --one or more--.

Signed and Sealed this
Twenty-first Day of October, 2014

Michelle K. Lee
*Deputy Director of the United States Patent and Trademark Office*